United States Patent [19]

Hata

[11] Patent Number: 4,605,502

[45] Date of Patent: Aug. 12, 1986

[54] METHODS FOR PURIFYING WATER OR WATER-CONTAINING MATERIAL USING MICROORGANISMS AND LIVING BACTERIAL PREPARATIONS AS WELL AS METHOD FOR PREPARING AND STORING SAME

[75] Inventor: Kosei Hata, Osaka, Japan

[73] Assignee: Seiken Kai Foundational Juridical Person, Osaka, Japan

[21] Appl. No.: 185,718

[22] Filed: Sep. 10, 1980

Related U.S. Application Data

[63] Continuation of Ser. No. 958,469, Nov. 7, 1978, abandoned.

[30] Foreign Application Priority Data

Dec. 3, 1977 [JP] Japan .................. 52-145546

[51] Int. Cl.[4] .............................. C02F 3/34
[52] U.S. Cl. ................................... 210/611
[58] Field of Search .................. 210/606, 610, 611

[56] References Cited

U.S. PATENT DOCUMENTS 3,721,622  3/1973  Finn et al. ............................ 210/611
3,957,974  5/1976  Hata ...................................... 424/93

FOREIGN PATENT DOCUMENTS 1277632  6/1972  United Kingdom ................ 210/611

Primary Examiner—Thomas Wyse
Attorney, Agent, or Firm—Sughrue, Mion, Zinn, Macpeak and Seas

[57] ABSTRACT

A method for purifying water or a water-containing material which comprises using a single or a few bacterial strains whose growth(s) is or are enabled or promoted by the addition of one or more of S-, N- and C-compounds under a low nutritional condition. A living bacterial preparation, useful for the purification of water or water-containing material, comprising a single or a few bacterial strains whose growth(s) is or are enabled or promoted by addition of one or more of S-, N- and C- compounds under a low nutritional condition is also disclosed.

7 Claims, 14 Drawing Figures

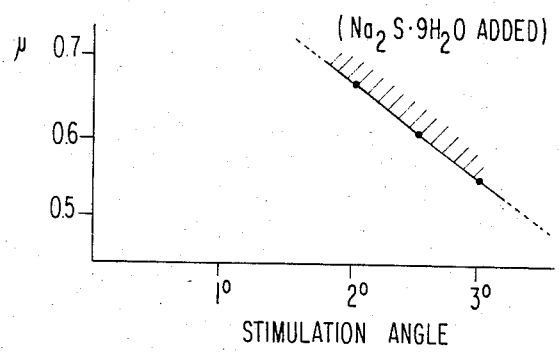
FIG. 6-(1)
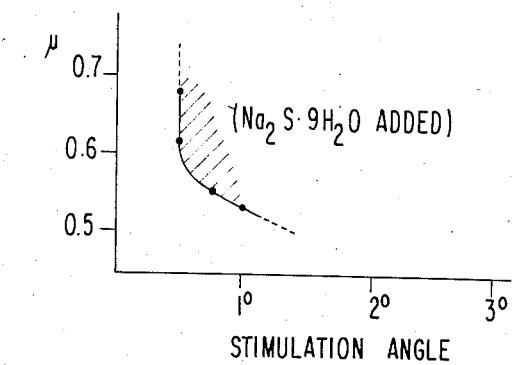
FIG. 7-(1)
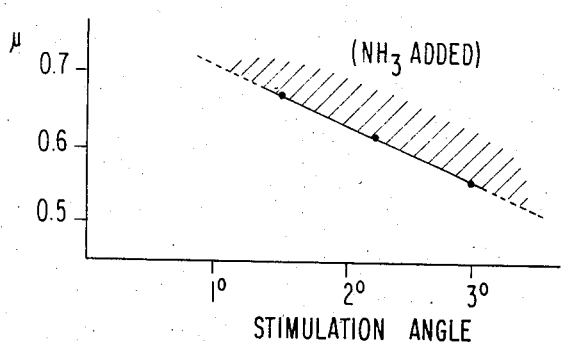
FIG. 6-(2)
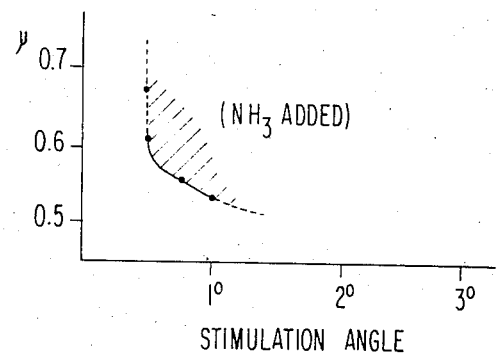
FIG. 7-(2)
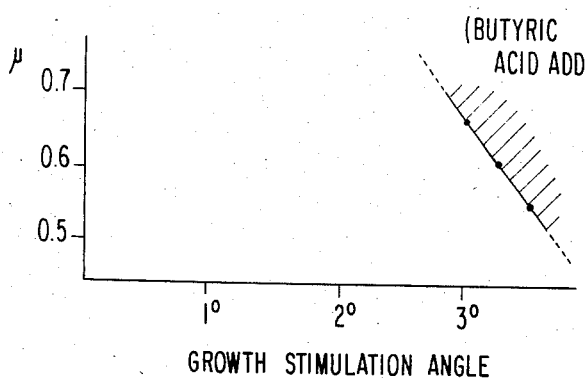
FIG. 6-(3)
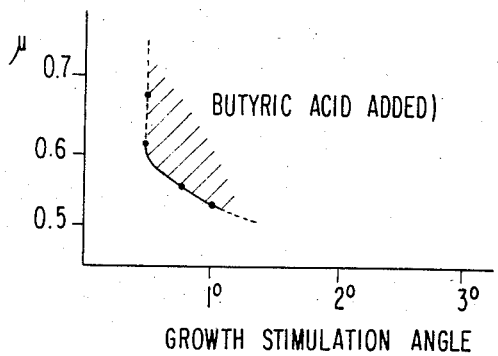
FIG. 7-(3)

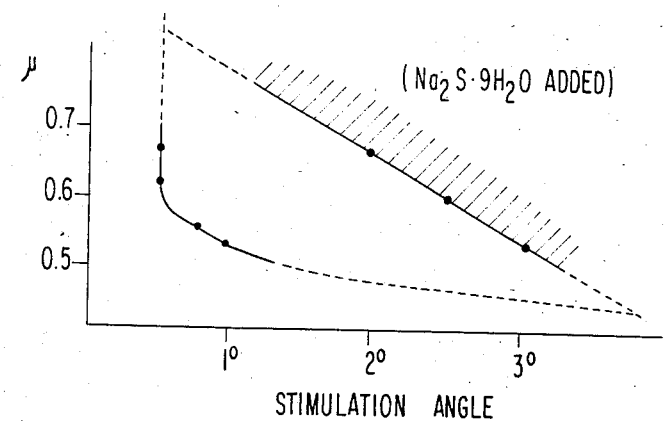
FIG. 8-(1)
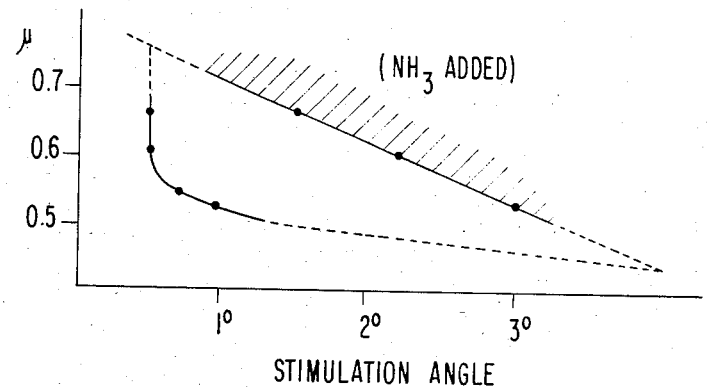
FIG. 8-(2)
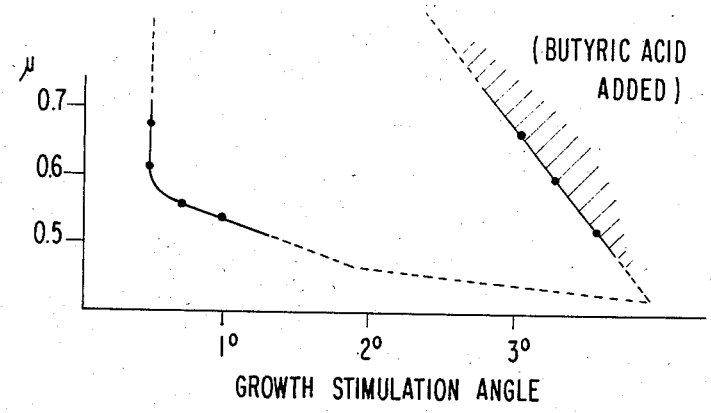
FIG. 8-(3)

METHODS FOR PURIFYING WATER OR WATER-CONTAINING MATERIAL USING MICROORGANISMS AND LIVING BACTERIAL PREPARATIONS AS WELL AS METHOD FOR PREPARING AND STORING SAME

This is a continuation, of application Ser. No. 958,469, filed Nov. 7, 1978, abandoned.

BACKGROUND OF THE INVENTION

1. Field of the Invention

This invention relates to a method for purifying water such as flush water in a simplified flush toilet, water for fish culture farms, circulating water for aquarium fish, etc. or water-containing materials such as those wasted from leather processing plants and chemical plants and abnormally putrefied mud at the sea bed in a fish culture farm, etc. using microorganisms or bacteria. This invention also relates to a bacterial preparation for the purification of water or water-containing materials and a method for preparing and storing the same.

2. Description of the Prior Art

Conventional methods for water purification using microorganisms include an activated sludge process and a water spray filter bed process which are directed to purification of water in only limited places. Other methods suggested are not entirely satisfactory, and have not gained commercial acceptance.

The main reason for this is that no sufficient analysis has ever been made of the properties of microorganisms which are required for water purification, and no single microorganism having the required properties has been isolated. It has been confirmed however that water could be purified by the overall action of a great variety and number of microorganisms. Thus, attempts have in fact been made to purify or clarify water by utilizing the collective action of these numerous strains, and methods for purification by cultivating a mass of hundreds or thousands of bacterial strains have had commercial applications.

However, with such a large mass of bacterial strains, the multiplicity of the strains makes it quite impossible to determine (1) why and by what mechanism water is clarified or purified, (2) in what condition the purification continues, and (3) if there are complementary actions which participate in the purification. This scientific fact means from another angle that clues or means are scarce for achieving a striking improvement in the activity or effectiveness of water purifying agents. Furthermore, the cultivation of the bacterial strains or their preservation with high reliability involve many problems which are difficult to solve.

Difficult problems also exist in regard to checking safety of water purifying bacterial preparations. Bacterial species and strains are too many to trace and examine once they have been scattered in nature. The toxicities of the individual strains cannot be determined because of the large number of the strains. Also, if such a toxicity test is to be conducted, it should be done on many combinations of strains, but such a thing is quite impossible in substance. Furthermore, if flora of strains which have been scattered in the natural world begin to lose balance, there will be no measure that can be taken against it. It would be also difficult to develop a method for cultivating strains having different properties and a method for preserving them without causing a reduction in potency.

It is reasonable to think that no practical way exists to solve the problems associated with the use of a large number and variety of bacterial strains.

SUMMARY OF THE INVENTION

It is an object of this invention to remedy the defects associated with conventional water purification by the cultivation of a mass of a great variety of bacterial strains.

A specific object of this invention is to provide a method for effectively purifying water or water-containing materials, and also to provide a living bacterial preparation used therefor comprising a single or only a few bacterial strains as active ingredient.

Another object of this invention is to purify flush water in simplified flush toilet, water for fish culture farms, and circulating water in aquarium fish, water-containing materials wasted leather processing plants and chemical plants, and to treat the abnormally putrified mud at the sea bed in a fish culture farm, etc.

Still another object of this invention is to provide a bacterial preparation for purifying water or water-containing materials comprising a single or only a few bacterial strains as active ingredient which are allowed to preserve the activity therefor.

BRIEF DESCRIPTION OF THE ACCOMPANYING DRAWINGS

Figure 1:
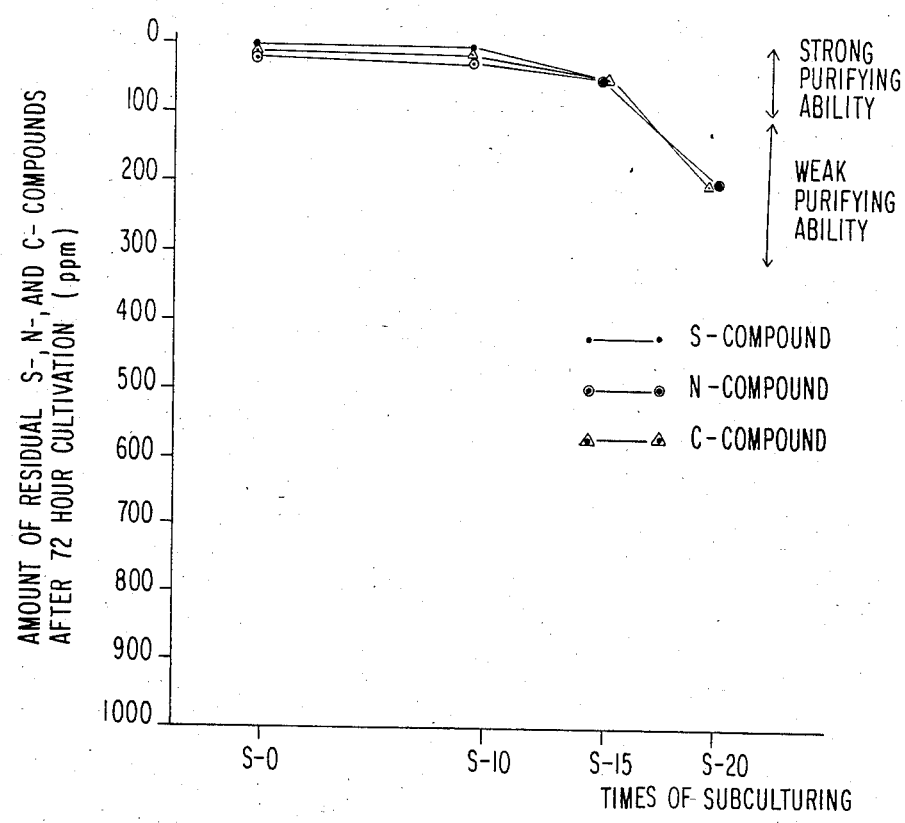
FIG. 1 is a graph showing behavior of various subcultures of F.R.I. No. 4264 to ward S-, N- and C-compounds.

FIGS. 6-(1), -(2) and -(3), 7-(1), -(2) and -(3) and 8-(1), -(2) and -(3) are graphs showing relationship between $\mu$ value and growth stimulation angle ($\theta$).

DETAILED DESCRIPTION OF THE INVENTION

It seems very difficult from the current level of modern bacteriology to solve these problems of the prior art, and the inventor was finally led to the conclusion that there would be no other way but to use a single bacterial strain or a very small number of bacterial strains.

In order to discover a single bacterial strain, a suitable culture medium for it is required, and for this purpose, a reasonable theory is necessary. In order to establish the theory, a general theory about the disintegration and purification of spoiled matter in nature is required. However, the mechanism is too complicated to draw any general theory. Furthermore, it is impossible to separate bacteria of suitable potencies which can be used to obtain experimental data that would be available for elucidating the whole mechanism.

The above vicious circle should therefore be resolved.

It is considered that organic substances derived from living organisms will be converted into simpler compounds which are water soluble in the course of degeneration and thus sulfur compounds (herein referred to as "S-compounds") such as $H_2S$, $Na_2S$, methyl sulfide, methyl mercaptan, amyl mercaptan, propyl mercaptan, butyl mercaptan, dimethyl sulfide, dimethyl disulfide, diethyl sulfide, etc. will be converted into $H_2S$, nitrogen compounds (hereinafter referred to as "N-compounds") such as $NH_3$, skatole, indole, methylamine, ethylamine, dimethylamine, diethylamine, triethylamine, dipropylamine, etc. into $NH_3$, and carbon compounds (hereinafter referred to as "C-compounds") such as acetic acid, butyric acid, propionic acid, formic acid, valeric acid, caproic acid, acetone, acetaldehyde, butyraldehyde, propionaldehyde, etc. into $CO_2$ (via lower fatty acid, if applicable) in the end. In order to achieve complete purification of water or water-containing material it is therefore necessary to finally remove $H_2S$, $NH_3$ and lower fatty acids which would otherwise be accumulated in the natural world. In other words, no complete purification is attained unless these three kinds of compounds are removed, even though other intermediate degraded compounds would be removed.

Further, it is considered that it is highly probable from the adaptational capability of microorganism that those which can remove or assimilate $H_2S$, $NH_3$ and lower fatty acids can also assimilate degradation products of spoiled materials of living organism origin which are higher in molecular weight than the three kinds of compounds above.

The present inventor calls the above knowledge "SNC theory".

From the above viewpoint, extensive efforts have been concentrated on removing these compounds or rendering them nontoxic, i.e., on the assimilation or denaturation of the compounds by microorganisms.

Experiments were conducted on this basis, and first, strains which could absorb or assimilate only one of $Na_2S$ (instead of $H_2S$ which is gaseous and is disadvantageous in handling), $NH_3$ and a lower fatty acid in their cells, or denature it, or make it nontoxic were screened from a very great number of microorganisms including autotrophic bacteria. These strains were used to purify water containing spoiled materials from biological sources, but none of them could perform satisfactory purification although they showed only a slight improvement in quality of water.

Experiments were furthered, and two strains which could each attack one of $Na_2S$, $NH_3$ and a lower fatty acid were used in an attempt to attack two of these three compounds. The result was they they could not purify water satisfactorily either although the quality of water was improved to some extent compared to the case where only one of the three compounds was attacked.

In the present application, the actions of bacterial strains to attack the N-compound, S-compound and C-compound are referred to respectively as an N-action, S-action and C-action.

Nextly, strains which had each two of the S-action, N-action and C-action were screened and used in combination with a strain which had the remaining one action to attack all of the S-compound, N-compound and C-compound. The result was somewhat fruitful, and a clear purifying action was recognized to some extent.

The research was furthered, and attempt was made to search for bacterial strains which individually would have all of the S-, N- and C-actions and which had been quite unexpected in microbiology.

Dr. A. M. Chakravarty reported to the effect that it is almost impossible to assimilate waste oil by a single bacterial strain and investigated gene transfer method in order to implant plasmids capable of exhibiting desired oil assimilating activities into a Pseudomonas strain ('77 Symposium on Microorganism Industry and Technology held in Tokyo on Nov. 15, 1977). This well explains how difficult it is to purify water or water containing material using a single bacterial strain since objective compounds to be removed are more abundant in number and in kind as compared in removing waste oil using microorganisms.

Bacterial strains which can be used in this invention for water purification should meet the following requirements.

(a) The strains should have low nutritional requirement.

(b) The growth speed of the strains should be fast even in a culture medium having low nutritional requirement.

(c) They should satisfy the SNC theory established by the present inventor.

(d) They should be non-pathogenic to animals and plants.

These four requirements are essential to the bacterial strains that can be used in this invention. In order for these strains to have practical utility, they should desirably meet the following further requirements.

(e) They should desirably be active at any oxygen partial pressures in water purification; in other words, they are not limited to aerobic bacteria but also embrace anaerobic bacteria. According to particular situations, aerobic, facultatively anaerobic, and anaerobic bacteria are used.

(f) They should desirably grow and be active over wide temperature and pH ranges.

(g) They should desirably survive both in fresh water and sea water.

(h) After purification, they should desirably, decrease in number and finally die while losing purifying characteristics.

According to this invention bacterial strains which satisfy the above-described requirements can be isolated as follows.

(1) Composition of Medium (A): Starch [S-W]+$CaCO_3$(2 g)+$Na_2S.OH_2O$(0.3 g)+Acetic acid (18)
(B): (A)+Vitamines (0.01 g)
(C): (A)+Casamino acids (1 g)
(D): (A)+Casamino acids (1 g)+Vitamines 10.01 g)
[S-W] stands for Stephenson Whetham medium.
The composition of Stephenson Whetham medium is as follows.

| | |
|---|---|
| $KH_2PO_4$ | 1 g |
| $MgSO_4.7H_2O$ | 0.7 g |
| NaCl | 1 g |
| $(NH_4)_2HPO_4$ | 4 g |
| $FeSO_4.7H_2O$ | 0.03 g |
| Glucose | 5 g |

The above media (A), (B), (C) and (D) are adjusted to pH 6.8 with 0.5 g of $NH_3$.

(2) Method (a) Fresh excrements are suspended in a physiological saline solution and the suspension is inoculated on agar plate containing each media (A), (B), (C) or (D) above defined and the agar plate is incubated under anaerobic condition at 37° C. for 48 hours.

(b) The microorganisms which grow on medium (D) are transplanted to media (C), (B) and (A). Those growing on medium (C) are transplanted to media (B) and (A). Those growing on medium (B) are transplanted to medium (A).

(c) Those which grow on medium (D) but do not grow on either one of media (C), (B) and (A) are abandoned.

(d) Those around the colony of which is observed a clear transparent ring are finished (selected).

(e) The microorganism selected according to (d) above is suspended in a physiological saline solution and cultivated using the same medium as before.

(f) Whether or not the colony appeared produces lactic acid within 48 hours is confirmed.

(g) Whether or not the colony produces gases and gas-producing microorganisms are abandoned.

(h) Only gas-non-producing microorganisms are added in a sterile diluted solution (10-fold) of excrement containing 0.5% of starch and cultivated at 37° C. for 48 hours.

(i) Those samples which attained remarkable reduction in offensive odor or complete removal of offensive odor are selected.

(j) 1 ml of the culture selected according to (i) above is added to a diluted solution (5 fold) of fresh excrement and cultivated at 37° C. for 48 hours.

(k) Those strains which attained remarkable reduction in offensive odor or complete removal of offensive odor are selected.

(l) Nutritional requirement of the strains thus obtained are confirmed using media (A), (B) and (C).

(m) SNC function of the strains is checked using media (A), (B), (C) and Starch [S-W]. (No strain that is capable of removing offensive odor completely or reducing offensive odor remarkably fails to exhibit SNC function.)

(n) The microorganisms thus selected are checked if they are identified to Lactobacillus.

(o) Those identified to Lactobacillus are transplanted to LBS medium serving as a selective medium for Lactobactobacillus and their growth thereon is confirmed.

(p) Those finally identified to Lactobacillus are checked if they have a hemolytic activity, and the strains having a hemolytic activity are abandoned.

(q) The strains thus selected are subcultured once per 2 weeks using media (A), (B) and (C) and stored preferably at 6° C.

The bacterial strains isolated in accordance with the above-described method have the following characteristics.

(A) SNC-actions

Behavior of the bacterial strains used in this invention toward SNC-compounds tested using a basic culture medium containing $Na_2S$ or mercaptan as a representative example of S-compound, ammonia, skatole or trimethylamine as a representative examples of N-compound, or acetic acid, butyric acid or propionic acid as a representative exaples of C-compound in an amount of 1 g per liter of culture broth is shown in Tables 1.

As the basic medium were used (a) [S-W]-glucose (b) [S-W] and (c) [S-W]+Peptone (8 g)+glucose (2 g).

TABLE 1

| Strain (F.R.I. No.) | Type Culture Medium | \multicolumn{10}{c}{Growth after 48 hour Cultivation — Compounds Added (1 g/l of Culture Broth)} | | | | | | | | | |
|---|---|---|---|---|---|---|---|---|---|---|---|
| | | (i) | (ii) | (iii) | (iv) | (v) | (vi) | (vii) | (viii) | (ix) | (x) |
| 2823 | (a) | − | + | + | + | + | + | ++ | + | + | + |
| | (b) | + | ++ | ++ | ++ | + | ++ | ++ | ++ | ++ | ++ |
| | (c) | ++ | +++ | ++ | ++ | ++ | ++ | ++ | ++ | ++ | ++ |
| 3575 | (a) | − | + | + | + | ++ | + | ++ | + | + | + |
| | (b) | + | + | + | + | ++ | ++ | ++ | ++ | ++ | ++ |
| | (c) | ++ | +++ | ++ | ++ | ++ | ++ | ++ | ++ | ++ | ++ |
| 3576 | (a) | − | + | + | − | + | + | + | + | + | + |
| | (b) | + | ++ | ++ | ++ | ++ | ++ | ++ | ++ | ++ | ++ |
| | (c) | ++ | +++ | ++ | ++ | ++ | ++ | ++ | ++ | ++ | ++ |
| 3577 | (a) | − | + | + | + | + | + | + | + | + | + |
| | (b) | + | ++ | ++ | ++ | ++ | ++ | ++ | ++ | ++ | ++ |
| | (c) | ++ | ++ | ++ | ++ | ++ | ++ | ++ | ++ | ++ | ++ |
| 3578 | (a) | − | + | + | + | + | + | + | + | + | + |
| | (b) | + | + | + | + | + | + | + | + | + | + |
| | (c) | ++ | ++ | ++ | ++ | ++ | ++ | ++ | ++ | ++ | ++ |
| 2544 | (a) | − | ± | ± | ± | − | − | − | − | − | ± |
| | (b) | + | ++ | + | + | + | + | + | + | + | + |
| | (c) | ++ | ++ | ++ | ++ | ++ | ++ | ++ | ++ | ++ | ++ |
| 2545 | (a) | − | ± | ± | − | ± | − | + | + | + | + |
| | (b) | + | + | + | + | + | + | + | + | + | + |
| | (c) | ++ | ++ | ++ | ++ | ++ | ++ | ++ | ++ | ++ | ++ |
| 2546 | (a) | − | ± | ± | ± | ± | + | ++ | ++ | ++ | ++ |
| | (b) | + | + | + | + | + | + | + | + | + | + |
| | (c) | ++ | ++ | ++ | ++ | ++ | ++ | ++ | ++ | ++ | ++ |
| 4264 | (a) | − | + | + | + | + | + | + | + | + | + |
| | (b) | + | + | + | + | + | + | + | + | + | + |
| | (c) | ++ | ++ | ++ | ++ | ++ | ++ | ++ | ++ | ++ | ++ |
| 4265 | (a) | − | + | + | + | + | + | + | + | + | + |
| | (b) | + | + | + | + | + | + | + | + | + | + |
| | (c) | ++ | ++ | ++ | ++ | ++ | ++ | ++ | ++ | ++ | ++ |
| 2927 | (a) | − | ± | ± | ± | ± | ± | ± | ± | ± | ± |
| | (b) | + | + | + | + | + | + | + | + | + | + |
| | (c) | ++ | ++ | ++ | ++ | ++ | ++ | ++ | ++ | ++ | ++ |

TABLE 1-continued

| Strain (F.R.I. No.) | Type Culture Medium | Growth after 48 hour Cultivation Compounds Added (1 g/l of Culture Broth) | | | | | | | | | |
|---|---|---|---|---|---|---|---|---|---|---|---|
| | | (i) | (ii) | (iii) | (iv) | (v) | (vi) | (vii) | (viii) | (ix) | (x) |
| 2928 | (a) | — | ⊥ | ⊥ | ⊥ | ⊥ | ⊥ | ⊥ | ⊥ | ⊥ | ⊥ |
| | (b) | ╬ | ╫ | ╫ | ╫ | ╫ | ╫ | ╫ | ╫ | ╫ | ╫ |
| | (c) | ╫ | ╫ | ╫ | ╫ | ╫ | ╫ | ╫ | ╫ | ╫ | ╫ |

Remarks:
(a) [S—W] - glucose ([S—W] medium from which glucose was omitted.)
(b) [S—W]
(c) [S—W] + peptone (8 g) + glucose (2 g) (A culture medium prepared by adding 8 g of peptone and 2 g of glucose to [S—W] medium.)
(i) None
(ii) Acetic acid
(iii) Butyric acid
(iv) Propionic acid
(v) $Na_2S.9H_2O$
(vi) Mercaptan
(vii) Ammonia
(viii) Skatole
(ix) trimethylamine
(x) Ammonia + Butyric acid + $Na_2S.9H_2O$
— : Not growing
+ : Grow
++ : Well grow
+++ : Grow very well
╫ : Growth between ++ and +++
+⊥ : Growth between ++ and +
⊥ : Grow between + and —

It can be seen from Table 1 that the bacterial strains F.R.I. Nos. 2823, 3575, 3576, 3577, 3578, 4264 and 4265 are strongly stimulated their growth by the addition of SNC-compounds individually or in combination when cultivated in any of basic media (a), (b) and (c).

In the case of the bacterial strains F.R.I. Nos. 2927 and 2928 growth stimulation with SNC-compounds is rather weak and addition of SNC-compounds to basic media (c) does not lead to increased growth.

F.R.I. Nos. 2544 and 2545 show only the C-action and N-action, respectively.

F.R.I. No. 2546 exhibits both S- and N-actions.

(B) Low Nutritional Requirement

Water in fish culture farms or water tanks is generally under low nutrition, and readily provides a place of growth competition for a number of common bacteria, pathogenic bacteria and purifying bacteria. Those unsuitable for survival will drop out and vanish. Should the purifying bacteria not be able to win the competition, they will be unable to achieve the object of purifying the water.

One essential requirement for achieving this object is that the purifying bacteria should have low nutritional requirement. Investigations of the present inventor show that the nutrient requirement of the strains used in this invention may be about that of autotrophic bacteria at the lowest since the nutrient sources intended are S-, N- and C-compounds, and at the highest, may be such that they can grow in an [S-W] culture medium. Strains which can grow only in a culture medium having a higher nutrient requirement are unsuitable for water purification by the method of this invention using a single strain or a small number of strains in view of the vitality of common bacteria.

Some example of the state of growth under low nutrition are shown.

(1) From the standpoint of actual operation, the strains used in this invention should be able to grow well in a culture medium which is prepared by removing glucose from an [S-W] medium, a typical inorganic medium, and adding an S-compound, an N-compound and a C-compound.

(2) The strains used in this invention can grow even in an ultra-low nutrition medium obtained by diluting the medium used in the experiment (1) with water.

Table 2 shows some of the experimental results in comparison with the results obtained with *Escherichia coli*.

TABLE 2

| | Compounds added to [S—W] culture medium from which glucose was ommited | | | | | | | | |
|---|---|---|---|---|---|---|---|---|---|
| | (1) 1 g/l of medium of butryric acid | | | (2) 1 g/l of medium of ammonia | | | (3) 1 g/l of medium of $Na_2S.9H_2O$ | | |
| FRI No. | (1) | Diluted to 5 times the medium (1) | Diluted to 10 times the medium (1) | (2) | Diluted to 5 times the medium (2) | Diluted to 10 times the medium (2) | (3) | Diluted to 5 times the medium (3) | Diluted to 10 times the medium (3) |
| 2823 | +⊥ | +⊥ | + | +⊥ | ⊥ | ⊥ | +⊥ | + | + |
| 3575 | +⊥ | + | ⊥ | +⊥ | + | ⊥ | +⊥ | + | + |
| 3576 | +⊥ | + | ⊥ | +⊥ | ⊥ | ⊥ | +⊥ | + | + |
| 3577 | +⊥ | + | ⊥ | + | ⊥ | ⊥ | + | ⊥ | ⊥ |
| 3578 | +⊥ | + | ⊥ | +⊥ | ⊥ | ⊥ | +⊥ | ⊥ | ⊥ |
| 2544 | ⊥ | ⊥ | — | — | — | — | — | — | — |
| 2545 | ⊥ | ⊥ | — | + | ⊥ | ⊥ | — | — | — |
| 2546 | ⊥ | — | ⊥ | — | — | — | + | + | ⊥ |
| 4264 | + | + | ⊥ | + | ⊥ | ⊥ | + | ⊥ | ⊥ |

TABLE 2-continued

Compounds added to [S—W] culture medium from which glucose was ommited

| FRI No. | (1) 1 g/l of medium of butryric acid | | | (2) 1 g/l of medium of ammonia | | | (3) 1 g/l of medium of $Na_2S.9H_2O$ | | |
|---|---|---|---|---|---|---|---|---|---|
| | (1) | Diluted to 5 times the medium (1) | Diluted to 10 times the medium (1) | (2) | Diluted to 5 times the medium (2) | Diluted to 10 times the medium (2) | (3) | Diluted to 5 times the medium (3) | Diluted to 10 times the medium (3) |
| 4265 | ++ | + | ⊥ | + | ⊥ | ⊥ | + | ⊥ | ⊥ |
| 2927 | ⊥ | ⊥ | — | ⊥ | ⊥ | — | ⊥ | ⊥ | — |
| 2928 | ⊥ | ⊥ | — | ⊥ | ⊥ | — | ⊥ | ⊥ | — |
| Escherichia coli | — | — | — | — | — | — | — | — | — |

− : Not growing
+ : Grow
++ : Well grow
+++ : Grow very well
# : Growth between ++ and +++
⊥ : Growth between ++ and +
_ : Growth between + and −

It can be seen from the data shown in Table 2 that the bacterial strains used in this invention can grow in a medium of very low nutritional conditions such as 5- or 10-fold diluted [S-W] medium from which glucose is removed, with the addition of S- , N- or C-compound, while *E. coli* cannot at all grow under such low nutritional conditions even with the addition of S-, N- or C-compound.

(C) High Growth Rate

The strains should grow at a high rate of growth even in a culture medium having a low nutrient requirement.

The purifying bacterial strains used in this invention (abbreviated as the strains of the invention), for example F.R.I. No. 2823, have a high specific growth speed ($\mu$) in an [S-W] culture medium. The $\mu$ value is about 0.76 under aerobic conditions at 28° C., whereas *Escherichia coli* has a $\mu$ value of 0.42 under the same conditions.

Under facultatively anaerobic conditions, the strains of this invention has a $\mu$ value of 0.67, whereas coli has a $\mu$ value of about 0.4. The strains of this invention also show high $\mu$ values at temperatures lower than 28° C. (for example, at about +8° C.) or at higher temperatures (for example, at 40° C.) and not only under aerobic conditions but also under a great variety of environmental conditions in use. As a minimum requirement, the strains of this invention must have a higher $\mu$ value than *E. coli*, a typical example of the common bacteria, under environmental conditions in actual use. The details of this are shown in Table 3. Experiment shows that in F.R.I. No. 2823, the $\mu$ value obtained under aerobic conditions at 28° C. is at least 0.23 larger than that of *E. coli*, and under facultatively anaerobic conditions, the $\mu$ value of the strain of this invention is at least 0.15 higher than that of the latter.

TABLE 3

[S—W] Culture Medium

| F.R.I. No. | Aerobic | | | Facultatively Anaerobic | | |
|---|---|---|---|---|---|---|
| | 8° C. | 28° C. | 35° C. | 8° C. | 28° C. | 35° C. |
| 2823 | 0.1 | 0.76 | 0.78 | 0.06 | 0.67 | 0.67 |
| 3575 | 0.04 | 0.70 | 0.70 | 0.03 | 0.69 | 0.69 |
| 3576 | 0.04 | 0.70 | 0.72 | 0.03 | 0.65 | 0.65 |
| 3577 | 0.06 | 0.78 | 0.78 | 0.04 | 0.66 | 0.66 |
| 3578 | 0.05 | 0.70 | 0.70 | 0.04 | 0.67 | 0.66 |
| 2544 | 0.04 | 0.68 | 0.68 | 0.02 | 0.62 | 0.63 |
| 2545 | 0.04 | 0.65 | 0.65 | 0.02 | 0.62 | 0.63 |
| 2546 | 0.04 | 0.72 | 0.72 | 0.02 | 0.67 | 0.67 |
| 4264 | 0.03 | 0.60 | 0.60 | 0.02 | 0.55 | 0.56 |
| 4265 | 0.03 | 0.62 | 0.62 | 0.02 | 0.58 | 0.60 |
| 2927 | 0.02 | 0.62 | 0.62 | 0.02 | 0.60 | 0.60 |
| 2928 | 0.02 | 0.62 | 0.62 | 0.02 | 0.60 | 0.60 |
| *E. coli* | 0 | 0.42 | 0.55 | 0 | 0.40 | 0.50 |

Characteristics of some typical strains which can be used in this invention were determined by microscopic examination and observation of cultures, biochemical characteristics, and sugar decomposition are shown in Tables 4-(1) and -(2) below.

TABLE 4

| | Strain F.R.I. No. | | | | | | | | | | | | | | | | |
|---|---|---|---|---|---|---|---|---|---|---|---|---|---|---|---|---|---|
| | 2823 | 3575 | 3576 | 3577 | 3578 | 2544 | 2545 | 2546 | 4264 | 4265 | 2927 | 2928 | 4268 | 4269 | 4270 |
| Microscopic examination and observation of culture | | | | | | | | | | | | | | | |
| Gram Staining | − | − | − | − | − | − | − | − | − | − | − | − | − | − | − |
| Shape | Medium rod | Medium rod | Medium rod | Short rod | Medium rod | Medium rod | Short rod | Medium rod | Medium rod | Medium rod | Medium rod | Medium rod | | | |
| Spore | − | − | − | − | − | − | − | − | − | − | − | − | − | − | − |
| Capsule | − | − | − | − | − | − | − | − | − | − | − | − | − | − | − |
| Motility | + | + | + | + | + | + | + | + | + | + | + | + | + | + | + |
| Cultivation conditions | anaerobic | " | " | " | " | anaerobic | " | " | " | " | anaerobic | " | " | " | " |
| Morphology of colony | Circular, medium, | " | " | Circular, large, | " | Circular, medium, | Circular, medium, | Circular, large, | Circular, medium, | Circular, medium, | Circular, medium, | Circular, medium-sized, | Circular, medium, | Circular, medium, | Circular, medium, |
| (on an ordinary agar medium) | protrusions hemi-spherical, surface smooth, wet, milk white, translucent, viscous | | | protrusions low, surface smooth, oily wet, milk white, opaque, viscous | | protrusions hemi-spherical, surface smooth wet, milk white, translucent, viscous | protrusions Low, surface smooth, wet, milk white, opaque, viscous | protrusions high, surface smooth, wet, milk white, opaque, viscous | protrusions normal, surface smooth, wet, milk white, opaque, viscous | protrusions high, surface smooth, wet, milk white, translucent, viscous | protrusions normal, surface smooth, wet, milk white, translucent, viscous | protrusions normal, surface smooth, wet, milk white, opaque, viscous | protrusions high, surface smooth, wet, milk white, translucent, viscous | protrusions low, surface smooth, wet, milk white, opaque, viscous | protrusions normal, surface smooth, wet, milk white, translucent, viscous |
| Formation of ammonia | − | − | − | − | − | − | − | − | − | − | − | − | − | − | − |
| Formation of H$_2$S | − | − | − | − | − | − | − | − | − | − | − | − | − | − | − |
| Formation of indole | − | − | − | − | − | − | − | − | − | − | − | − | − | − | − |
| Formation of catalase | − | − | − | − | − | − | − | − | − | − | − | − | − | − | − |
| Formation of pigment | − | − | − | − | − | − | − | − | − | − | − | − | − | − | − |
| Formation of urea | + | + | + | + | + | + | + | + | + | + | − | − | + | − | − |
| Utilization of citric acid | + | + | + | + | + | + | − | + | + | + | − | − | + | − | − |
| Gelatin liquefaction | − | − | − | − | − | − | − | + | − | − | − | − | − | − | − |
| V-P reaction | − | − | − | − | − | − | − | − | − | − | − | − | − | − | − |
| Reduction of nitrate | − | − | − | − | − | − | − | − | − | − | − | − | − | − | − |

TABLE 4 (2)

| Strains FRI No. | F.R.I. No. | | | | | | | | | | | | | |
|---|---|---|---|---|---|---|---|---|---|---|---|---|---|---|
| | 2823 | 3575 | 3576 | 3577 | 3578 | 2544 | 2545 | 2546 | 4264 | 4265 | 2927 | 2928 | 4268 | 4269 | 4270 |
| Glucose | + | + | + | + | + | + | + | + | + | + | + | + | + | + | + |
| Starch | + | + | + | + | + | − | − | − | + | − | + | + | − | − | − |
| Melizitose | − | − | − | − | − | − | − | − | − | − | − | − | − | − | − |
| Maltose | − | + | + | + | − | − | − | − | + | − | − | − | + | + | + |
| Raffinose | − | + | + | + | + | − | − | − | + | − | − | − | + | + | + |
| Fructose | − | + | + | + | + | − | − | ± | + | − | + | + | + | + | − |
| Melibiose | − | + | + | + | + | + | − | − | + | − | − | − | − | − | − |
| Xylose | + | + | + | + | − | + | ± | − | + | − | − | − | + | + | + |
| Sorbitol | − | + | + | + | − | − | − | − | + | − | − | − | + | − | + |
| Mannitol | − | + | + | + | + | − | − | − | + | + | − | − | + | + | + |
| Inositol | − | + | + | + | + | − | − | − | + | − | − | − | + | − | − |
| Arabinose | − | + | + | + | + | + | − | − | + | − | − | − | + | + | + |
| Lactose | − | + | + | + | − | − | − | − | + | − | − | − | + | + | + |
| Mannose | + | + | + | − | − | − | ± | − | + | − | + | + | + | + | + |
| Saccharose | − | + | + | + | + | − | − | − | + | − | − | + | + | + | + |
| Salicine | − | + | + | + | − | − | − | − | + | − | − | + | + | − | + |

Suitable examples of bacterial strains which can be used in this invention and have been deposited at Fermentation Research Institute, Agency of Industrial Science and Technology, Chiba, Japan include those shown in Table A below.

TABLE A

| F.R.I. No. | Classification | Gram Staining |
|---|---|---|
| 2544 | Acinetobacter sp. SNC | − |
| 2545 | Nitrobacter sp. SNC | − |
| 2546 | Thiobacillus sp. SNC | − |
| 2822 | Pseudomonas sp. SNC | − |
| 2823 | Thiobacillus sp. SNC | − |
| 2927 | Pseudomonas sp. SNC | − |
| 2928 | " | − |
| 2929 | Thiobacillus sp. SNC | − |
| 3575 | Thiobacterium sp. SNC | − |
| 3576 | " | − |
| 3577 | Macromonas sp. SNC | − |
| 3578 | " | − |
| 4264 | Pseudomonas sp. SNC | − |
| 4265 | " | − |
| 4268 | Thiobacillus sp. SNC | − |
| 4269 | " | − |
| 4270 | Acinetobacter sp. SNC | − |
| 4684 | Bacillus sp. SNC | + |
| 4685 | " | + |
| 4686 | Streptococcus sp. SNC | + |
| 4687 | " | + |
| 4688 | Corynebacterium sp. SNC | + |
| 4689 | " | + |
| 4690 | Vibrio sp. SNC | − |
| 4691 | " | − |
| 4692 | Photobacterium sp. SNC | − |
| 4693 | " | − |
| 4694 | Flavobacterium sp. SNC | − |
| 4695 | " | − |
| 4696 | Aeromonas sp. SNC | − |
| 4697 | " | − |
| 4698 | Alcaligenes sp. SNC | − |
| 4699 | " | − |
| 4700 | Nitrobacter sp. SNC | − |
| 4701 | " | − |

Of the bacterial strains shown in Tables 4-(1) and -(2), F.R.I. Nos. 2823, 2544, 2545, 2546, 3575, 3576, 3577 and 3578 are described in Japanese Patent Applications (OPI) Nos. 125549/75, 73136/76, 132547/77, 154526/77, etc.

Purifying capability of isolated strains were determined (a) in vitro, (b) in a model of natural world and (c) in the natural world. The model of natural world used herein was an experiment using an open system such as a water tank into which baits (nutrients) were thrown with bacteria contaminating the system freely. This pattern of model reflects phenomenon naturally occurring at a small scale or corresponding to the worst situation of the natural world.

EXAMPLE 1

In a test tube was charged 10 cc of [S-W] medium containing 1000 ppm of $Na_2S.9H_2O$ as an S compound and one loopful each of various bacterial strains was inoculated thereon. Decrease in the amount of $Na_2S.9H_2O$ with the passage of time in each medium was determined.

The results obtained are shown in Table 6.

TABLE 6

| | Change in Amount of Residual $Na_2S.9H_2O$ with the passage of cultivating Time | | |
|---|---|---|---|
| F.R.I. No. | 24 hrs. (ppm) | 48 hrs. (ppm) | 72 hrs. (ppm) |
| 2823 | 500 | 50 | 5 |
| 3575 | 500 | 50 | 10 |
| 3576 | 500 | 50 | 5 |
| 3577 | 500 | 40 | 5 |
| 3578 | 500 | 60 | 7 |
| 2544 | 1000 | 1000 | 1000 |
| 2545 | 1000 | 1000 | 1000 |
| 2546 | 600 | 100 | 20 |
| 4264 | 500 | 70 | 10 |
| 4265 | 600 | 70 | 12 |
| 2927 | 700 | 100 | 20 |
| 2928 | 800 | 200 | 60 |
| 4268 | 600 | 60 | 10 |
| 4269 | 600 | 60 | 10 |
| 4270 | 600 | 60 | 10 |

EXAMPLE 2

In a test tube was charged 10 cc of [S-W] medium containing 1,000 ppm of $NH_3$ as an N-compound and one loopful each of various bacterial strains was inoculated thereon. Decrease in the amount of $NH_3$ with the passage of time in each medium was determined.

The results obtained are shown in Table 7.

TABLE 7

| | Change in Amount of Residual $NH_3$ with the Passage of Cultivating Time | | |
|---|---|---|---|
| F.R.I. No. | 24 hrs. (ppm) | 48 hrs. (ppm) | 72 hrs. (ppm) |
| 2823 | 500 | 50 | 20 |
| 3575 | 500 | 50 | 20 |
| 3576 | 300 | 50 | 20 |
| 3577 | 300 | 50 | 20 |
| 3578 | 500 | 50 | 20 |
| 2544 | 1000 | 900 | 800 |

TABLE 7-continued

| F.R.I. No. | Change in Amount of Residual NH$_3$ with the Passage of Cultivating Time | | |
|---|---|---|---|
| | 24 hrs. (ppm) | 48 hrs. (ppm) | 72 hrs. (ppm) |
| 2545 | 500 | 50 | 20 |
| 2546 | 900 | 700 | 600 |
| 4264 | 600 | 100 | 30 |
| 4265 | 600 | 100 | 30 |
| 2927 | 700 | 200 | 30 |
| 2928 | 700 | 300 | 100 |
| 4268 | 500 | 70 | 25 |
| 4269 | 600 | 70 | 25 |
| 4270 | 500 | 70 | 25 |

EXAMPLE 3

In a test tube was charged 10 cc of [S-W] medium containing 1,000 ppm of butyric acid as a C-compound and one loopful each of various bacterial strains was inoculated thereon. Decrease in the amount of butyric acid with the passage of time in each medium was determined.

The results are shown in Table 8.

TABLE 8

| F.R.I. No. | Change in Amount of Residual Butyric Acid with the Passage of Cultivating Time | | |
|---|---|---|---|
| | 24 hrs. (ppm) | 48 hrs. (ppm) | 72 hrs. (ppm) |
| 2823 | 400 | 50 | 10 |
| 3575 | 500 | 50 | 10 |
| 3576 | 300 | 50 | 10 |
| 3577 | 300 | 50 | 10 |
| 3578 | 500 | 50 | 10 |
| 2544 | 500 | 60 | 15 |
| 2545 | 1000 | 1000 | 1000 |
| 2546 | 800 | 600 | 300 |
| 4264 | 600 | 200 | 50 |
| 4265 | 500 | 100 | 30 |
| 2927 | 600 | 200 | 50 |
| 2928 | 700 | 300 | 150 |
| 4268 | 500 | 60 | 20 |
| 4269 | 500 | 60 | 20 |
| 4270 | 500 | 50 | 12 |

From the results shown in Tables 6, 7 and 8, it is apparent that F.R.I. Nos. 2823, 3575, 3576, 3577, 3578, 4264, 4265, 4268, 4269 and 4270 show very strong water purifying ability, and F.R.I. 2927 and 2928 are next to them. All these strains have satisfactory SNC-actions.

It is also clear that F.R.I. No. 2544 has a strong C-action but no substantial S- nor N-action.

Further, it can be seen that F.R.I. No 2545 has only an N-action, while F.R.I. No. 2546 has a strong S-action but has a weak C-action with N-action being scarce.

EXAMPLE 4

In a test tube was charged 10 cc of [S-W] medium containing 1,000 ppm each of Na$_2$S.9H$_2$O, NH$_3$ and butyric acid and one loopful of a mixture of F.R.I. No. 2544, 2545 and 2546 was inoculated on the medium and decrease in the amount of Na$_2$S.9H$_2$O, NH$_3$ and butyric acid with the passage of time was determined.

The results obtained are shown in Table 9.

TABLE 9

| | Change in Amount of Residual S-, N- and C-compounds | | | | | | | | |
|---|---|---|---|---|---|---|---|---|---|
| | 24 hrs. | | | 48 hrs. | | | 72 hrs. | | |
| | Na$_2$S | NH$_3$ | Butyric Acid | Na$_2$S | NH$_3$ | Butyric Acid | Na$_2$S | NH$_3$ | Butyric Acid |
| Mixture of F.R.I. Nos. 2544 2545 2546 | 500 (ppm) | 500 (ppm) | 500 (ppm) | 60 (ppm) | 50 (ppm) | 50 (ppm) | 10 (ppm) | 20 (ppm) | 12 (ppm) |

From the results shown in Table 9, it can be seen that a strong water purification is observed using three strains which show individually unsatisfactory purifying capacity only.

EXAMPLE 5

Purification of Aquarium Water

In an aquarium of a size of 400 mm×250 mm×300 mm equipped with a filter placed at the bottom and with a regulated heater layed on sand or pebbles spread over the bottom was charged 25 l of fresh water or sea water (non-sterile). The water was circulated with aeration. In this system fishes shown in Table 10 were bred. In the water was added dry cells of bacterial strains shown in Table 10 in an amount of 0.05 g/1,000 ml of water once a month. Breeding was continued for 3 years only with supplying baits of high nutritional protein twice a day and supplementing water to make up evaporation.

The use of the bacterial strains prevented contamination of water which would have caused death of the fish without the bacterial strains. The water was always kept clear (COD: 12–13 ppm/Cr.) by occasional addition of distilled water.

The results obtained are shown in Table 10.

The death of the fishes at the early period of breeding was considered to be from the attack of pathogenic bacteria before the addition of the strains, because special pathogenic bacteria could be separated.

TABLE 10

| | Fish Bleeding Test: The Number of Dead or Deranzed Fishes | | | | | | | | | |
|---|---|---|---|---|---|---|---|---|---|---|
| Kind of Fish | F.R.I. No. | | | | | | | | | |
| | 2823 | 3575 | 3576 | 3577 | 3578 | 2544 + 2545 + 2546 | 4264 | 4265 | 2927 | 2928 |
| Goldfish (50) | | | | | | | | | | |
| one month | 5 | 4 | 4 | 3 | 5 | 5 | 4 | 5 | 6 | 5 |

TABLE 10-continued

Fish Bleeding Test: The Number of Dead or Deranzed Fishes

| Kind of Fish | 2823 | 3575 | 3576 | 3577 | 3578 | 2544 + 2545 + 2546 | 4264 | 4265 | 2927 | 2928 |
|---|---|---|---|---|---|---|---|---|---|---|
| two months | 1 | 2 | 0 | 2 | 1 | 1 | 1 | 2 | 1 | 1 |
| three months | 0 | 0 | 1 | 1 | 0 | 0 | 0 | 0 | 1 | 0 |
| four months | 0 | 0 | 0 | 0 | 0 | 0 | 0 | 0 | 0 | 1 |
| five months | 0 | 0 | 0 | 0 | 0 | 0 | 1 | 0 | 0 | 0 |
| one year | 0 | 1 | 0 | 0 | 0 | 1 | 0 | 1 | 0 | 0 |
| two years | 1 | 0 | 1 | 0 | 1 | 0 | 0 | 0 | 1 | 0 |
| three years | 1 | 0 | 0 | 1 | 1 | 0 | 1 | 0 | 1 | 1 |
| Carp (10) | | | | | | | | | | |
| one month | 0 | 2 | 1 | 0 | 1 | 0 | 1 | 1 | 1 | 0 |
| two months | 0 | 0 | 0 | 0 | 0 | 0 | 0 | 0 | 1 | 1 |
| three months | 0 | 0 | 0 | 0 | 0 | 1 | 0 | 0 | 0 | 1 |
| four months | 0 | 0 | 0 | 0 | 1 | 0 | 0 | 0 | 0 | 0 |
| five months | 0 | 0 | 0 | 0 | 0 | 0 | 0 | 0 | 0 | 0 |
| one year | 0 | 1 | 0 | 0 | 0 | 0 | 0 | 0 | 0 | 0 |
| two years | 1 | 0 | 0 | 0 | 0 | 0 | 0 | 0 | 1 | 1 |
| three years | 0 | 1 | 0 | 0 | 0 | 0 | 0 | 0 | 0 | 1 |
| Fresh water Tropical Fish Guppy (30) | | | | | | | | | | |
| one month | 1 | 2 | 0 | 1 | 1 | 2 | 1 | 1 | 0 | 1 |
| two months | 0 | 0 | 1 | 1 | 0 | 0 | 1 | 1 | 2 | 1 |
| three months | 0 | 0 | 0 | 0 | 0 | 0 | 0 | 0 | 0 | 1 |
| four months | 0 | 0 | 0 | 0 | 0 | 0 | 0 | 0 | 0 | 0 |
| five months | 0 | 1 | 0 | 1 | 0 | 0 | 0 | 0 | 0 | 0 |
| one year | 0 | 0 | 1 | 0 | 0 | 0 | 0 | 0 | 0 | 0 |
| two years | 0 | 0 | 0 | 0 | 0 | 0 | 1 | 0 | 0 | 1 |
| three years | 1 | 0 | 0 | 1 | 1 | 0 | 0 | 1 | 1 | 1 |
| Seawater Tropical Fish "Cobalt" (20) | | | | | | | | | | |
| one month | 3 | 2 | 3 | 1 | 2 | 3 | 2 | 1 | 2 | 3 |
| two months | 0 | 0 | 1 | 1 | 1 | 1 | 1 | 2 | 1 | 1 |
| three months | 0 | 0 | 0 | 0 | 0 | 0 | 0 | 0 | 1 | 0 |
| four months | 0 | 0 | 0 | 0 | 0 | 0 | 0 | 0 | 0 | 1 |
| five months | 0 | 2 | 0 | 0 | 0 | 0 | 0 | 0 | 0 | 0 |
| one year | 2 | 0 | 0 | 0 | 1 | 0 | 1 | 1 | 0 | 0 |
| two years | 1 | 0 | 1 | 0 | 1 | 0 | 0 | 1 | 1 | 1 |
| three years | 1 | 1 | 1 | 3 | 1 | 0 | 1 | 1 | 0 | 1 |

EXAMPLE 6

High Nutrition Contaminated Water

This example shows an experiment of clarifying water in a water tank.

Well water contaminated with soil and sand was placed into water tanks equipped with a filter (average water temperature 20° C.) in an amount of 25 liters for each tank. The COD values of the water in these tanks and the total number of bacterial cells per cc of the well water were measured. Then, 0.2 g/liter of soybean whey as a nutrient was added to grow common bacteria. During their growth, the water was examined in the aforementioned manner. After a lapse of 5 days, each of the clarifying bacterial strains indicated in Table 11 was added in a concentration of $1\times10^8$/liter. Five days later, the same bacterial strains were again added, and the number of common bacterial cells and the clarifying strain cells in the water and the COD value of water (chrome method) were measured. The results are shown in Table 11.

TABLE 11-(1)

| Sampling of water | Number of Common Bacteria/cc | COD/cr:ppm |
|---|---|---|
| Well water | $2 \times 10^6$ | 7 |
| Addition of Nutrient | | |
| 1 day after addition | $8 \times 10^7$ | 1000 |
| 3 days after addition | $4 \times 10^8$ | 900 |
| 5 days after addition | $2 \times 10^8$ | 500 |

TABLE 11

| | Tank A | | | Tank B | | | Tank C | | | Tank D | | | Tank E | | |
|---|---|---|---|---|---|---|---|---|---|---|---|---|---|---|---|
| | F.R.I. No. 2823 | Common bacteria | COD | F.R.I. No. 3575 | Common bacteria | COD | F.R.I. No. 3576 | Common bacteria | COD | F.R.I. No. 3577 | Common bacteria | COD | F.R.I. No. 3578 | Common bacteria | COD |
| Addition of purifying bacteria (1st) | $1 \times 10^8$ | | | $1 \times 10^8$ | | | $1 \times 10^8$ | | | $1 \times 10^8$ | | | $1 \times 10^8$ | | |
| 1 day after addition | $2 \times 10^8$ | $5 \times 10^7$ | 300 | $2 \times 10^8$ | $5 \times 10^7$ | 300 | $2 \times 10^8$ | $5 \times 10^7$ | 350 | $2 \times 10^8$ | $5 \times 10^8$ | 300 | $2 \times 10^8$ | $1 \times 10^8$ | 300 |
| 3 days after addition | $2.5 \times 10^8$ | $2 \times 10^6$ | 100 | $2 \times 10^8$ | $3 \times 10^6$ | 100 | $2 \times 10^8$ | $3 \times 10^6$ | 120 | $2 \times 10^8$ | $4 \times 10^6$ | 100 | $2 \times 10^8$ | $1 \times 10^7$ | 100 |
| 5 days after addition | $5 \times 10^7$ | $3 \times 10^5$ | 25 | $1 \times 10^7$ | $4 \times 10^5$ | 30 | $3 \times 10^7$ | $3 \times 10^6$ | 30 | $2 \times 10^7$ | $5 \times 10^5$ | 25 | $1 \times 10^7$ | $1 \times 10^6$ | 25 |
| Addition of purifying bacteria (2nd) | $1 \times 10^8$ | | | $1 \times 10^8$ | | | $1 \times 10^8$ | | | $1 \times 10^8$ | | | $1 \times 10^8$ | | |
| 1 day after addition | $1 \times 10^8$ | $1 \times 10^5$ | 20 | $1 \times 10^8$ | $1 \times 10^5$ | 25 | $1 \times 10^8$ | $5 \times 10^5$ | 20 | $1 \times 10^8$ | $3 \times 10^5$ | 15 | $1 \times 10^8$ | $3 \times 10^5$ | 20 |
| 3 days after addition | $5 \times 10^6$ | $1 \times 10^6$ | 15 | $1 \times 10^6$ | $1 \times 10^5$ | 20 | $5 \times 10^6$ | $3 \times 10^5$ | 15 | $4 \times 10^6$ | $2 \times 10^5$ | 15 | $1 \times 10^6$ | $2 \times 10^5$ | 15 |
| 5 days after addition | $1 \times 10^6$ | $5 \times 10^4$ | 10 | $1 \times 10^6$ | $1 \times 10^5$ | 15 | $3 \times 10^6$ | $2 \times 10^5$ | 12 | $2 \times 10^6$ | $1 \times 10^5$ | 10 | $1 \times 10^6$ | $1 \times 10^5$ | 12 |
| 10 days after addition | $1 \times 10^6$ | $5 \times 10^4$ | 12 | $4 \times 10^5$ | $1 \times 10^5$ | 12 | $1 \times 10^6$ | $1 \times 10^5$ | 15 | $1 \times 10^5$ | $1 \times 10^5$ | 12 | $1 \times 10^6$ | $1 \times 10^5$ | 12 |
| 15 days after addition | $5 \times 10^5$ | $1 \times 10^5$ | 12 | $3 \times 10^5$ | $1 \times 10^5$ | 12 | $5 \times 10^5$ | $1 \times 10^5$ | 15 | $5 \times 10^5$ | $1 \times 10^5$ | 12 | $1 \times 10^6$ | $1 \times 10^5$ | 12 |

| | Tank F | | | Tank G | | | Tank H | | | Tank I | | | Tank J | | |
|---|---|---|---|---|---|---|---|---|---|---|---|---|---|---|---|
| | F.R.I. No. 2544 2545 2546 | Common bacteria | COD | F.R.I. No. 4264 | Common bacteria | COD | F.R.I. No. 4265 | Common bacteria | COD | F.R.I. No. 2927 | Common bacteria | COD | F.R.I. No. 2928 | Common bacteria | COD |
| Addition of purifying bacteria (1st) | $1 \times 10^8$ | | | $1 \times 10^8$ | | | $1 \times 10^8$ | | | $1 \times 10^8$ | | | $1 \times 10^8$ | | |
| 1 day after addition | $2 \times 10^8$ | $5 \times 10^7$ | 350 | $1.5 \times 10^8$ | $1 \times 10^8$ | 40 | $1.5 \times 10^8$ | $1 \times 10^8$ | 400 | $1 \times 10^8$ | $5 \times 10^7$ | 500 | $1 \times 10^8$ | $1 \times 10^8$ | 500 |
| 3 days after addition | $2 \times 10^8$ | $4 \times 10^6$ | 130 | $1.5 \times 10^8$ | $1 \times 10^7$ | 150 | $1 \times 10^8$ | $2 \times 10^7$ | 150 | $1 \times 10^8$ | $5 \times 10^7$ | 300 | $1 \times 10^8$ | $5 \times 10^7$ | 300 |
| 5 days after addition | $3 \times 10^7$ | $4 \times 10^5$ | 40 | $1 \times 10^7$ | $1 \times 10^6$ | 40 | $1 \times 10^7$ | $2 \times 10^6$ | 45 | $1 \times 10^7$ | $1 \times 10^8$ | 100 | $1 \times 10^7$ | $1 \times 10^8$ | 200 |
| Addition of purifying bacteria (2nd) | $1 \times 10^8$ | | | $1 \times 10^8$ | | | $1 \times 10^8$ | | | $1 \times 10^8$ | | | $1 \times 10^8$ | | |
| 1 day after addition | $1 \times 10^8$ | $4 \times 10^5$ | 25 | $1 \times 10^8$ | $3 \times 10^5$ | 25 | $1 \times 10^8$ | $5 \times 10^5$ | 30 | $1 \times 10^8$ | $1 \times 10^8$ | 50 | $1 \times 10^8$ | $5 \times 10^7$ | 150 |
| 3 days after addition | $5 \times 10^6$ | $4 \times 10^5$ | 20 | $1 \times 10^6$ | $2 \times 10^5$ | 20 | $1 \times 10^6$ | $3 \times 10^5$ | 20 | $1 \times 10^6$ | $5 \times 10^8$ | 30 | $1 \times 10^6$ | $5 \times 10^7$ | 120 |
| 5 days after addition | $3 \times 10^5$ | $3 \times 10^5$ | 15 | $2 \times 10^5$ | $1 \times 10^5$ | 20 | $2 \times 10^5$ | $1 \times 10^5$ | 25 | $3 \times 10^5$ | $1 \times 10^7$ | 30 | $3 \times 10^5$ | $1 \times 10^7$ | 100 |
| 10 days after addition | $1 \times 10^6$ | $2 \times 10^5$ | 15 | $1 \times 10^5$ | $1 \times 10^5$ | 20 | $1 \times 10^5$ | $1 \times 10^5$ | 25 | $3 \times 10^5$ | $5 \times 10^6$ | 40 | $3 \times 10^5$ | $5 \times 10^6$ | 100 |
| 15 days after addition | $5 \times 10^5$ | $1 \times 10^5$ | 15 | $1 \times 10^5$ | $1 \times 10^5$ | 25 | $1 \times 10^5$ | $1 \times 10^5$ | 25 | $1 \times 10^5$ | $5 \times 10^6$ | 40 | $1 \times 10^5$ | $5 \times 10^6$ | 100 |

It is seen from Table 11 that strains which have all of SNC-actions showed good purifying results despite some differences in the degree of the actions.

The bacterial strains added to tanks A, B, C, D and E (which have both large specific growth rate and stimulation angle $\theta$-$\mu$ and $\theta$ will be explained hereinafter) are strong; putrefying water of a high protein content, i.e., aquarium water, having a COD value/cr of 500 ppm and a population of common bacteria of $2 \times 10^8$ cells/ml could be purified using $1 \times 10^8$ cells/ml of aquarium water to COD value of 25 to 30 ppm (population of common bacteria: an order of $10^5$) 5 days after the addition of the bacterial strain. Another addition of the bacterial strain on the fifth day led to further improvement (COD value: 10 to 15 ppm).

On the other hand the bacterial strains added into tanks G and H ($\mu$: 0.55–0.58; $\theta$: 3° for S-compound, 3° for N-compound and 3.6° for C-compound) are less effective. The bacterial strain added into tank I ($\mu$: 0.63; $\theta$: 0.5° for S-, N- and C-compounds) is much less effective but still capable of purifying water. The strain added into tank J ($\mu$: 0.53; $\theta$: 0.5° for S-, N- and C-compounds) does not show satisfactory purifying ability in such a putrefying water of high protein content as in this example and is believed insufficient for practical purposes.

EXAMPLE 7

Contaminated sea water (25 liters) was placed in a water tank equipped with a filter (water temperature 25° C.), and the COD of the sea water and the total number of bacterial cells per cc of the sea water were measured. Immediately then, 1 g/liter of soybean whey and 20 g of the entrails of mackerel were thrown into the tank as nutrient to grow common bacterial intentionally. During the growth, the water was examined in the above manner. Then, a purifying strain (F.R.I. No. 4264) was added in a concentration of $1 \times 10^8$/cc.

Five days later, the same purifying strain was added again in a concentration of $10^8$/cc. The numbers of the purifying bacterial cells and the common bacterial cells in the sea water and the COD/cr of the sea water were measured. The results are shown in Table 12.

Other purifying bacterial strains also showed a similar tendency in water treatment expecting F.R.I. Nos. 2927 and 2928 which were a little less effective than the other strains.

TABLE 12

|  | Common bacteria per cc of sea water | F.R.I. No. 4264 per cc of sea water | COD (ppm) |
| --- | --- | --- | --- |
| Sea water | $1 \times 10^7$ |  | 8 |
| Nutrient added |  |  | 1600 |
| 1 day after addition | $2 \times 10^8$ |  | 1500 |
| 3 days after addition | $5 \times 10^8$ |  | 1200 |
| 5 days after addition | $3 \times 10^8$ |  | 1000 |
| First addition of F.R.I. No. 2823 |  | $1 \times 10^8$ |  |
| 1 day after addition | $1 \times 10^8$ | $2 \times 10^8$ | 500 |
| 3 days after addition | $1 \times 10^7$ | $3 \times 10^8$ | 300 |
| 5 days after addition | $1 \times 10^6$ | $1 \times 10^7$ | 100 |
| Second addition of F.R.I. No. 2823 |  | $1 \times 10^8$ |  |

TABLE 12-continued

|  | Common bacteria per cc of sea water | F.R.I. No. 4264 per cc of sea water | COD (ppm) |
| --- | --- | --- | --- |
| 1 day after addition | $1 \times 10^5$ | $5 \times 10^7$ | 50 |
| 3 days after addition | $1 \times 10^5$ | $1 \times 10^7$ | 15 |
| 5 days after addition | $2 \times 10^5$ | $2 \times 10^6$ | 10 |
| 10 days after addition | $2 \times 10^5$ | $1 \times 10^6$ | 10 |

It can be seen from the results shown in Table 12 that the addition of F.R.I. No. 4264 purified water from COD value of 1,000 ppm (population of common bacteria: $3 \times 10^8$/ml) to COD value of 10 ppm (population of common bacteria: $2 \times 10^5$/ml). This bacterial strain is very effective for purifying seriously contaminated water.

EXAMPLE 8

In a tank equipped with a filter (water temperature) was charged 25 l of artificial sea water in which 10 young grunts (average length: 5 cm) were bred with feeding flesh of sea shells or shrimp. Water level was kept constant by supplementing tap water to make up water deficit due to evaporation. At the initiation of breeding was added dry cells of F.R.I. No. 4265 in an amount of 0.1 g/l of water. Thereafter the same amount of the bacterial strain was added once a month. The COD value of water and population of common bacteria were measured three times every month and average values were calculated.

The results obtained are shown in Table 13.

TABLE 13

| Breeding Time (month) | Common Bacteria cells/ml | COD Value (Cr method) | Average Length of Fish |
| --- | --- | --- | --- |
| 0 | $2 \times 10^6$ | 5 ppm | 5 cm |
| 1 | $1.5 \times 10^6$ | 10 | 5.3 |
| 2 | $2 \times 10^6$ | 15 | 5.7 |
| 3 | $1.2 \times 10^6$ | 10 | 6.0 |
| 4 | $1.8 \times 10^6$ | 20 | 6.3 |
| 5 | $2 \times 10^6$ | 15 | 6.7 |
| 6 | $1.5 \times 10^6$ | 14 | 7.0 |
| 7 | $1.3 \times 10^6$ | 12 | 7.2 |
| 8 | $1 \times 10^6$ | 15 | 7.4 |
| 9 | $2 \times 10^6$ | 20 | 7.6 |
| 10 | $1.3 \times 10^6$ | 20 | 7.8 |
| 11 | $1.8 \times 10^6$ | 18 | 7.9 |
| 12 | $1.5 \times 10^6$ | 17 | 8.0 |

It is apparent from the results shown in Table 13 that the population of common bacteria was almost constant ($1 \times 10^6$ to $2 \times 10^6$ cells/ml) 12 months after the addition of the bacterial strain. COD value remained 10 to 20 ppm. Water was clear and no disease observed.

F.R.I. Nos. 3575, 3576, 3577, 3578 and 4264 and a mixture of F.R.I. Nos. 2544, 2545 and 2546 showed similar results. However, F.R.I. Nos. 2927 and 2928 showed activity as high as about 70 to 80% of that of F.R.I. No 4265.

EXAMPLE 9

Purification of flush water in a simplified flush toilet was conducted using aerobic, facultatively anaerobic or anaerobic bacteria which were and S-, N- and C-active adapted to be resistant to bile acid. The total amount of the strain added in the form of a wet cake was 0.3 g/l of flush water/day (where a single strain was added the dosage was 0.3 g/l of flush water/day and where a mixture of two strains was added the dosage of each strain was 0.15 g/l of flush water/day). The strain(s) was or were administered 3 times in total (once a day every three days). The degree of scum formation was evaluated 1 week after the completion of the administration of the water purifying strain(s).

The results obtained are shown in Table 14.

EXAMPLE 10

Putrid see bed mud samples were collected from various fish culture farms and 1.5 g/kg of mud of purifying bacterial strains shown in Table 15 were added thereto. 0.3 kg/kg of mud of sardine paste was added every day. The population of purifying bacterial strain and common bacteria in the mud was measured and the change in color of mud was evaluated.

The results obtained are shown in Table 15.

TABLE 14

Scum Formation in a Simplified Purification Tank in a Flush Toilet

Combinations of strains at different $O_2$ partial pressures

| F.R.I. No. | Aerobic strain | Facultatively anaerobic strain | Anaerobic strain | Aerobic strain + Facultatively anaerobic strain | Aerobic strain + Facultatively Anaerobic strain + Anaerobic strain | Aerobic strain + Facultatively anaerobic strain + anaerobic strain |
|---|---|---|---|---|---|---|
| 2823 | ++ | + | ++ | ⊥∼+ | + | ⊥ |
| 3575 | ++ | + | ++ | ⊥∼+ | + | ⊥ |
| 3576 | ++ | + | ++ | + | + | ⊥∼+ |
| 3577 | ++ | + | ++ | ⊥∼+ | + | ⊥ |
| 3578 | ++ | + | ++ | ⊥∼+ | + | ⊥ |
| 2544 | ++∼+++ | + | ++∼+++ | ++ | ++ | ++ |
| 2545 | ++∼+++ | ++ | +++∼++ | ++ | ++ | ++ |
| 2546 | ++∼+++ | +∼++ | ++∼+++ | ++∼++ | +∼++ | + |
| 2544 + 2545 | ++∼+++ | ++ | ++∼+++ | +∼++ | +∼++ | ++ |
| 2544 + 2546 | +∼++ | +∼++ | ++∼+++ | +∼++ | +∼++ | + |
| 2545 + 2546 | ++∼+++ | +∼++ | ++∼+++ | +∼++ | +∼++ | + |
| 2544 + 2545 + 2546 | ++ | + | ++ | + | + | ⊥ |
| | | | ++ | + | + | |
| 4264 | ++ | ⊥ | | + | + | + |
| 4265 | ++ | ⊥ | ++ | + | + | + |
| 2927 | ++∼+++ | ++ | ++∼+++ | ++ | ++ | + |
| 2928 | ++∼+++ | ++ | ++∼+++ | +∼++ | ++ | + |
| Not added | | | | +++ | | |

The degree of scum formation is evaluated on the following scale.
−: not formed
⊥: slightly formed
+: formed as usual
++: much formed
+++: very much formed It can be seen from the results shown in Table 14, purifying power was strong in the order of (i) mixture of aerobic, facultatively anaerobic and anaerobic strains, (ii) mixture of two of aerobic, facultative anaerobic and anaerobic strains and (iii) single strain.

It can be seen from the results shown in Table 15 that with respect to $O_2$-dependency combined use of 3 focus of adaptation was more effective than the use of a single form of adaptation and that the cell number of common bacteria was decreased while that of the purifying bacterial strain(s) was increased and became dominant, thereby completing purification.

TABLE 15

Purification of Sea Bed Mud

| F.R.I. No. | Time Lapsed after Addition | Faculative Anaerobic Strain | | | Mixture of Aerobic Faculative Anaerobic and Anaerobic Strains | | |
|---|---|---|---|---|---|---|---|
| | | Color of Mud | Purifying Bacterial Cells/ml | Common Bacteria Cells/ml | Color of Mud | Purifying Bacterial Cells/ml | Common Bacteria Cells/ml |
| Control | 2 | Black | — | $1 \times 10^9$ | Black | — | $1 \times 10^9$ |
| | 4 | Black | — | $1.5 \times 10^9$ | Black | — | $1.5 \times 10^9$ |
| | 6 | Black | — | $2 \times 10^9$ | Black | — | $2 \times 10^9$ |
| 2823 | 2 | Black | $1 \times 10^8$ | $6 \times 10^8$ | Black | $1 \times 10^8$ | $5 \times 10^8$ |
| | 4 | Grey | $2 \times 10^8$ | $2 \times 10^8$ | Grey | $2 \times 10^8$ | $1 \times 10^8$ |
| | 6 | Grey | $3 \times 10^8$ | $7 \times 10^7$ | Grey | $3 \times 10^8$ | $5 \times 10^7$ |
| 3575 | 2 | Black | $1 \times 10^8$ | $5 \times 10^8$ | Black | $1 \times 10^8$ | $5 \times 10^8$ |
| | 4 | Black | $1.5 \times 10^8$ | $2 \times 10^8$ | Grey | $1.5 \times 10^8$ | $1 \times 10^8$ |

TABLE 15-continued

Purification of Sea Bed Mud

| | | Faculative Anaerobic Strain | | | Mixture of Aerobic Faculative Anaerobic and Anaerobic Strains | | |
|---|---|---|---|---|---|---|---|
| F.R.I. No. | Time Lapsed after Addition | Color of Mud | Purifying Bacterial Cells/ml | Common Bacteria Cells/ml | Color of Mud | Purifying Bacterial Cells/ml | Common Bacteria Cells/ml |
| 3576 | 6 | Grey | $2 \times 10^8$ | $1 \times 10^8$ | Grey | $2 \times 10^8$ | $1 \times 10^8$ |
| | 2 | Black | $1 \times 10^8$ | $5 \times 10^8$ | Black | $1 \times 10^8$ | $5 \times 10^8$ |
| | 4 | Black | $1 \times 10^8$ | $3 \times 10^8$ | Grey | $2 \times 10^8$ | $2 \times 10^8$ |
| | 6 | Grey | $1 \times 10^8$ | $1 \times 10^8$ | Grey | $2 \times 10^8$ | $1 \times 10^8$ |

F.R.I. Nos. 3577, 3578, 4264 and 4265, and a mixture of F.R.I. Nos. 2544, 2545 and 2546 gave similar results. F.R.I. Nos. 2927 and 2928 required a little longer time as compared to other purifying bacterial strains.

F.R.I. No. 3576 was used in a fish culture farm for yellowfish and the sea bed mud there was free of putrefaction for a long time. As a result, death of yellowfish was decreased by 30% as compared control (no addition of F.R.I. No. 3576).

EXAMPLE 11

One hundred cubic centimeters of a culture broth of F.R.I. No. 4268 was added to a breeding tank for the larvae of large-sized *Chi plumosus* as a fining bait. The tank had a height of 12 cm and measured 40 cm in each side. Activated sludge was spread to a thickness of 5 cm at the bottom of the tank. In the tank, about 15,000 larvae immediately after hatching were living. Water was filled to the full. The larvae were kept in flowing water by aerating the water at a rate of 2 liters/min. by means of a rod-line air stone. As a feed, bakers' yeast and crushed comfrey juice were given as a tabulated below.

TABLE 16

| | Baker's Yeast (g/day) | Crushed Comfrey (cc) |
|---|---|---|
| 1st week | 1 | 0 |
| 2nd week | 2 | 0 |
| 3rd week | 3 | 50 |
| 4th week | 4 | 100 |
| 5th week | 5 | 200 |
| 6th week | 6 | 200 |

In an ordinary activated sludge-containing breeding tank without adding the purifying bacteria of this invention, the breeding rate is good if the breeding is performed in flowing water flowing at 500 cc/hr or so. In contrast, by adding 100 cc of a culture broth of F.R.I. No. 2823 to the breeding tank once in a week, the rate of breeding was very good in water flowing at a rate of about 100 cc/hr, and the growth was good.

F.R.I. Nos. 2823, 3575, 3576, 3577, 3578, 2927, 2928, 4264 and 4265 and a mixture of F.R.I. Nos. 2544, 2545 and 2546 gave much improved yield as compared to the case where no purifying bacterial strain of this invention was used, although some deviation among the strains was observed.

EXAMPLE 12

An incubation test on ayu (*Plecoglossus altivelis*), a typical Japanese freshwater fish.

Freshwater (25 liters) was placed in each of five tanks (A), (B), (C), (D) and (E) (water temperature 20° C.). F.R.I. Nos. 4264, 3575 and 3576 were added to the tanks (A), (B) and (C), respectively, in a concentration of $5 \times 10^8$/cc of water, Malachite Green was added to the tank (D) to a dilution of 300,000 fold, and nothing was added to the tank (E). Then, a net having adhered thereto fertilized eggs of ayu was submerged vertically in the water in each of the tanks (A) to (E), and then air was passed through the water at a rate of 0.5 liters/min. by an air stone. The rate of hatching was evaluated.

The results obtained are shown in Table 17.

TABLE 17

| Time Lapsed after Addition (days) | Rate of Hatching (%) | | | | |
|---|---|---|---|---|---|
| | Tank (A) F.R.I. No. 2823 | Tank (B) F.R.I. No. 3575 | Tank (C) F.R.I. No. 3576 | Tank (D) Malachite Green | Tank (E) None |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 5 | 5 | 3 | 3 | 3 |
| 6 | 10 | 10 | 8 | 5 | 5 |
| 7 | 15 | 15 | 10 | 10 | 10 |
| 8 | 20 | 20 | 15 | 15 | 0 |
| 9 | 40 | 35 | 30 | 20 | 0 |
| 10 | 60 | 55 | 50 | 35 | 0 |
| 11 | 65 | 60 | 55 | 40 | 0 |
| 12 | 70 | 65 | 60 | 45 | 0 |

From the results shown in Table 17, it can be seen that the eggs in the tanks containing the purifying bacterial strain gave birth to baby fish at a rate of 65% in average on the twelfth day without being spoled. The eggs in the tank containing Malachite Green (X300,000 dilution) gave birth to baby fish at a rate of 45% on the twelfth day. On the other hand, in the tank (E) the water and the eggs gradually underwent spolage, and the rate of hatching on the 12th day was only 10%.

Similar tests using F.R.I. Nos. 2823, 3577, 3578, 4265, 2927 and 2928, and a mixture of F.R.I. Nos. 2544, 2545 and 2546 gave similar results.

EXAMPLE 13

F.R.I. Nos. 4264 and 4265 which are representative examples of those strains capable of being adapted to aerobic, facultatively anaerobic and anaerobic, of growing well at 8° C., 28° C. and 37° C. and of growing very well in sea water were mass-cultured to obtain 3 kg of wet calse. Then, putrid sandy mud was collected from a prawn culture farm.

(a) Test in a Petri Dishes

To 1 kg of the sandy mud was mixed 3 g of wet calse and the mixture was incubated at 28° C. After 3 days purification of the sandy mud was evaluated.

The results obtained are shown in Table 18.

From the results shown in Table 18, it can be seen that the addition of purifying bacterial strains of this invention made purification of the mud proceed effectively. Ammonia nitrogen could be reduced from 200 ppm to below 10 ppm in 72 hours. The content of sulfides was reduced from 300 ppm to 25 ppm or less in 72 hours. Organic carbon content was reduced from 1,000 ppm to 18 ppm or less in 72 hours. COD value changed from 5,000 ppm to 150 ppm or less. The color of the mud changed from black to grey.

TABLE 18

| | Conc. in Putrid Mud | Purifying Bacterial Strain | Cultivation Time (28° C.) | | |
|---|---|---|---|---|---|
| | | | 24 hrs. | 48 hrs. | 72 hrs. |
| Ammonia Nitrogen (NH$_4$—N) | 200 ppm | FRI No. 4264 | 100 ppm | 20 ppm | 3 ppm |
| | | FRI No. 4265 | 120 ppm | 30 ppm | 5 ppm |
| Sulfides | 300 ppm | FRI No. 4264 | 180 ppm | 60 ppm | 15 ppm |
| | | FRI No. 4265 | 200 ppm | 100 ppm | 25 ppm |
| Organic Carbon (Including Lower Fatty Acids) | 1,000 ppm | FRI No. 4264 | 500 ppm | 50 ppm | 10 ppm |
| | | FRI No. 4265 | 500 ppm | 75 ppm | 18 ppm |
| COD Value | 5,000 ppm | FRI No. 4264 | 2,000 ppm | 500 ppm | 100 ppm |
| | | FRI No. 4265 | 2,500 ppm | 750 ppm | 150 ppm |
| Color | black | FRI No. 4264 | Black | Blackish Grey | Gray |
| | | FRI No. 4265 | Black | Blackish Grey | Grey |

(b) Test in Culture Farm

Wet cake (3 kg) of each of the bacterial strains shown in Table 18 above was mixed with 5 kg of perched earth and 3 l of an aqueous 10% starch solution to prepare 10 balls the surfaces of which were covered with clay. The balls thus prepared were embedded in putrid sandy mud of the prawn culture farm in a small depth at a distance of 3 m from each other. The administration of the balls was conducted twice a month and the degree of putrefaction was improved to 1/10 time that of untreated sandy mud. Yield as well as growth of prawn was improved markedly.

EXAMPLE 14

(a) Test in Petri Dishes

Mud on the bed of a pearl oyster culture farm where mass death of pearl oyster occurs very often was collected. Wet cake of F.R.I. No. 4264 (3 kg) was obtained in the same manner as in EXAMPLE 13. To 1 kg of sample mud was mixed with 3 g of the wet cake and the mud was incubated at 28° C. After 4 days, degree of purification was evaluated.

The results obtained are shown in Table 19.

decreased from 40,000 ppm to 250 ppm. The color of the mud was changed from black to grey.

(b) Test in a Pearl Oyster Culture Farm

To 20 kg of putrid mud of a pearl oyster culture farm was mixed with 3 kg of wet cake of F.R.I. No. 4264 and 20 balls were prepared therefrom. The surface of each ball was covered with clay. The balls thus prepared were cast about culture layer. The balls administered were embedded in the bed mud with about ⅛ to ¼ in height. The balls got out of shape in 1 or 2 days. Administration of balls conducted once a week improved the degree of putrefaction of the mud to 1/50 time that of untreated mud on October and November when the degree of putrefaction shows its peak.

The population of common bacteria which was an order of $10^8$ or more before administration of F.R.I. No. 4264 was reduced to an order of $10^7$ or less 2 months after the administration. The cell number of F.R.I. No. 4264 was found to be of an order of $10^6$ and one month after the addition it was unfirmed that the colonies of the purifying bacterial strain was increased very much. On the other hand, no such change was observed in control sample purifying bacterial strain was not added.

Similar results were obtained using F.R.I. Nos. 2823, 3575, 3576, 3577, 3578 and 4265.

Hereafter, consideration is made on what the relationship between the degree of stimulation of growth by S-, N- and C-compounds and purifying ability of bacterial strains is and if purifying ability involves any other factor(s) of practical importance.

TABLE 19

| | Conc. in Putrid Mud | Cultivation Time (28° C.) | | | |
|---|---|---|---|---|---|
| | | 24 hrs. | 48 hrs. | 72 hrs. | 96 hrs. |
| Ammonia Nitrogen (NH$_4$—N) | 500 ppm | 300 ppm | 150 ppm | 70 ppm | 20 ppm |
| Sulfides | 1,200 ppm | 800 ppm | 250 ppm | 100 ppm | 50 ppm |
| Organic Carbon (Including Lower Fatty Acids) | 10,000 ppm | 8,000 ppm | 2,000 ppm | 500 ppm | 100 ppm |
| COD Value | 40,000 ppm | 30,000 ppm | 5,000 ppm | 800 ppm | 250 ppm |
| Color | Black | Black | Black | Blackish Grey | Grey |

It can be seen from the results shown in Table 19 that with the addition of purifying bacterial strains purification proceeded well and that in 96 hours 500 ppm of ammonia nitrogen was reduced to 20 ppm, 1,200 ppm of sulfides were reduced to 50 ppm, 10,000 ppm of organic carbon was reduced to 100 ppm, and COD value was In order to well analyze the above matters, it is believed useful to use various subcultures which are derived from the same parent culture and which have different sensitivities to S-, N- and C-compounds but remain unchanged with respect to other characteristics.

As a result of extensive research a culture medium capable of lowering only the sensitivity to S-, N- and C-compounds of bacterial strains gradually according to subculturing using such medium is repeated has been found. This medium has the following composition.

| Composition of Purifying Ability Lowering Medium | |
|---|---|
| KH$_2$PO$_4$ | 1 g |
| MgSO$_4$.7H$_2$O | 0.7 g |
| NaCl | 1 g |
| (NH$_4$)$_2$HPO$_4$ | 4 g |
| FeSO$_4$.7H$_2$O | 0.03 g |
| Glucose | 5 g |
| Isoleucine | 1 g |

Using the above-described medium various subcultures were obtained from the same bacterial strain and it has been found that there is some parallelism between the degree of stimulation of growth by S-, N- and C-compounds and purifying ability of bacterial strains.

Herein, "S-n" (n is 0 or positive integer) stands for n-th subculture, i.e., subculture obtained after repeating subculturing n times. For example, "S-10" means a tenth subculture. "S-o" means a parent culture.

EXPERIMENT 1

(a) In Test Tubes

In log phase subcultures after 20 hours from the initiation of culturing was added S-, N- or C-compound in an amount of 1 g/l of culture broth (1,000 ppm) and reduction in the amount of S-, N- or C-compound with the passage of time was measured and evaluation of purifying ability was made.

The results obtained are shown in Tables 20-(1), -(2), -(3) and -(4). Since the tendency observed when the S-, N- and C-compounds were added in the induction period and the steady period was basically the same as that observed when they were added in the log phase, the results obtained in the former are not shown in Table 2.

TABLE 20

| Strain (F.R.I. No.) | Compound Added | Purifying Power of the Strains | Degree of Stimulation by the Addition of S—, N—, C—Compounds (% Increase) Basic Medium: [(S—W], 28 °C. Time Elapsed after the Addition (min.) | | | | | | | | | | | | Residual Amount of the S—, N—, C— Compounds Added (ppm) [S—W]28 °C. Cultivation Time (hrs.) | | | |
|---|---|---|---|---|---|---|---|---|---|---|---|---|---|---|---|---|---|---|---|
| | | | 30 | 50 | 90 | 120 | 180 | 240 | 300 | 360 | 420 | 480 | 24 | 48 | 72 | 0 | 24 | 48 | 72 |
| 4264 | S | S-0 | 0 | 4 | 10 | 20 | 38 | 50 | 50 | 50 | 45 | 43 | 40 | 33 | 20 | 1000 | 500 | 20 | 5 |
| | | S-10 | 0 | 4 | 10 | 16 | 30 | 45 | 45 | 45 | 40 | 30 | 20 | 15 | 10 | 1000 | 500 | 50 | 10 |
| | | S-15 | 0 | 2.4 | 9 | 15 | 26 | 36 | 37 | 38 | 35 | 25 | 15 | 10 | 8 | 1000 | 600 | 200 | 50 |
| | | S-20 | 0 | 2.4 | 5 | 10 | 14 | 15 | 15 | 15 | 10 | 8 | 10 | 5 | 0 | 1000 | 800 | 500 | 200 |
| | | S-30 | 0 | 1.5 | 5 | 10 | 12 | 10 | 10 | 10 | 8 | 8 | 8 | 5 | 0 | 1000 | 900 | 700 | 200 |
| | | S-40 | 0 | 1.5 | 5 | 8 | 6 | 6 | 6 | 4 | 3 | 3 | 0 | 0 | 0 | 1000 | 900 | 800 | 300 |
| | | S-50 | 0 | 1 | 0 | 0 | 0 | 0 | 0 | 0 | 0 | 0 | 0 | 0 | 0 | 1000 | 1000 | 1000 | 900 |
| | | S-60 | 0 | 0 | 0 | 0 | 0 | 0 | 0 | 0 | 0 | 0 | 0 | 0 | 0 | 1000 | 1000 | 1000 | 1000 |
| | N | S-0 | 0 | 3 | 8 | 15 | 30 | 36 | 40 | 35 | 25 | 20 | 20 | 20 | 15 | 1000 | 500 | 50 | 20 |
| | | S-10 | 0 | 3 | 6 | 10 | 20 | 23 | 30 | 30 | 20 | 15 | 15 | 15 | 10 | 1000 | 500 | 50 | 20 |
| | | S-15 | 0 | 1.5 | 5 | 7 | 12 | 15 | 20 | 20 | 10 | 10 | 10 | 10 | 8 | 1000 | 500 | 200 | 50 |
| | | S-20 | 0 | 1.5 | 5 | 7 | 6 | 6 | 6 | 3 | 3 | 3 | 3 | 3 | 0 | 1000 | 700 | 400 | 200 |
| | | S-30 | 0 | 1.5 | 3 | 5 | 6 | 6 | 6 | 3 | 2 | 1 | 1 | 1 | 0 | 1000 | 900 | 600 | 200 |
| | | S-40 | 0 | 1.5 | 3 | 3 | 3 | 6 | 4 | 2 | 1 | 0 | 0 | 0 | 0 | 1000 | 900 | 800 | 300 |
| | | S-50 | 0 | 2.5 | 2 | 1 | 0 | 0 | 0 | 0 | 0 | 0 | 0 | 0 | 0 | 1000 | 1000 | 900 | 800 |
| | | S-60 | 0 | 1.6 | 1 | 0 | 0 | 0 | 0 | 0 | 0 | 0 | 0 | 0 | 0 | 1000 | 1000 | 1000 | 900 |
| | C | S-0 | 0 | 8 | 20 | 50 | 70 | 100 | 90 | 80 | 70 | 60 | 50 | 50 | 40 | 1000 | 400 | 50 | 10 |
| | | S-10 | 0 | 6 | 20 | 40 | 50 | 80 | 70 | 60 | 60 | 45 | 40 | 40 | 30 | 1000 | 400 | 50 | 10 |
| | | S-15 | 0 | 6 | 16 | 20 | 50 | 65 | 65 | 50 | 40 | 35 | 35 | 30 | 20 | 1000 | 500 | 150 | 50 |
| | | S-20 | 0 | 6 | 9 | 15 | 25 | 35 | 35 | 30 | 15 | 11 | 12 | 10 | 5 | 1000 | 500 | 200 | |
| | | S-30 | 0 | 6 | 7 | 10 | 15 | 15 | 15 | 10 | 10 | 6 | 5 | 5 | 3 | 1000 | 600 | 300 | 200 |
| | | S-40 | 0 | 5 | 5 | 8 | 10 | 12 | 12 | 7 | 7 | 4 | 3 | 3 | 0 | 1000 | 700 | 500 | 300 |
| | | S-50 | 0 | 4 | 3 | 0 | 0 | 0 | 0 | 0 | 0 | 0 | 0 | 0 | 0 | 1000 | 900 | 700 | 400 |
| | | S-60 | 0 | 2.5 | 2 | 1 | 0 | 0 | 0 | 0 | 0 | 0 | 0 | 0 | 0 | 1000 | 1000 | 900 | 700 |
| 3575 | S | S-0 | 0 | 5 | 10 | 15 | 20 | 43 | 44 | 40 | 35 | 33 | 35 | 30 | 20 | 1000 | 500 | 50 | 10 |
| | | S-10 | 0 | 5 | 10 | 14 | 15 | 35 | 40 | 35 | 30 | 25 | 25 | 25 | 15 | 1000 | 500 | 100 | 20 |
| | | S-15 | 0 | 5 | 8 | 11 | 11 | 20 | 20 | 24 | 22 | 20 | 20 | 20 | 8 | 1000 | 700 | 100 | 40 |
| | | S-20 | 0 | 5 | 8 | 10 | 10 | 10 | 10 | 10 | 10 | 8 | 8 | 8 | 0 | 1000 | 800 | 500 | 200 |
| | | S-25 | 0 | 3 | 5 | 7 | 7 | 7 | 5 | 3 | 0 | 0 | 0 | 0 | 0 | 1000 | 900 | 700 | 300 |
| | | S-30 | 0 | 3 | 5 | 0 | 0 | 0 | 0 | 0 | 0 | 0 | 0 | 0 | 0 | 1000 | 1000 | 900 | 800 |
| | | S-35 | 0 | 0.5 | 0 | 0 | 0 | 0 | 0 | 0 | 0 | 0 | 0 | 0 | 0 | 1000 | 1000 | 1000 | 900 |
| | N | S-0 | 0 | 5 | 10 | 20 | 30 | 53 | 50 | 50 | 45 | 40 | 35 | 35 | 30 | 1000 | 500 | 50 | 20 |
| | | S-10 | 0 | 5 | 8 | 15 | 25 | 45 | 45 | 40 | 35 | 35 | 30 | 25 | 20 | 1000 | 500 | 100 | 20 |
| | | S-15 | 0 | 3 | 6 | 15 | 20 | 35 | 20 | 24 | 22 | 20 | 20 | 15 | 8 | 1000 | 500 | 100 | 20 |
| | | S-20 | 0 | 2 | 4 | 10 | 15 | 15 | 15 | 10 | 10 | 10 | 10 | 8 | 5 | 1000 | 700 | 300 | 100 |
| | | S-25 | 0 | 2 | 4 | 7 | 10 | 10 | 10 | 7 | 5 | 5 | 5 | 0 | 0 | 1000 | 900 | 500 | 200 |
| | | S-30 | 0 | 1.5 | 1 | 1 | 0 | 0 | 0 | 0 | 0 | 0 | 0 | 0 | 0 | 1000 | 1000 | 900 | 600 |
| | | S-35 | 0 | 1.5 | 1 | 0.5 | 0 | 0 | 0 | 0 | 0 | 0 | 0 | 0 | 0 | 1000 | 1000 | 900 | 800 |
| | C | S-0 | 0 | 10 | 20 | 40 | 50 | 80 | 80 | 70 | 70 | 60 | 60 | 50 | 50 | 1000 | 500 | 50 | 10 |
| | | S-10 | 0 | 10 | 20 | 35 | 40 | 60 | 60 | 50 | 50 | 40 | 40 | 30 | 30 | 1000 | 500 | 50 | 10 |
| | | S-15 | 0 | 5 | 15 | 18 | 27 | 50 | 45 | 40 | 35 | 33 | 35 | 26 | 20 | 1000 | 500 | 300 | 100 |
| | | S-20 | 0 | 5 | 10 | 12 | 12 | 13 | 15 | 15 | 13 | 10 | 10 | 10 | 10 | 1000 | 700 | 300 | 200 |
| | | S-25 | 0 | 3 | 5 | 5 | 10 | 10 | 10 | 10 | 10 | 8 | 5 | 5 | 5 | 1000 | 700 | 400 | 300 |
| | | S-30 | 0 | 4 | 5 | 5 | 5 | 5 | 5 | 5 | 5 | 5 | 3 | 2 | 1 | 1000 | 900 | 800 | 600 |
| | | S-35 | 0 | 15 | 2 | 2 | 1 | 1 | 1 | 0 | 0 | 0 | 0 | 0 | 0 | 1000 | 1000 | 900 | 800 |
| 3576 | S | S-0 | 0 | 5 | 7 | 15 | 30 | 52 | 55 | 50 | 40 | 40 | 35 | 35 | 25 | 1000 | 500 | 50 | 5 |
| | | S-10 | 0 | 4 | 7 | 12 | 25 | 50 | 40 | 40 | 30 | 30 | 30 | 25 | 20 | 1000 | 500 | 50 | 10 |
| | | S-15 | 0 | 3 | 5 | 10 | 15 | 35 | 35 | 30 | 25 | 25 | 25 | 20 | 15 | 1000 | 700 | 100 | 50 |
| | | S-20 | 0 | 2 | 3 | 5 | 10 | 20 | 20 | 15 | 10 | 10 | 8 | 7 | 5 | 1000 | 800 | 500 | 200 |
| | | S-25 | 0 | 2 | 3 | 4 | 7 | 13 | 10 | 10 | 5 | 5 | 3 | 3 | 2 | 1000 | 900 | 500 | 200 |
| | | S-30 | 0 | 1.3 | 1 | 0 | 0 | 0 | 0 | 0 | 0 | 0 | 0 | 0 | 0 | 1000 | 1000 | 900 | 800 |

TABLE 20-continued

| Strain (F.R.I. No.) | Compound Added | Purifying Power of the Strains | Degree of Stimulation by the Addition of S—, N—, C—Compounds (% Increase) Basic Medium: [(S—W], 28 °C. Time Elapsed after the Addition (min.) | | | | | | | | | | | | Residual Amount of the S—, N—, C—Compounds Added (ppm) [S—W]28 °C. Cultivation Time (hrs.) | | | |
|---|---|---|---|---|---|---|---|---|---|---|---|---|---|---|---|---|---|---|
| | | | 30 | 50 | 90 | 120 | 180 | 240 | 300 | 360 | 420 | 480 | 24 | 48 | 72 | 0 | 24 | 48 | 72 |
| | | S-35 | 0 | 0.5 | 0 | 0 | 0 | 0 | 0 | 0 | 0 | 0 | 0 | 0 | 0 | 1000 | 1000 | 1000 | 900 |
| | N | S-0 | 0 | 4 | 6 | 15 | 30 | 50 | 50 | 45 | 40 | 40 | 35 | 35 | 25 | 1000 | 300 | 50 | 20 |
| | | S-10 | 0 | 3 | 5 | 10 | 20 | 40 | 40 | 35 | 30 | 30 | 25 | 25 | 20 | 1000 | 500 | 50 | 20 |
| | | S-15 | 0 | 2 | 4 | 8 | 10 | 30 | 30 | 25 | 20 | 20 | 20 | 15 | 10 | 1000 | 600 | 200 | 50 |
| | | S-20 | 0 | 2 | 2 | 5 | 7 | 15 | 15 | 15 | 10 | 10 | 10 | 8 | 5 | 1000 | 800 | 400 | 200 |
| | | S-25 | 0 | 2 | 2 | 3 | 4 | 5 | 5 | 5 | 5 | 5 | 2 | 1 | 0 | 1000 | 900 | 500 | 200 |
| | | S-30 | 0 | 1.3 | 1 | 0.5 | 0 | 0 | 0 | 0 | 0 | 0 | 0 | 0 | 0 | 1000 | 1000 | 800 | 400 |
| | | S-35 | 0 | 0 | 0 | 0 | 0 | 0 | 0 | 0 | 0 | 0 | 0 | 0 | 0 | 1000 | 1000 | 1000 | 1000 |
| | C | S-0 | 0 | 8 | 15 | 25 | 40 | 55 | 60 | 55 | 55 | 50 | 40 | 40 | 40 | 1000 | 300 | 50 | 10 |
| | | S-10 | 0 | 8 | 15 | 25 | 40 | 55 | 60 | 55 | 50 | 50 | 35 | 35 | 30 | 1000 | 400 | 50 | 10 |
| | | S-15 | 0 | 5 | 10 | 20 | 35 | 50 | 50 | 50 | 40 | 35 | 30 | 30 | 25 | 1000 | 500 | 300 | 100 |
| | | S-20 | 0 | 3 | 6 | 10 | 20 | 25 | 25 | 25 | 20 | 15 | 10 | 10 | 10 | 1000 | 500 | 300 | 200 |
| | | S-25 | 0 | 3 | 5 | 7 | 10 | 20 | 15 | 15 | 10 | 10 | 5 | 5 | 5 | 1000 | 700 | 500 | 200 |
| | | S-30 | 0 | 1.3 | 2 | 4 | 5 | 0 | 0 | 0 | 0 | 0 | 0 | 0 | 0 | 1000 | 900 | 700 | 500 |
| | | S-35 | 0 | 1 | 1 | 0 | 0 | 0 | 0 | 0 | 0 | 0 | 0 | 0 | 0 | 1000 | 1000 | 1000 | 1000 |
| 3577 | S | S-0 | 0 | 5 | 7 | 15 | 30 | 50 | 54 | 50 | 40 | 42 | 40 | 35 | 20 | 1000 | 500 | 40 | 5 |
| | | S-10 | 0 | 5 | 6 | 10 | 20 | 40 | 37 | 36 | 35 | 31 | 35 | 30 | 15 | 1000 | 500 | 50 | 10 |
| | | S-15 | 0 | 3 | 6 | 10 | 13 | 30 | 30 | 33 | 26 | 27 | 26 | 20 | 15 | 1000 | 600 | 200 | 50 |
| | | S-20 | 0 | 3 | 6 | 10 | 13 | 19 | 20 | 20 | 20 | 20 | 20 | 15 | 0 | 1000 | 800 | 500 | 200 |
| | | S-25 | 0 | 2 | 4 | 7 | 9 | 11 | 16 | 15 | 11 | 9 | 10 | 8 | 0 | 1000 | 900 | 600 | 300 |
| | | S-30 | 0 | 2 | 4 | 0 | 0 | 0 | 0 | 0 | 0 | 0 | 0 | 0 | 0 | 1000 | 900 | 600 | 300 |
| | | S-35 | 0 | 0 | 0 | 0 | 0 | 0 | 0 | 0 | 0 | 0 | 0 | 0 | 0 | 1000 | 1000 | 1000 | 1000 |
| | N | S-0 | 0 | 4 | 6 | 10 | 25 | 40 | 45 | 45 | 35 | 35 | 30 | 25 | 20 | 1000 | 300 | 50 | 20 |
| | | S-10 | 0 | 4 | 5 | 8 | 20 | 30 | 35 | 40 | 30 | 25 | 20 | 15 | 10 | 1000 | 500 | 50 | 20 |
| | | S-15 | 0 | 2 | 4 | 7 | 9 | 12 | 16 | 12 | 11 | 10 | 10 | 8 | 5 | 1000 | 500 | 200 | 50 |
| | | S-20 | 0 | 2 | 4 | 7 | 6 | 10 | 8 | 10 | 8 | 7 | 7 | 5 | 0 | 1000 | 700 | 500 | 200 |
| | | S-25 | 0 | 2 | 3 | 5 | 5 | 5 | 5 | 5 | 4 | 3 | 3 | 3 | 0 | 1000 | 900 | 600 | 200 |
| | | S-30 | 0 | 1 | 0.8 | 0.5 | 0 | 0 | 0 | 0 | 0 | 0 | 0 | 0 | 0 | 1000 | 900 | 600 | 300 |
| | | S-35 | 0 | 0 | 0 | 0 | 0 | 0 | 0 | 0 | 0 | 0 | 0 | 0 | 0 | 1000 | 1000 | 1000 | 1000 |
| | C | S-0 | 0 | 10 | 15 | 30 | 45 | 75 | 75 | 75 | 60 | 50 | 50 | 45 | 40 | 1000 | 300 | 50 | 10 |
| | | S-10 | 0 | 8 | 10 | 25 | 40 | 65 | 65 | 65 | 50 | 45 | 45 | 40 | 35 | 1000 | 300 | 50 | 10 |
| | | S-15 | 0 | 5 | 7 | 15 | 30 | 50 | 60 | 50 | 40 | 42 | 40 | 35 | 30 | 1000 | 400 | 200 | 50 |
| | | S-20 | 0 | 5 | 6 | 10 | 13 | 22 | 24 | 20 | 20 | 20 | 20 | 15 | 8 | 1000 | 500 | 300 | 200 |
| | | S-25 | 0 | 3 | 5 | 7 | 10 | 15 | 17 | 15 | 15 | 12 | 10 | 7 | 5 | 1000 | 500 | 300 | 200 |
| | | S-30 | 0 | 3 | 4 | 5 | 7 | 10 | 10 | 7 | 7 | 5 | 5 | 3 | 2 | 1000 | 600 | 500 | 300 |
| | | S-35 | 0 | 2 | 2 | 0 | 0 | 0 | 0 | 0 | 0 | 0 | 0 | 0 | 0 | 1000 | 900 | 800 | 700 |

The determination of the residual S-, N- and C-compounds was made by adding 1000 ppm each of the representative S-, N- and C-compounds mentioned above at the start of the cultivation of the various strains, and observing the decreases of these substances with the passage of the cultivation time. In a S-0 subculture of F.R.I. No. 4264, the amount of Na$_2$S.9H$_2$O) rapidly decreased to 5 ppm at the end of 72 hours from the original 1000 ppm. In the S-20 subculture, the S-compound remained in an amount of 200 ppm, and in the S-60 subculture, the S-compound remained in a concentration of 1000 ppm. This means that the S-60 subculture could not at all denature, decompose or assimilate the S-compound initially added.

This shows that the S-0 subculture has a very high purifying action on H$_2$S which is the final decomposition product of an organism, whereas the S-60 strain did not at all perform its purification.

Substantially the same phenomenon can be observed with regard to ammonia and butyric acid.

The important phenomenon shown in Table 18-(1), -(2), -(3) and -(4) exists with regard to the relation of microorganisms to purification. This will be described below with regard to an F.R.I. No. 4264 strain.

When eight subcultures differing from each other in purifying ability and prepared artificially were cultivated in the [S—W] medium, the following phenomena were observed.

(a) As is clear from 1 of Table 18-(1), a culture broth for S-0 subculture which contained 1 g of Na$_2$S.9H$_2$O as the S-compound per liter of the culture broth increased in the number of bacterial cells by 4% after 50 minutes from the addition of the S-compound over the number of bacterial cells in the control with the same cultivation time. The number of bacterial cells further increased by 10% at the end of 90 minutes, by 20% at the end of 120 minutes, and by 38% at the end of 180 minutes. Furthermore, at the end of 240 minutes, 300 minutes and 360 minutes, the increase was 50%, showing a wider difference in bacterial concentration from the control. However, on further cultivation, the number of bacterial cells increased by 45% at the end of 420 minutes and by 43% at the end of 480 minutes, showing a gradually narrowing range of the concentration difference. At the end of 24 hours, the increase was 40%, and at the end of 48 hours, the increase was 33%. The increase became only 20% at the end of 72 hours.

With the S-10 substrate, the cell concentration in the culture broth was slightly lower than in the case of the S-0 subculture. However, the change in the cell concentration was considerably similar to that in the case of the S-0 subculture.

The S-15 subculture was less stimulated than the S-10 subculture. The S-20 subculture was much less stimulated than S-15 subculture, but at the end of 300 minutes and 360 minutes, the stimulation increased by 15%.

The S-50 subculture showed an increase of 1% in cell concentration when it was measured 50 minutes after the addition of the S-compound. Measurement after that time showed that the cell concentration was quite the same as in the case of the control. The S-60 subculture showed the same state as the control.

It has been made clear that such a phenomenon is much the same in the case of ammonia and butyric acid.

The following conclusions can be drawn from the above experimental facts.

[I] When strains of the same species were examined, strains having stronger purifying power have higher sensitivity to the S-, N- and C-compounds and undergo stronger growth stimulation, and therefore, more rapidly consume a greater number of the S-, N- and C-compounds added at the start of cultivation.

[II] When strains of the same species were examined, strains having lower purifying power consume less amounts of the S-, N- and C-compounds and are stimulated less.

[III] The S-20 subculture or the S-30 subculture, for example, has some degree of sensitivity to the S-, N- and C-compounds. Such a strain slowly consumes the S-, N- and C-compounds added at the start of cultivation, and the amounts of these compounds consumed decrease.

[IV] In other words, although such a strain still has a purifying action, the purifying action differs greatly from that of the S-0 and S-15 subcultures.

[V] When the S-, N- and C-compounds are added during the induction phase or stationary phase, the reaction of microorganisms against growth stimulation and purification show the same basic pattern.

[VI] The above conclusions were obtained without exception in any experiments on purification using a great number of strains. This may be said to be an important basic finding regarding purification, which is one of the most important factors in the problem of environmental pollution.

As can be seen from the above description that the conditions which microorganisms should have in order to be useful for purifying water system containing substances derived from organisms are not determined from the taxonomical position of the microorganisms concerned, which will be clear from the results shown in Tables 20-(1), -(2), -(3) and -(4). For example, F.R.I. No. 4264 shows decreased purifying ability by subculturing using a special medium and loses completely its purifying ability by further subculturing in the end.

EXPERIMENT 2

High Nutrition Contaminated Water

This example shows an experiment of purifying contaminated water of high nutrition in a water tank.

F.R.I. No. 4264 was subcultured using the purifying ability lowering medium described hereinbefore to obtain various subcultures having different purifying ability.

Well water contaminated with soil and sand was placed into water tanks equipped with a filter (average water temperature 20° C.) in an amount of 25 liters for each tank. The COD values of the water in these tanks and the total number of bacterial cells per cc of the well water were measured. Then, 1 g/liter of soybean whey as a nutrient was added to grow common bacteria. During their growth, the water was examined in the aforementioned manner. After a lapse of 5 days, each of the purifying bacterial strains (subcultures) indicated in Table 21 was added in a concentration of $1 \times 10^8$/liter. Five days later, the same bacteria strains were again added, and the number of common bacterial cells and the purifying strain cells in the water and the COD value of water (chrome method) were measured. The results are shown in Table 21.

TABLE 21

| | Sample I | | | Sample II | | | Sample III | | |
|---|---|---|---|---|---|---|---|---|---|
| | S-0 | C.B.C./cc* | COD | S-15 | C.B.C./cc* | COD | S-20 | C.B.C./cc* | COD |
| Well Water | | $2 \times 10^6$ | 7 | | $2 \times 10^6$ | 7 | | $2 \times 10^6$ | 7 |
| 5 days after addition of nutrient | | $2 \times 10^8$ | 500 | | $2 \times 10^8$ | 500 | | $2 \times 10^8$ | 500 |
| Addition of purifying strain (1st) | $1 \times 10^8$ | | | $1 \times 10^8$ | | | $1 \times 10^8$ | | |
| 1 day after addition | $2 \times 10^8$ | $5 \times 10^7$ | 300 | $2 \times 10^8$ | $1 \times 10^8$ | 300 | $2 \times 10^8$ | $1 \times 10^8$ | 400 |
| 3 days after addition | $2.5 \times 10^8$ | $2 \times 10^6$ | 100 | $2 \times 10^8$ | $5 \times 10^6$ | 150 | $2 \times 10^8$ | $5 \times 10^7$ | 300 |
| 5 days after addition | $5 \times 10^7$ | $3 \times 10^5$ | 25 | $3 \times 10^7$ | $1 \times 10^6$ | 50 | $1 \times 10^7$ | $5 \times 10^6$ | 250 |
| Addition of purifying strain (2nd) | $1 \times 10^8$ | | | $1 \times 10^8$ | | | $1 \times 10^8$ | | |
| 1 day after addition | $1 \times 10^8$ | $1 \times 10^5$ | 20 | $1 \times 10^8$ | $3 \times 10^5$ | 50 | $1 \times 10^8$ | $3 \times 10^6$ | 200 |
| 3 days after addition | $5 \times 10^6$ | $1 \times 10^5$ | 15 | $5 \times 10^6$ | $3 \times 10^5$ | 40 | $5 \times 10^6$ | $2 \times 10^6$ | 100 |
| 5 days after addition | $1 \times 10^6$ | $5 \times 10^4$ | 10 | $1 \times 10^6$ | $1 \times 10^5$ | 30 | $1 \times 10^6$ | $1 \times 10^6$ | 80 |
| 10 days after addition | $1 \times 10^6$ | $5 \times 10^4$ | 12 | $1 \times 10^6$ | $1 \times 10^5$ | 20 | $1 \times 10^5$ | $1 \times 10^6$ | 70 |
| 15 days after addition | $5 \times 10^5$ | $1 \times 10^5$ | 12 | $5 \times 10^5$ | $1 \times 10^5$ | 20 | $1 \times 10^5$ | $1 \times 10^6$ | 70 |

| | Sample IV | | | Sample V | | |
|---|---|---|---|---|---|---|
| | S-50 | C.B.C./cc* | COD | S-60 | C.B.C./cc* | COD |
| Well Water | | $2 \times 10^6$ | 7 | | $2 \times 10^6$ | 7 |
| 5 days after addition of nutrient | | $2 \times 10^8$ | 500 | | $2 \times 10^8$ | 500 |
| Addition of purifying strain (1st) | $1 \times 10^8$ | | | $1 \times 10^8$ | | |
| 1 day after addition | $2 \times 10^8$ | $1 \times 10^8$ | 400 | $2 \times 10^8$ | $1 \times 10^8$ | 500 |
| 3 days after addition | $2 \times 10^8$ | $6 \times 10^7$ | 300 | $1 \times 10^8$ | $6 \times 10^7$ | 450 |
| 5 days after addition | $1 \times 10^7$ | $1 \times 10^7$ | 250 | $1 \times 10^7$ | $2 \times 10^7$ | 400 |
| Addition of purifying strain (2nd) | $1 \times 10^8$ | | | $1 \times 10^8$ | | |
| 1 day after addition | $1 \times 10^8$ | $5 \times 10^6$ | 200 | $5 \times 10^7$ | $1 \times 10^7$ | 400 |
| 3 days after addition | $5 \times 10^6$ | $3 \times 10^6$ | 150 | $5 \times 10^6$ | $5 \times 10^6$ | 350 |
| 5 days after addition | $1 \times 10^6$ | $1 \times 10^6$ | 150 | $1 \times 10^6$ | $2 \times 10^6$ | 300 |
| 10 days after addition | $1 \times 10^5$ | $1 \times 10^6$ | 100 | $1 \times 10^5$ | $2 \times 10^6$ | 300 |
| 15 days after addition | $1 \times 10^5$ | $1 \times 10^6$ | 100 | $1 \times 10^5$ | $2 \times 10^6$ | 200 |

*"C.B.C./cc" stands for Common Bacteria Cells/cc.

From the results shown in Table 21 it can be seen that when the S-0 subculture having a high purifying ability was added in an amount of $1 \times 10^8$ cells/cc of tank water COD value was improved to 25 to 30 ppm and population of common bacteria became of an order of $10^5$ cells/cc of tank water 5 days after the addition of the subculture. With another addition of purifying strain on fifth day led to further improvement of the quality of water (COD value: 10–15 ppm).

It can be seen that the addition of S-15 subculture resulted in good purification of water (final COD value: 20 ppm) although purifying power was somewhat weaker than S-0 subculture.

On the other hand, it is apparent that when S-20 subculture was used decrease in COD value remained at a level of 250 ppm 5 days after the addition thereof. Another administration reduced COD value only to 100 ppm. It follows from this that purifying ability of S-20 subculture was much lower than that of S-0 subculture. Further, S-50 subculture was of purifying ability by far lower than that of S-20 subculture. S-60 subculture lost purifying ability completely.

EXPERIMENT 3

In a tank equipped with a filter (water temperature) was charged 25 l of artificial sea water in which 10 young parrot fishes (average length: 5 cm) were bred with feeding flesh of sea shells or shrimp a few times a day. Water level was kept constant by supplementing tap water to make up water deficit due to evaporation. At the initiation of breeding was added dry cells of S-0, S-15 and S-20 subcultures of F.R.I. No. 3575 in an amount of 0.1 g/l of water. Thereafter the same amount of the bacterial strain was added once a month the COD value of water and population of common bacteria were measured three times every month and average values were calculated.

The results obtained are shown in Table 22.

TABLE 22

| Sub-culture Added | | Time Lapsed after Addition of Purifying Bacterial Strain | | | | | |
|---|---|---|---|---|---|---|---|
| | | 1 Month | 2 Months | 3 Months | 4 Months | 5 Months | 6 Months |
| S-0 | C.B.C./cc | $1.5 \times 10^6$ | $2 \times 10^6$ | $2 \times 10^6$ | $1.5 \times 10^6$ | $2 \times 10^6$ | $2.2 \times 10^6$ |
| | COD Value | 12 ppm | 15 ppm | 15 ppm | 20 ppm | 18 ppm | 18 ppm |
| | Average Length | 5.2 cm | 5.4 cm | 5.7 cm | 6 cm | 6.2 cm | 6.5 cm |
| | Number of Dead Fish | 0 | 0 | 0 | 0 | 0 | 1 |
| S-15 | C.B.C./cc | $2 \times 10^6$ | $2 \times 10^6$ | $2 \times 10^6$ | $2 \times 10^6$ | $3 \times 10^6$ | $3 \times 10^6$ |
| | COD Value | 15 ppm | 20 ppm | 20 ppm | 20 ppm | 20 ppm | 25 ppm |
| | Average Length | 5.2 cm | 5.4 cm | 5.7 cm | 5.9 cm | 6.1 cm | 6.3 cm |
| | Number of Dead Fish | 0 | 0 | 0 | 1 | 1 | 0 |
| S-20 | C.B.C./cc | $3 \times 10^6$ | $3 \times 10^6$ | $4 \times 10^6$ | $4.5 \times 10^6$ | $4 \times 10^6$ | $4 \times 10^6$ |
| | COD Value | 30 ppm | 40 ppm | 50 ppm | 70 ppm | 80 ppm | 75 ppm |
| | Average Length | 5.1 cm | 5.3 cm | 5.5 cm | 5.7 cm | 5.9 cm | 6 cm |
| | Number of Dead Fish | 1 | 1 | 0 | 1 | 1 | 1 |
| S-25 | C.B.C./cc | $5 \times 10^6$ | $5 \times 10^6$ | $7 \times 10^6$ | $7 \times 10^6$ | $6 \times 10^6$ | $6 \times 10^6$ |
| | COD Value | 50 ppm | 70 ppm | 100 ppm | 100 ppm | 120 ppm | 150 ppm |
| | Average Length | 5.1 cm | 5.3 cm | 5.5 cm | 5.7 cm | 5.9 cm | 6 cm |
| | Number of Dead Fish | 1 | 2 | 1 | 0 | 1 | 1 |
| S-35 | C.B.C./cc | $1 \times 10^7$ | $2 \times 10^7$ | | | | |
| | COD Value | 150 ppm | 200 ppm | | | | |
| | Average Length | 5.1 cm | 5.3 cm | | | | |
| | Number of Dead Fish | 6 | 4 | | | | |

Note
"C.B.C./cc" stands for Common Bacterial Cells/cc of water

It is apparent from the results shown in Table 22 that with the addition of S-0 subculture the population of common bacteria did not change in a substantial manner ($1 \times 10^6$ to $2 \times 10^6$/ml of water) even up to 6 months and the COD value remained within the range of 10 to 20 ppm (chrome method).

Similar tendency was observed when S-15 subculture was added although the quality of water was slightly worse than the case where S-0 subculture was used.

On the contrary, in the tank in which S-20 subculture was added, the population of common bacteria was considerably large ($4 \times 10^6$ to $5 \times 10^6$ cells/ml of water) throughout the breeding period and COD value increased slowly (80 ppm) leading to high death ratio of parrot fish. This means that S-20 subculture are much less effective than S-0 and S-15 subcultures.

S-25 subculture was less effective than S-20 subculture although it still had a weak purifying power.

S-35 subculture did not show any purifying activity at 1.

Similar experiments using S-0, S-10, S-15 and S-20 subcultures of F.R.I. Nos. 3576, 3577, 3578 and 4264 were conducted in the same manner as above. The results obtained are similar to those obtained with F.R.I. No. 3575.

EXPERIMENT 4

Contaminated sea water (25 liters) was placed in a water tank equipped with a filter (water temperature 25° C.), and the COD of the sea water and the total number of bacterial cells per cc of the sea water were measured. Immediately than, 1 g/liter of soybean whey and 20 g of the entrails of mackerel were thrown into the tank as nutrient to grow common bacteria intentionally. During the growth, the water was examined in the above manner. Then, S-0, S-15 and S-20 subcultures of F.R.I. No. 3576 and S-0, S-15 and S-25 subcultures of F.R.I. No. 3577 were added in a concentration of $1 \times 10^8$/cc.

Five days later, the same purifying strain was added again in a concentration of $10^8$/cc. The numbers of the purifying bacterial cells and the common bacterial cells in the sea water and the COD/Cr of the sea water were measured. The results are shown in Tables 23-(1) and -(2).

Other purifying bacterial strains tested also showed a similar tendency in water treatment excepting F.R.I. Nos. 2927 and 2928 which were a little less effective than the other strains.

For example, S-15 subculture reduced the amount of 1,000 ppm of S-, N- or C- to about 50 ppm in 72 hours. This gives practically satisfactory purification. In contrast, S-20 subculture reduced the amount of S-, N- or C-compound to 200 ppm from the original 1,000 ppm.

Therefore, a clear line can be drawn between those subcultures having strong purifying ability such as S-0, S-10 and S-15 subcultures and those subcultures having only weak purifying ability such as S-20 and S-25 subcultures, etc.

Relationship between purifying ability and times of subculturing will be expalined in greater detail with reference to accompanying drawings.

As will be clear from FIG. 1, S-0, S-10 and S-15 subcultures can assimilate S-, N- and C-compounds very well, while S-25 subculture cannot assimilate them so well.

Figure 2:
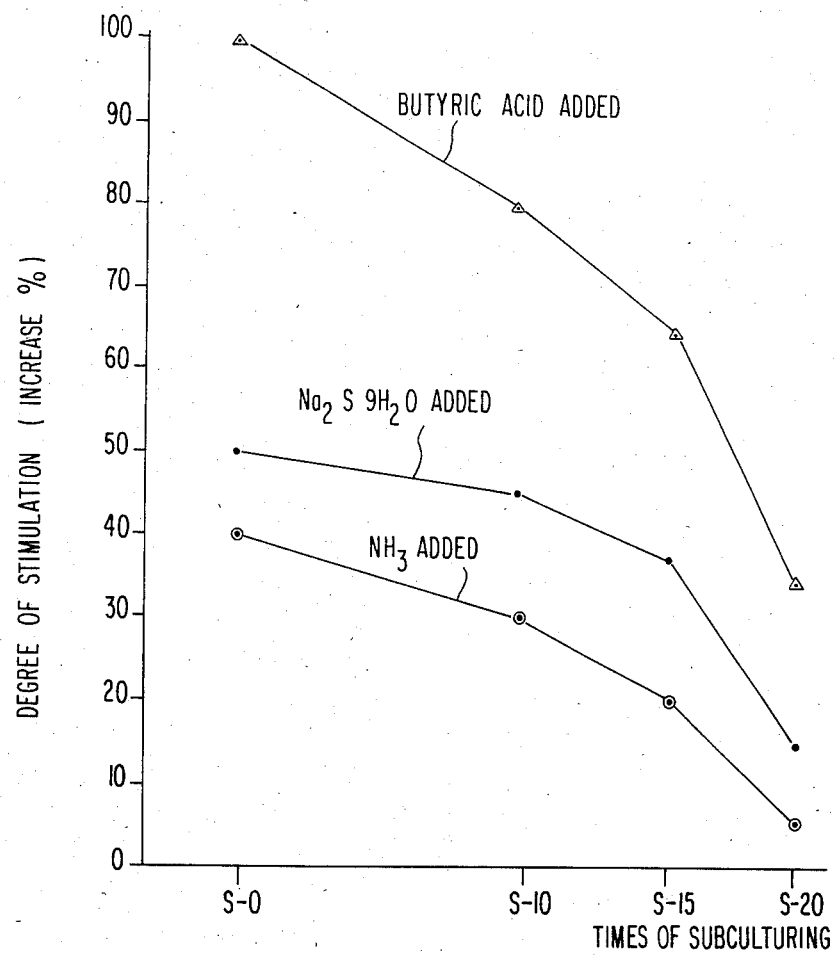
FIG. 2 is a graph showing relationship between growth stimulation with S-, N- and C-compounds and time of subculturing.

It is apparent from FIG. 2 that the line connecting S-15 and S-20 subcultures is so steep, which shows that S-, N-, and C-stimulations are reduced rapidly.

To analyze the above-described phenomenon, the following procedure will be helpful.

(A): Relation Between the Purifying Action and the Number of Bacterial Cells

TABLE 23

| | S-0 | C.B.C./cc* | COD (ppm) | S-15 | C.B.C./cc* | COD (ppm) | S-20 | C.B.C./cc* | COD (ppm) |
|---|---|---|---|---|---|---|---|---|---|
| | | | | F.R.I. No. 3576 | | | | | |
| Well Water | — | $1 \times 10^7$ | 8 | — | $1 \times 10^7$ | 8 | — | $1 \times 10^7$ | 8 |
| 5 days after Addition of Nutrient | — | $3 \times 10^8$ | 1000 | — | $3 \times 10^8$ | 1000 | — | $3 \times 10^8$ | 1000 |
| Addition of Purifying Strain (1st) | $1 \times 10^8$ | — | — | $1 \times 10^8$ | — | — | $1 \times 10^8$ | — | — |
| 1 Day after Addition | — | $1 \times 10^8$ | 500 | — | $1 \times 10^8$ | 600 | — | $2 \times 10^8$ | 800 |
| 3 Days after Addition | — | $1 \times 10^7$ | 300 | — | $2 \times 10^7$ | 400 | — | $5 \times 10^7$ | 600 |
| 5 Days after Addition | — | $1 \times 10^6$ | 100 | — | $2 \times 10^6$ | 150 | — | $1 \times 10^7$ | 400 |
| Addition of Purifying Strain (2nd) | $1 \times 10^8$ | — | — | $1 \times 10^8$ | — | — | $1 \times 10^8$ | — | — |
| 1 Day after Addition | — | $1 \times 10^5$ | 50 | — | $1 \times 10^6$ | 70 | — | $1 \times 10^7$ | 200 |
| 3 Days after Addition | — | $1 \times 10^5$ | 15 | — | $5 \times 10^5$ | 30 | — | $5 \times 10^6$ | 150 |
| 5 Days after Addition | — | $2 \times 10^5$ | 10 | — | $5 \times 10^5$ | 20 | — | $2 \times 10^6$ | 100 |
| 10 Days after Addition | — | $2 \times 10^5$ | 10 | — | $5 \times 10^5$ | 20 | — | $2 \times 10^6$ | 100 |
| | | | | F.R.I. No. 3577 | | | | | |
| Well Water | — | $1 \times 10^7$ | 8 | — | $1 \times 10^7$ | 8 | — | $1 \times 10^7$ | 8 |
| 5 Days after Addition of Nutrient | — | $3 \times 10^8$ | 1000 | — | $3 \times 10^8$ | 1000 | — | $3 \times 10^8$ | 1000 |
| Addition of Purifying Strain (1st) | $1 \times 10^8$ | — | — | $1 \times 10^8$ | — | — | $1 \times 10^8$ | — | — |
| 1 Day after Addition | — | $1 \times 10^8$ | 500 | — | $1 \times 10^8$ | 600 | — | $2 \times 10^8$ | 800 |
| 3 Days after Addition | — | $1 \times 10^7$ | 350 | — | $2 \times 10^7$ | 400 | — | $5 \times 10^7$ | 600 |
| 5 Days after Addition | — | $1 \times 10^6$ | 100 | — | $2 \times 10^6$ | 150 | — | $1 \times 10^7$ | 400 |
| Addition of Purifying Strain (2nd) | $1 \times 10^8$ | — | — | $1 \times 10^8$ | — | — | $1 \times 10^8$ | — | — |
| 1 Day after Addition | — | $2 \times 10^5$ | 50 | — | $1 \times 10^6$ | 100 | — | $1 \times 10^7$ | 200 |
| 3 Days after Addition | — | $1 \times 10^5$ | 20 | — | $5 \times 10^5$ | 40 | — | $5 \times 10^6$ | 150 |
| 5 Days after Addition | — | $2 \times 10^5$ | 12 | — | $5 \times 10^5$ | 25 | — | $2 \times 10^6$ | 100 |
| 10 Days after Addition | — | $1 \times 10^5$ | 12 | — | $5 \times 10^5$ | 25 | — | $2 \times 10^6$ | 100 |

Note
"C.B.C./cc" stands for Common Bacteria Cells/cc of water.

From the results shown in Tables 23-(1) and 23-(2), it can be seen that both in F.R.I. Nos. 3576 and 3577, S-0 subcultures showed very high purifying ability and S-15 subcultures showed activity slightly lower than that of S-0 subcultures but still sufficient for practical purposes, while S-20 subcultures were still less effective.

As stated hereinbefore, when a bacterial strain of high purifying ability is subcultured using a purifying ability lowering medium, the potency of the strain is decreased gradually. However, after a certain times of subculturing, the ability is reduced rapidly, i.e., S-, N- and C-actions become weak rapidly.

From another viewpoint, a more scientific and mathematical examination will be made of growth stimulation.

Tables 20-(1), -(2), -(3) and -(4) represent the amounts of bacterial cells at the time of adding an S-, N- or C-compound and those in a control with the same cultivation time. Since the amount of bacterial cells in the control is always 100, the numerals indicated show the percentages based on the amount of cells in the control.

In contrast, in Table 24 below, the actual number of bacterial cells is simplified. For example, if the amount of cells in the control of F.R.I. No. 4264 is 1 at the time of addition, the cells grow to 8 times after 180 minutes, and to 210 times after 480 minutes. On the other hand, in experiments in which an S-compound was added, the S-0 subculture grew to 11 times after 180 minutes and to 294 times after 480 minutes.

TABLE 24

| Compd. Added | | Number of Bacterial Cells/ml | | | | | | | | | | |
|---|---|---|---|---|---|---|---|---|---|---|---|---|
| | | 0 min | 30 min | 50 min | 90 min | 120 min | 180 min | 240 min | 300 min | 360 min | 420 min | 480 min |
| | F.R.I. No. 4264 | | | | | | | | | | | |
| | Control | 1 | 1.4 | 1.7 | 2.8 | 3.8 | 8 | 15 | 31 | 60 | 120 | 210 |
| S | S-0 | 1 | 1.4 | 1.77 | 3.08 | 4.56 | 11 | 22.5 | 46.5 | 90 | 174 | 294 |
| | S-10 | 1 | 1.4 | 1.77 | 3.08 | 4.41 | 10.4 | 21.8 | 45 | 87 | 168 | 273 |
| | S-15 | 1 | 1.4 | 1.74 | 3.05 | 4.27 | 10.1 | 20.4 | 42.5 | 82.8 | 162 | 263 |
| | S-20 | 1 | 1.4 | 1.74 | 2.94 | 4.18 | 9.1 | 17.3 | 35.6 | 69 | 132 | 220 |
| | S-30 | 1 | 1.4 | 1.73 | 2.94 | 4.18 | 8.96 | 16.5 | 34.1 | 66 | 129.6 | 220 |
| | S-40 | 1 | 1.4 | 1.73 | 2.94 | 4.1 | 8.5 | 15.9 | 33.1 | 62.4 | 123.6 | 216 |
| | S-50 | 1 | 1.4 | 1.72 | 2.8 | 3.8 | 8 | 15 | 31 | 60 | 120 | 210 |
| | S-60 | 1 | 1.4 | 1.7 | 2.8 | 3.8 | 8 | 15 | 31 | 60 | 120 | 210 |
| N | S-0 | 1 | 1.4 | 1.75 | 3.02 | 4.37 | 10.4 | 20.4 | 43.4 | 81 | 150 | 252 |
| | S-10 | 1 | 1.4 | 1.75 | 2.97 | 4.18 | 9.6 | 18.5 | 40.3 | 78 | 144 | 242 |
| | S-15 | 1 | 1.4 | 1.73 | 2.94 | 4.1 | 9 | 17.3 | 37.2 | 72 | 132 | 231 |
| | S-20 | 1 | 1.4 | 1.73 | 2.94 | 4.1 | 8.5 | 15.9 | 32.9 | 61.8 | 123.6 | 216.3 |
| | S-30 | 1 | 1.4 | 1.725 | 2.88 | 4.0 | 8.5 | 15.9 | 32.9 | 61.8 | 122.4 | 212 |
| | S-40 | 1 | 1.4 | 1.725 | 2.88 | 3.91 | 8.24 | 15.9 | 32.2 | 61.2 | 121.2 | 210 |
| | S-50 | 1 | 1.4 | 1.74 | 2.85 | 3.84 | 8 | 15 | 31 | 60 | 120 | 210 |
| | S-60 | 1 | 1.4 | 1.73 | 2.83 | 3.8 | 8 | 15 | 31 | 60 | 120 | 210 |
| C | S-0 | 1 | 1.4 | 1.84 | 3.36 | 5.7 | 13.6 | 30 | 58.9 | 108 | 204 | 336 |
| | S-10 | 1 | 1.4 | 1.8 | 3.36 | 5.32 | 12 | 27 | 52.7 | 96 | 192 | 305 |
| | S-15 | 1 | 1.4 | 1.8 | 3.25 | 4.56 | 12 | 24.7 | 49.6 | 90 | 168 | 284 |
| | S-20 | 1 | 1.4 | 1.8 | 3.05 | 4.37 | 10 | 20.4 | 42.3 | 78 | 138 | 233 |
| | S-30 | 1 | 1.4 | 1.8 | 3.00 | 4.18 | 9.2 | 17.3 | 35.6 | 66 | 132 | 222 |
| | S-40 | 1 | 1.4 | 1.785 | 2.94 | 4.1 | 8.8 | 16.8 | 34.7 | 64.2 | 128 | 218 |
| | S-50 | 1 | 1.4 | 1.768 | 2.88 | 3.8 | 8 | 15 | 31 | 60 | 120 | 210 |
| | S-60 | 1 | 1.4 | 1.74 | 2.855 | 3.8 | 8 | 15 | 31 | 60 | 120 | 210 |
| | F.R.I. No. 3575 | | | | | | | | | | | |
| | Control | 1 | 1.4 | 1.8 | 2.8 | 4 | 8.2 | 16 | 33 | 67 | 135 | 250 |
| S | S-0 | 1 | 1.4 | 1.89 | 3.08 | 4.6 | 9.84 | 22.9 | 47.5 | 94 | 182 | 332 |
| | S-10 | 1 | 1.4 | 1.89 | 3.08 | 4.6 | 9.43 | 21.6 | 46.2 | 90.5 | 175 | 313 |
| | S-15 | 1 | 1.4 | 1.89 | 3.0 | 4.44 | 9.1 | 19.2 | 40 | 83 | 164 | 300 |
| | S-20 | 1 | 1.4 | 1.89 | 3.0 | 4.4 | 9.0 | 17.6 | 36.3 | 73.7 | 148 | 270 |
| | S-25 | 1 | 1.4 | 1.85 | 2.94 | 4.28 | 8.77 | 17.1 | 34.6 | 69 | 135 | 250 |
| | S-30 | 1 | 1.4 | 1.85 | 2.94 | 4 | 8.2 | 16 | 33 | 67 | 135 | 250 |
| | S-35 | 1 | 1.4 | 1.81 | 2.8 | 4 | 8.2 | 16 | 33 | 67 | 135 | 250 |
| N | S-0 | 1 | 1.4 | 1.89 | 3.08 | 4.8 | 10.7 | 24.5 | 50 | 100 | 195 | 350 |
| | S-10 | 1 | 1.4 | 1.89 | 3.02 | 4.6 | 10.25 | 23.2 | 48 | 94 | 182 | 338 |
| | S-15 | 1 | 1.4 | 1.85 | 2.97 | 4.6 | 9.84 | 21.6 | 40 | 83 | 164 | 300 |
| | S-20 | 1 | 1.4 | 1.83 | 2.91 | 4.4 | 9.43 | 18.4 | 38 | 74 | 148 | 275 |
| | S-25 | 1 | 1.4 | 1.83 | 2.91 | 4.28 | 9.02 | 17.6 | 36.3 | 71.7 | 142 | 263 |
| | S-30 | 1 | 1.4 | 1.82 | 2.83 | 4.04 | 8.2 | 16 | 33 | 67 | 135 | 250 |
| | S-35 | 1 | 1.4 | 1.82 | 2.83 | 4.02 | 8.2 | 16 | 33 | 67 | 135 | 250 |
| C | S-0 | 1 | 1.4 | 1.9 | 3.36 | 5.6 | 12.3 | 28.8 | 60 | 114 | 230 | 400 |
| | S-10 | 1 | 1.4 | 1.9 | 3.36 | 5.4 | 11.5 | 25.6 | 52.8 | 101 | 203 | 350 |
| | S-15 | 1 | 1.4 | 1.9 | 3.2 | 4.72 | 10.4 | 24 | 47.8 | 94 | 182 | 332 |
| | S-20 | 1 | 1.4 | 1.9 | 3.08 | 4.5 | 9.2 | 18.1 | 38 | 77 | 153 | 275 |
| | S-25 | 1 | 1.4 | 1.85 | 2.94 | 4.2 | 9.0 | 17.6 | 36.3 | 73 | 140 | 270 |
| | S-30 | 1 | 1.4 | 1.87 | 2.8 | 4 | 8.2 | 16 | 33 | 67 | 135 | 250 |
| | S-35 | 1 | 1.4 | 1.83 | 2.8 | 4 | 8.2 | 16 | 33 | 67 | 135 | 250 |
| | F.R.I. No. 3576 | | | | | | | | | | | |
| | Control | 1 | 1.4 | 1.7 | 2.6 | 3.7 | 7 | 13 | 26 | 50 | 95 | 180 |
| S | S-0 | 1 | 1.4 | 1.78 | 2.78 | 4.25 | 9.1 | 19.7 | 40 | 75 | 133 | 252 |
| | S-10 | 1 | 1.4 | 1.78 | 2.78 | 4.14 | 8.75 | 19.5 | 36.4 | 70 | 124 | 234 |
| | S-15 | 1 | 1.4 | 1.75 | 2.73 | 4.00 | 8.00 | 17.5 | 35 | 65 | 119 | 225 |
| | S-20 | 1 | 1.4 | 1.73 | 2.68 | 3.88 | 7.7 | 15.6 | 31.2 | 57.5 | 104 | 198 |
| | S-25 | 1 | 1.4 | 1.73 | 2.68 | 3.85 | 7.5 | 14.7 | 28.2 | 55 | 100 | 189 |
| | S-30 | 1 | 1.4 | 1.72 | 2.62 | 3.7 | 7 | 13 | 26 | 50 | 95 | 180 |
| | S-35 | 1 | 1.4 | 1.71 | 2.6 | 3.7 | 7 | 13 | 26 | 50 | 95 | 180 |
| N | S-0 | 1 | 1.4 | 1.77 | 2.75 | 4.25 | 9.1 | 19.5 | 39 | 72.5 | 133 | 252 |
| | S-10 | 1 | 1.4 | 1.75 | 2.73 | 4.07 | 8.4 | 18.2 | 36.4 | 67.5 | 124 | 234 |
| | S-15 | 1 | 1.4 | 1.73 | 2.7 | 4.00 | 7.7 | 17 | 33.8 | 62.5 | 114 | 216 |
| | S-20 | 1 | 1.4 | 1.73 | 2.65 | 3.88 | 7.5 | 15.2 | 30 | 57.5 | 105 | 198 |
| | S-25 | 1 | 1.4 | 1.73 | 2.65 | 3.81 | 7.28 | 13.65 | 27.3 | 52.5 | 100 | 189 |
| | S-30 | 1 | 1.4 | 1.72 | 2.63 | 3.72 | 7 | 13 | 26 | 50 | 95 | 180 |
| | S-35 | 1 | 1.4 | 1.7 | 2.6 | 3.7 | 7 | 13 | 26 | 50 | 95 | 180 |
| C | S-0 | 1 | 1.4 | 1.83 | 3.00 | 4.62 | 9.8 | 20.2 | 41.6 | 77.5 | 147 | 270 |
| | S-10 | 1 | 1.4 | 1.83 | 3.00 | 4.62 | 9.8 | 20.2 | 41.6 | 77.5 | 143 | 270 |
| | S-15 | 1 | 1.4 | 1.78 | 2.86 | 4.44 | 9.5 | 19.5 | 39 | 75 | 133 | 243 |
| | S-20 | 1 | 1.4 | 1.75 | 2.76 | 4.07 | 8.4 | 16.2 | 32.5 | 62.5 | 114 | 207 |
| | S-25 | 1 | 1.4 | 1.75 | 2.73 | 3.96 | 7.7 | 15.6 | 30 | 57.5 | 105 | 198 |
| | S-30 | 1 | 1.4 | 1.72 | 2.65 | 3.85 | 7.35 | 13 | 26 | 50 | 95 | 180 |
| | S-35 | 1 | 1.4 | 1.7 | 2.626 | 3.7 | 7 | 13 | 26 | 50 | 95 | 180 |

TABLE 24-continued

| Compd. Added | | Number of Bacterial Cells/ml | | | | | | | | | | |
|---|---|---|---|---|---|---|---|---|---|---|---|---|
| | | 0 min | 30 min | 50 min | 90 min | 120 min | 180 min | 240 min | 300 min | 360 min | 420 min | 480 min |
| | F.R.I. No. 3577 | | | | | | | | | | | |
| | Control | 1 | 1.3 | 1.7 | 2.6 | 3.7 | 7 | 13 | 26 | 50 | 97 | 190 |
| S | S-0 | 1 | 1.3 | 1.79 | 2.78 | 4.26 | 9.1 | 19.5 | 40.04 | 75 | 136 | 266 |
| | S-10 | 1 | 1.3 | 1.79 | 2.76 | 4.1 | 8.75 | 18.2 | 35.6 | 68 | 131 | 247 |
| | S-15 | 1 | 1.3 | 1.75 | 2.76 | 4.1 | 8.4 | 17.0 | 33.8 | 65 | 122 | 241 |
| | S-20 | 1 | 1.3 | 1.75 | 2.76 | 4.0 | 7.9 | 15.0 | 30.1 | 57.5 | 111 | 213 |
| | S-25 | 1 | 1.3 | 1.73 | 2.7 | 3.9 | 7.7 | 14.3 | 30 | 57.5 | 111 | 207 |
| | S-30 | 1 | 1.3 | 1.73 | 2.7 | 3.7 | 7 | 13 | 26 | 50 | 97 | 190 |
| | S-35 | 1 | 1.3 | 1.7 | 2.6 | 3.7 | 7 | 13 | 26 | 50 | 97 | 190 |
| N | S-0 | 1 | 1.3 | 1.77 | 2.76 | 4.07 | 8.75 | 18.2 | 37.7 | 72.5 | 130 | 256 |
| | S-10 | 1 | 1.3 | 1.77 | 2.73 | 4.0 | 8.4 | 16.9 | 35.1 | 70 | 126 | 238 |
| | S-15 | 1 | 1.3 | 1.73 | 2.7 | 3.96 | 7.6 | 14.6 | 30.2 | 56 | 108 | 209 |
| | S-20 | 1 | 1.3 | 1.73 | 2.7 | 3.9 | 7.4 | 14 | 28.1 | 54 | 104 | 203 |
| | S-25 | 1 | 1.3 | 1.73 | 2.68 | 3.88 | 7.35 | 13.65 | 27.3 | 52.5 | 101 | 196 |
| | S-30 | 1 | 1.3 | 1.71 | 2.62 | 3.72 | 7 | 13 | 26 | 50 | 97 | 190 |
| | S-35 | 1 | 1.3 | 1.7 | 2.6 | 3.7 | 7 | 13 | 26 | 50 | 97 | 190 |
| C | S-0 | 1 | 1.3 | 1.87 | 3.00 | 4.81 | 10.2 | 22.7 | 45.5 | 87.5 | 155 | 285 |
| | S-10 | 1 | 1.3 | 1.84 | 2.86 | 4.63 | 9.8 | 21.5 | 42.9 | 82.5 | 146 | 276 |
| | S-15 | 1 | 1.3 | 1.79 | 2.78 | 4.26 | 9.1 | 19.5 | 41.6 | 75 | 136 | 266 |
| | S-20 | 1 | 1.3 | 1.79 | 2.76 | 4 | 8.0 | 15.8 | 32 | 60 | 116 | 228 |
| | S-25 | 1 | 1.3 | 1.75 | 2.73 | 3.96 | 7.7 | 15.0 | 30.4 | 57.5 | 112 | 213 |
| | S-30 | 1 | 1.3 | 1.75 | 2.70 | 3.89 | 7.5 | 14.3 | 28.6 | 53.5 | 104 | 200 |
| | S-35 | 1 | 1.3 | 1.734 | 2.65 | 3.7 | 7 | 13 | 26 | 50 | 97 | 190 |

The same phenomenon was observed in the case of adding other S-, N- and C-compounds.

Figure 3:
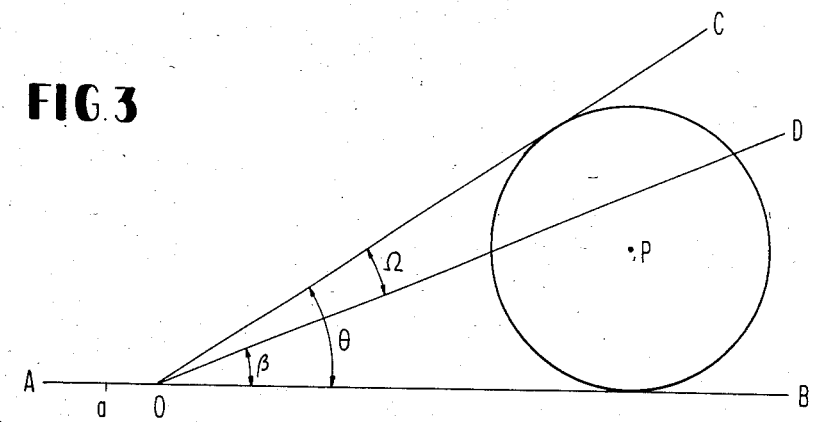
FIG. 3 is a schematical model explaining growth stimulation with the addition of S-, N- and C-compounds.

Based on the experimental results obtained, the scheme of purification can be clearly plotted in FIG. 3.

Let us suppose referring to FIG. 3 that a strain continues to grow on the line of the log phase showing the growth of line A-B. If an S-, N- or C-compound is added at point a, experiment shows that the growth becomes brisk, e.g., after about 20 minutes, and the growth curve of the strain, under the growth stimulation, shifts to a position above the line A-B. If the strain undergoes only slight stimulation, its growth line rises just a little upward of O-B. If it undergoes marked stimulation, the line C-C results.

As stated hereinabove, when the strain undergoes slight stimulation, the strain exhibits a purifying ability but has not strong purifying ability. Such strains are those which come within the range of angle $\beta$ (S-20 to S-50 in the case of F.R.I. No. 4264). Strains which undergo greater stimulation exhibit a deodorizing ability, and such strains are within the range of angle $\Omega$ (S-0 to S-15 in the case of F.R.I. No. 4264).

(B): Specific Growth Speed $\mu$

In order to determine angles $\Omega$ and $\beta$, it is first necessary to obtain a $\mu$ value. The specific growth speed $\mu$ is expressed by the following formula.

$$\frac{2.303(\log n_2 - \log n_1)}{t_2 - t_1}$$

where $t_1$ and $t_2$ are time: and $n_1$ and $n_2$ are number of bacterial cells at the time of $t_1$ and $t_2$, respectively. Larger $\mu$ values show higher growth speeds, and lower $\mu$ values show slower growth speeds.

The calculated $\mu$ values are shown in Tables 25-(1), -(2), -(3) and -(4).

TABLE 25

| Compd. Added | | μ Value | | | | | | | | |
|---|---|---|---|---|---|---|---|---|---|---|
| | | 60 min | 80 min | 85 min | 135 min | 180 min | 240 min | 300 min | 360 min | 420 min |
| | F.R.I. No. 4264 | | | | | | | | | |
| | Control | 0.691 | 0.676 | | 0.699 | 0.684 | 0.677 | 0.692 | 0.676 | 0.626 |
| S | S-0 | 0.787 | 0.81 | | 0.85 | 0.787 | 0.72 | 0.692 | 0.654 | 0.591 |
| | S-10 | 0.787 | 0.787 | | 0.813 | 0.798 | 0.73 | 0.692 | 0.659 | 0.571 |
| | S-15 | 0.778 | 0.77 | | 0.80 | 0.78 | 0.716 | 0.716 | 0.668 | 0.577 |
| | S-20 | 0.778 | 0.75 | | 0.756 | 0.709 | 0.681 | 0.68 | 0.66 | 0.575 |
| | S-30 | 0.778 | 0.75 | | 0.745 | 0.685 | 0.667 | 0.692 | 0.667 | 0.60 |
| | S-40 | 0.778 | 0.75 | | 0.708 | 0.677 | 0.678 | 0.690 | 0.658 | 0.62 |
| | S-50 | 0.691 | 0.676 | | 0.699 | 0.684 | 0.677 | 0.692 | 0.676 | 0.626 |
| | S-60 | 0.691 | 0.676 | | 0.699 | 0.684 | 0.677 | 0.692 | 0.676 | 0.626 |
| N | S-0 | 0.77 | 0.79 | | 0.825 | 0.77 | 0.72 | 0.692 | 0.62 | 0.567 |
| | S-10 | 0.75 | 0.75 | | 0.785 | 0.74 | 0.716 | 0.72 | 0.636 | 0.565 |
| | S-15 | 0.74 | 0.75 | | 0.75 | 0.72 | 0.71 | 0.69 | 0.616 | 0.567 |
| | S-20 | 0.74 | 0.75 | | 0.699 | 0.677 | 0.677 | 0.677 | 0.657 | 0.62 |
| | S-30 | 0.72 | 0.72 | | 0.72 | 0.69 | 0.677 | 0.677 | 0.64 | 0.616 |
| | S-40 | 0.72 | 0.70 | | 0.70 | 0.70 | 0.68 | 0.673 | 0.66 | 0.615 |
| | S-50 | 0.71 | 0.69 | | 0.685 | 0.677 | 0.677 | 0.692 | 0.676 | 0.626 |
| | S-60 | 0.70 | 0.69 | | 0.68 | 0.684 | 0.677 | 0.692 | 0.676 | 0.626 |
| C | S-0 | 0.83 | | 0.97 | 0.94 | 0.83 | 0.73 | 0.64 | 0.62 | 0.57 |
| | S-10 | 0.83 | | 0.93 | 0.85 | 0.81 | 0.74 | 0.63 | 0.65 | 0.58 |
| | S-15 | 0.78 | | 0.80 | 0.81 | 0.76 | 0.72 | 0.64 | 0.63 | 0.60 |
| | S-20 | 0.75 | | 0.76 | 0.77 | 0.72 | 0.70 | 0.66 | 0.65 | 0.63 |

TABLE 25-continued

| Compd. Added | | 60 min | 80 min | 85 min | 135 min | μ Value 180 min | 240 min | 300 min | 360 min | 420 |
|---|---|---|---|---|---|---|---|---|---|---|
| | S-30 | 0.76 | | 0.72 | 0.75 | 0.71 | 0.68 | 0.67 | 0.65 | 0.61 |
| | S-40 | 0.74 | | 0.71 | 0.73 | 0.70 | 0.69 | 0.67 | 0.66 | 0.61 |
| | S-50 | 0.72 | | 0.66 | 0.68 | 0.684 | 0.677 | 0.692 | 0.676 | 0.626 |
| | S-60 | 0.71 | | 0.67 | 0.69 | 0.684 | 0.677 | 0.692 | 0.676 | 0.626 |
| | F.R.I. No. 3575 | | | | | | | | | |
| | Control | 0.69 | | 0.68 | 0.73 | 0.69 | 0.69 | 0.71 | 0.70 | 0.66 |
| S | S-0 | 0.79 | | 0.76 | 0.78 | 0.80 | 0.79 | 0.71 | 0.67 | 0.63 |
| | S-10 | 0.79 | | 0.76 | 0.75 | 0.77 | 0.79 | 0.715 | 0.665 | 0.62 |
| | S-15 | 0.76 | | 0.73 | 0.74 | 0.73 | 0.74 | 0.73 | 0.69 | 0.64 |
| | S-20 | 0.76 | | 0.73 | 0.73 | 0.69 | 0.69 | 0.71 | 0.70 | 0.64 |
| | S-25 | 0.74 | | 0.72 | 0.73 | 0.69 | 0.68 | 0.69 | 0.68 | 0.64 |
| | S-30 | 0.73 | | 0.71 | 0.69 | 0.69 | 0.69 | 0.71 | 0.70 | 0.66 |
| | S-35 | 0.69 | | 0.68 | 0.73 | 0.69 | 0.69 | 0.71 | 0.70 | 0.66 |
| N | S-0 | 0.79 | | 0.80 | 0.83 | 0.81 | 0.77 | 0.70 | 0.68 | 0.63 |
| | S-10 | 0.77 | | 0.76 | 0.817 | 0.81 | 0.77 | 0.70 | 0.67 | 0.64 |
| | S-15 | 0.74 | | 0.78 | 0.79 | 0.77 | 0.70 | 0.67 | 0.70 | 0.64 |
| | S-20 | 0.73 | | 0.74 | 0.78 | 0.72 | 0.69 | 0.69 | 0.68 | 0.65 |
| | S-25 | 0.73 | | 0.73 | 0.76 | 0.71 | 0.70 | 0.70 | 0.68 | 0.65 |
| | S-30 | 0.70 | | 0.68 | 0.71 | 0.69 | 0.69 | 0.71 | 0.70 | 0.66 |
| | S-35 | 0.70 | | 0.68 | 0.72 | 0.69 | 0.69 | 0.71 | 0.70 | 0.66 |
| C | S-0 | 0.87 | | 0.93 | 0.87 | 0.81 | 0.79 | 0.69 | 0.67 | 0.63 |
| | S-10 | 0.87 | | 0.90 | 0.82 | 0.78 | 0.76 | 0.69 | 0.67 | 0.62 |
| | S-15 | 0.825 | | 0.78 | 0.79 | 0.81 | 0.76 | 0.68 | 0.67 | 0.63 |
| | S-20 | 0.79 | | 0.75 | 0.78 | 0.69 | 0.71 | 0.72 | 0.69 | 0.64 |
| | S-25 | 0.74 | | 0.70 | 0.73 | 0.71 | 0.69 | 0.71 | 0.67 | 0.67 |
| | S-30 | 0.69 | | 0.67 | 0.73 | 0.69 | 0.69 | 0.71 | 0.70 | 0.66 |
| | S-35 | 0.69 | | 0.67 | 0.73 | 0.69 | 0.69 | 0.71 | 0.70 | 0.66 |
| | F.R.I. No. 3576 | | | | | | | | | |
| | Control | 0.62 | | 0.665 | 0.664 | 0.63 | 0.65 | 0.67 | 0.65 | 0.64 |
| S | S-0 | 0.685 | | 0.75 | 0.79 | 0.76 | 0.74 | 0.67 | 0.57 | 0.61 |
| | S-10 | 0.685 | | 0.72 | 0.77 | 0.77 | 0.71 | 0.64 | 0.61 | 0.60 |
| | S-15 | 0.67 | | 0.70 | 0.71 | 0.73 | 0.73 | 0.66 | 0.61 | 0.62 |
| | S-20 | 0.64 | | 0.70 | 0.70 | 0.70 | 0.70 | 0.65 | 0.60 | 0.61 |
| | S-25 | 0.64 | | 0.69 | 0.69 | 0.67 | 0.66 | 0.66 | 0.63 | 0.61 |
| | S-30 | 0.63 | | 0.65 | 0.63 | 0.63 | 0.65 | 0.67 | 0.65 | 0.64 |
| | S-35 | 0.62 | | 0.665 | 0.664 | 0.63 | 0.65 | 0.67 | 0.65 | 0.64 |
| N | S-0 | 0.67 | | 0.76 | 0.80 | 0.76 | 0.73 | 0.66 | 0.62 | 0.62 |
| | S-10 | 0.667 | | 0.72 | 0.75 | 0.75 | 0.73 | 0.65 | 0.61 | 0.62 |
| | S-15 | 0.65 | | 0.70 | 0.70 | 0.72 | 0.73 | 0.65 | 0.61 | 0.61 |
| | S-20 | 0.64 | | 0.70 | 0.69 | 0.69 | 0.69 | 0.64 | 0.62 | 0.61 |
| | S-25 | 0.64 | | 0.69 | 0.67 | 0.64 | 0.66 | 0.67 | 0.65 | 0.64 |
| | S-30 | 0.63 | | 0.66 | 0.66 | 0.63 | 0.65 | 0.67 | 0.65 | 0.64 |
| | S-35 | 0.62 | | 0.665 | 0.664 | 0.63 | 0.65 | 0.67 | 0.65 | 0.64 |
| C | S-0 | 0.77 | | 0.79 | 0.79 | 0.74 | 0.72 | 0.67 | 0.63 | 0.62 |
| | S-10 | 0.77 | | 0.79 | 0.79 | 0.74 | 0.72 | 0.67 | 0.61 | 0.62 |
| | S-15 | 0.72 | | 0.78 | 0.80 | 0.71 | 0.71 | 0.67 | 0.62 | 0.59 |
| | S-20 | 0.68 | | 0.72 | 0.74 | 0.69 | 0.67 | 0.67 | 0.62 | 0.59 |
| | S-25 | 0.667 | | 0.70 | 0.69 | 0.68 | 0.68 | 0.65 | 0.62 | 0.62 |
| | S-30 | 0.64 | | 0.69 | 0.68 | 0.60 | 0.63 | 0.67 | 0.65 | 0.64 |
| | S-35 | 0.63 | | 0.665 | 0.65 | 0.63 | 0.65 | 0.67 | 0.65 | 0.64 |
| | F.R.I. No. 3577 | | | | | | | | | |
| | Control | 0.69 | | 0.665 | 0.664 | 0.63 | 0.65 | 0.67 | 0.66 | 0.66 |
| S | S-0 | 0.76 | | 0.75 | 0.793 | 0.76 | 0.74 | 0.67 | 0.61 | 0.61 |
| | S-10 | 0.75 | | 0.71 | 0.77 | 0.745 | 0.70 | 0.658 | 0.65 | 0.64 |
| | S-15 | 0.75 | | 0.73 | 0.75 | 0.71 | 0.70 | 0.67 | 0.64 | 0.64 |
| | S-20 | 0.75 | | 0.70 | 0.70 | 0.66 | 0.67 | 0.67 | 0.61 | 0.65 |
| | S-25 | 0.73 | | 0.70 | 0.70 | 0.65 | 0.69 | 0.69 | 0.65 | 0.64 |
| | S-30 | 0.73 | | 0.65 | 0.64 | 0.63 | 0.65 | 0.67 | 0.66 | 0.66 |
| | S-35 | 0.69 | | 0.665 | 0.664 | 0.63 | 0.65 | 0.67 | 0.66 | 0.66 |
| N | S-0 | 0.75 | | 0.71 | 0.77 | 0.75 | 0.73 | 0.69 | 0.61 | 0.63 |
| | S-10 | 0.74 | | 0.70 | 0.75 | 0.72 | 0.714 | 0.71 | 0.64 | 0.61 |
| | S-15 | 0.73 | | 0.71 | 0.70 | 0.66 | 0.69 | 0.67 | 0.64 | 0.65 |
| | S-20 | 0.73 | | 0.70 | 0.67 | 0.64 | 0.66 | 0.67 | 0.65 | 0.66 |
| | S-25 | 0.72 | | 0.69 | 0.67 | 0.63 | 0.66 | 0.67 | 0.65 | 0.66 |
| | S-30 | 0.69 | | 0.67 | 0.66 | 0.63 | 0.65 | 0.67 | 0.66 | 0.66 |
| | S-35 | 0.69 | | 0.665 | 0.664 | 0.63 | 0.65 | 0.67 | 0.66 | 0.66 |
| C | S-0 | 0.83 | | 0.81 | 0.82 | 0.78 | 0.75 | 0.67 | 0.62 | 0.60 |
| | S-10 | 0.79 | | 0.79 | 0.82 | 0.77 | 0.74 | 0.67 | 0.61 | 0.60 |
| | S-15 | 0.76 | | 0.75 | 0.793 | 0.76 | 0.75 | 0.67 | 0.61 | 0.61 |
| | S-20 | 0.75 | | 0.69 | 0.70 | 0.68 | 0.69 | 0.66 | 0.65 | 0.65 |
| | S-25 | 0.74 | | 0.70 | 0.70 | 0.66 | 0.69 | 0.67 | 0.65 | 0.65 |
| | S-30 | 0.73 | | 0.68 | 0.68 | 0.65 | 0.67 | 0.66 | 0.64 | 0.66 |
| | S-35 | 0.71 | | 0.65 | 0.65 | 0.63 | 0.65 | 0.67 | 0.66 | 0.66 |

The results of experiments on μ values at the time of adding Na$_2$S.9H$_2$O, NH$_3$ and butyric acid are summarized below.

(1) When strains of the same species are examined, strains having a stronger purifying action give more rapidly increasing μ values after the addition, and the peaks of the μ value appear in 2 to 3 hours.

(2) Strains having a weaker purifying action give more gentle rising of the μ value after addition. The peaks of the μ value, however, appear 2 to 3 hours later same as in the case of the strains having stronger purifying actions.

(3) Irrespective of the strength of the purifying action, the μ value gradually decreases thereafter. In about 5 hours after the addition, the μ value tends to be lower than that of the control.

(4) Generally, the degree of decrease of the μ value is more sudden with strains having a stronger purifying action.

(5) The locus of the μ value of a strain having a strong purifying action which changes with time draws a line having the shape with a high ridge and a deep valley.

Figure 4:
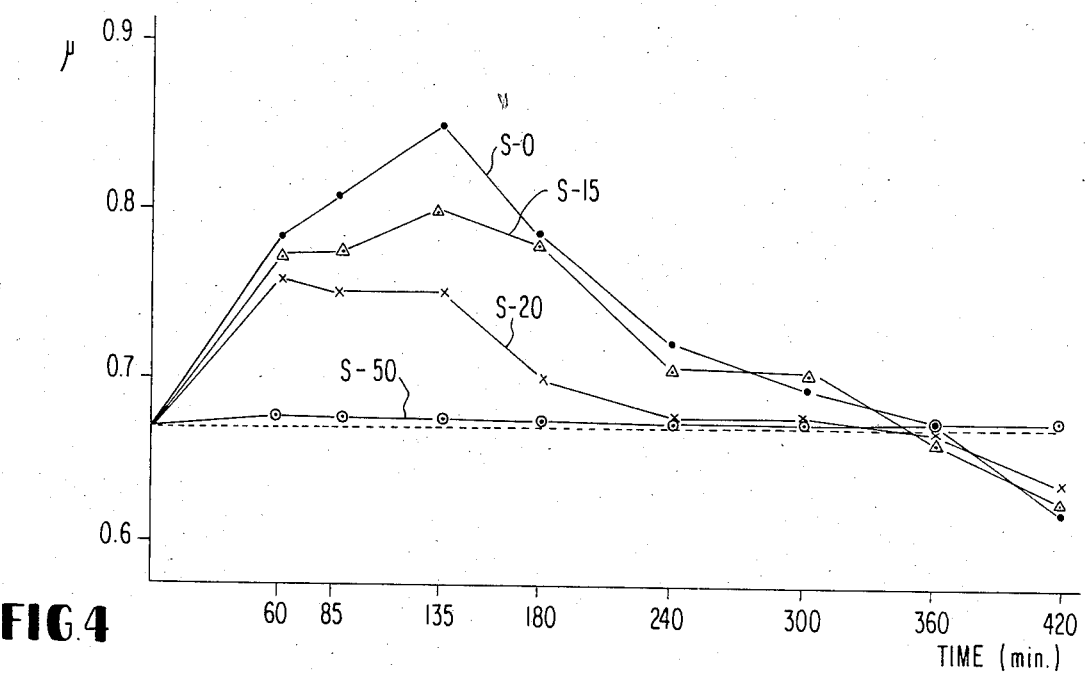
FIG. 4 is a graph showing change in $\mu$ value with the passage of cultivation time.
Figure 5:
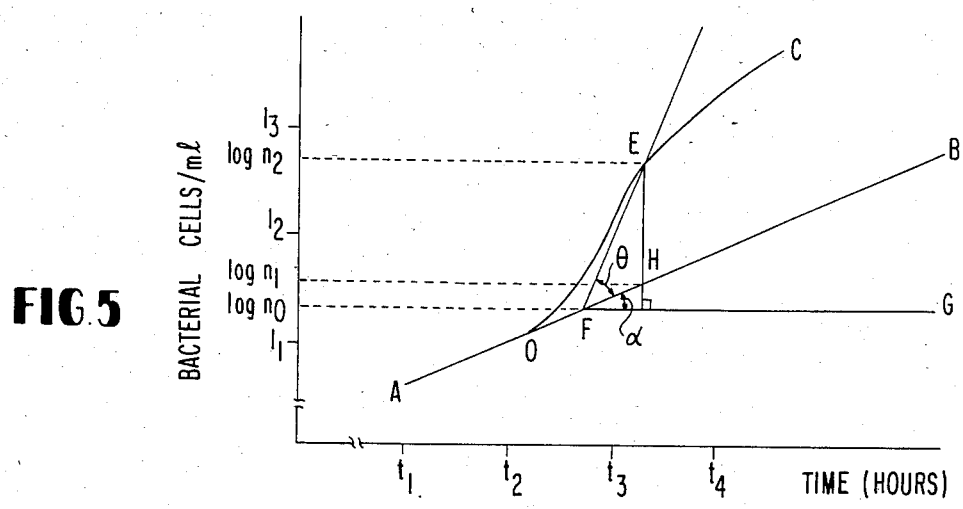
FIG. 5 is a graph schematically explaining growth stimulation angle ($\theta$).

(6) With strains having a weaker purifying action, the locus of the μ value changes gradually to a horizontal straight line as shown in FIG. 4.

When ammonia was added as the N-compound, almost the same tendency as mentioned in paragraphs (1) to (6) was observed.

When butyric acid was added as the C-compound, the result was similar to that in the case of adding the S- or N-compound except that the time required until the μ value reached a maximum after addition of the C-compound was shorter than in the case of adding the S- or N-compound, and that the difference of the μ value from the control was larger than in the case of adding the S- or N-compound.

The conclusions about the μ value given hereinabove are based on the results of experiments in which cultivation was performed at 28° C. under facultatively anaerobic conditions in [S-W] as a basic medium having added thereto 1 g/liter each of the S-, N- and C-compound. When the experiment was carried out under other cultivation conditions, the patterns obtained were basically the same within the range of biological law.

In other words, in the purification of water or water-containing material there is an important corelationship between growth speed μ and S-, N- and C-activity.

The difference between the μ value of the control and the maximum μ value attained by the addition of an S-, N- or C-compound is at least 0.2 in strains having a strong purifying action when an S- or N-compound is added. When a C-compound is added, the difference is at least 0.25 in strains having a strong purifying action.

In summary, it can be concluded that strains which show a higher μ value than the control irrespective of the time after the addition of an S-, N- or C-compound in a suitably selected culture medium have a purifying action, and that strains having a higher μ value have a stronger purifying action.

So far, the increase of the number of bacterial cells after the addition of an S-, N- or C-compound and the changes of the μ value have been described in detail. Now, the growth angle will be examined.

(C) Growth Angle and the Purifying Action

The growth angle (or stimulation angle) denotes the angle formed by the intersection of the growth curve of a given strain in a medium not containing an S-, N- or C-compound with the growth curve of the strain in the culture medium to which an S-, N- or C-compound has been added. The strains used in this invention must have growth angles within the above-specified ranges.

The growth angle can be calculated on the basis of the following theory.

The strains used in this invention are thus selected on the basis of the angle (growth angle) formed between the growth curve of a control strain and the growth curve of the strain after adding an S-, N- or C-compound. The procedure of calculation is described below with reference to FIG. 6.

In FIG. 6, AB represents a growth line of an ordinary bacterial strain in its logarithmic growth period in a culture medium not containing an S-, N- or C-compound. After addition of the S-, N- or C-compound, stimulation of growth begins to appear at point O, and a line OC is drawn. Now, the point formed by the intersection of a straight line drawn from E, which is one point of a line having the greatest gradient (the line showing the maximum μ value, i.e., the specific growth speed) among lines OC, with OB is supposed to be F, and the line extending from F and being parallel to the axis of abscissas, FG. Furthermore, a perpendicular is drawn from E to FG, and its intersecting point with AB is supposed to be H. The number of strains/cc at point E is log n$_2$; the number of strains at H is log n, and the number of strains in point F is log n$_o$. Furthermore, LBFG=α, LBFE=θ.

If the interval between l$_1$, l$_2$ of the logarithmic values (1, 2, 3, 4 . . . 8, 9, 10) of the number of strains is made equal to the interval between t$_1$, t$_2$ of the time (hours), α and β can be calculated by the following equations.

$$\tan \alpha = \frac{d \log (n_1 - n_o)}{dt} = \frac{\mu'}{2.303} \quad (1)$$

μ'. . . μ value of OB $$\tan (\alpha + \theta) = \frac{d \log (n_2 - n_o)}{dt} = \frac{\mu''}{2.303} \quad (2)$$

μ". . . maximum μ value of EF $$(\alpha + \theta) - \alpha = \theta \quad (3)$$

If the maximum μ value is substituted in the above equation, the angle formed by the intersection of the growth curve in a basic medium [S'-W] with the growth curve which necessarily results from the addition of S-, N- and C-compounds can be calculated in regard to strains of the same species which differ from each other in purifying power.

The maximum μ value was applied to the equation (1), (2) and (3) given hereinabove, and the growth angles obtained are shown in Table 26.

As is clear from the above-tabulated figures, when an S-, N- or C-compound is added to an [S-W] culture medium, the growth angle increases with stronger purifying power of strains irrespective of the types of the strains; that is, the strains are well stimulated for growth. On the other hand, with decreasing purifying action, the angle θ decreases. Although the angle θ varies according to the basic culture medium used, the basic reaction is as described hereinabove.

A specific and simple explanation is made below of the values shown in Table 26 which were obtained on an [S-W] basic culture medium.

TABLE 26

| Strain FRI No. | Subculture | μ Value of the Control | Angle α | S—compound Added | | | N—compound Added | | | C—compound Added | | |
|---|---|---|---|---|---|---|---|---|---|---|---|---|
| | | | | Maximum μ Value | Angle (α + θ) | Angle θ | Maximum μ Value | Angle (α + θ) | Angle θ | Maximum μ Value | Angle (α + θ) | Angle θ |
| 4264 | S-0 | 0.677 | 16.5° | 0.85 | 20.5° | 4° | 0.825 | 20° | 3.5° | 0.97 | 22.9° | 6.3° |
| | S-10 | | | 0.813 | 19.5° | 3° | 0.785 | 18.8° | 2.3° | 0.93 | 22° | 5.5° |
| | S-15 | | | 0.80 | 19° | 2.5° | 0.75 | 18° | 1.5° | 0.81 | 19.5° | 3° |
| | S-20 | | | 0.778 | 18.5° | 2° | 0.75 | 18° | 1.5° | 0.77 | 18.5° | 2° |
| | S-30 | | | 0.778 | 18.5° | 2° | 0.72 | 17.4° | 0.9° | 0.76 | 18.3° | 1.8° |
| | S-40 | | | 0.778 | 18.5° | 2° | 0.72 | 17.4° | 0.9° | 0.74 | 17.8° | 1.3° |
| | S-50 | | | 0.677 | 16.5° | 0 | 0.71 | 17° | 0.5° | 0.72 | 17.4° | 0.9° |
| | S-60 | | | 0.677 | 16.5° | 0 | 0.70 | 16.9° | 0.4° | 0.71 | 17° | 0.5° |
| 3577 | S-0 | 0.661 | 16° | 0.793 | 19° | 3° | 0.77 | 18.5° | 2.5° | 0.83 | 20° | 4° |
| | S-10 | | | 0.77 | 18.5° | 2.5° | 0.75 | 18° | 2° | 0.82 | 19.6° | 3.6° |
| | S-15 | | | 0.75 | 18° | 2° | 0.73 | 17.5° | 1.5° | 0.793 | 19° | 3° |
| | S-20 | | | 0.73 | 17.5° | 1.5° | 0.73 | 17.5° | 1.5° | 0.75 | 18° | 2° |
| | S-25 | | | 0.73 | 17.5° | 1.5° | 0.72 | 17.4° | 1.4° | 0.74 | 17.8° | 1.8° |
| | S-30 | | | 0.73 | 17.5° | 1.5° | 0.661 | 16° | 0 | 0.73 | 17.5° | 1.5° |
| | S-35 | | | 0.66 | 16° | 0 | 0.661 | 16° | 0 | 0.71 | 17° | 0.5° |
| 3576 | S-0 | 0.640 | 15.5° | 0.79 | 19° | 3.5° | 0.80 | 19° | 3.5° | 0.80 | 19° | 3.5° |
| | S-10 | | | 0.77 | 18.5° | 3° | 0.75 | 18° | 2.5° | 0.80 | 19° | 3.5° |
| | S-15 | | | 0.73 | 17.5° | 2° | 0.72 | 17.5° | 2° | 0.80 | 19° | 3.5° |
| | S-20 | | | 0.70 | 17° | 1.5° | 0.70 | 17° | 1.5° | 0.74 | 17.5° | 2° |
| | S-25 | | | 0.69 | 18.7° | 1.2° | 0.69 | 16.7° | 1.2° | 0.69 | 16.7° | 1.2° |
| | S-30 | | | 0.648 | 15.5° | 0 | 0.648 | 15.5° | 0 | 0.69 | 16.7° | 1.2° |
| | S-35 | | | 0.648 | 15.5° | 0 | 0.648 | 15.5° | 0 | 0.648 | 15.5° | 0 |
| 3575 | S-0 | 0.70 | 17° | 0.80 | 197° | 2° | 0.83 | 20° | 3° | 0.93 | 22° | 5° |
| | S-10 | | | 0.79 | 19° | 2° | 0.82 | 19.6° | 2.6° | 0.90 | 21.4° | 4.4° |
| | S-15 | | | 0.79 | 19° | 2° | 0.79 | 19° | 2° | 0.825 | 20° | 3° |
| | S-20 | | | 0.74 | 17.8° | 0.8° | 0.78 | 18.5° | 1.5° | 0.79 | 19° | 2° |
| | S-25 | | | 0.74 | 17.5° | 0.5° | 0.76 | 18.3° | 1.3° | 0.74 | 17.5° | 0.5° |
| | S-30 | | | 0.73 | 17.5° | 0.5° | 0.71 | 17° | 0 | 0.70 | 17° | 0 |
| | S-35 | | | 0.70 | 17° | 0 | 0.70 | 17° | 0 | 0.70 | 17° | 0 |

When the S-15 subculture having a strong purifying action is compared with the S-20 subculture which has a weak purifying action, the difference in growth angle between the control and the S-15 subculture in the case of adding an S-compound is 2.5° for F.R.I. No. 4264, 2° for F.R.I. No. 3577, 2° for F.R.I. No. 3576 and 2° for F.R.I. No. 3575. The difference in growth angle between the control and the S-20 subculture (the angle β in FIG. 3) is 2° for F.R.I. No. 4264, 1.5° for F.R.I. No. 3577, 1.5° for F.R.I. No. 3576 and F.R.I. No. 3575.

In the case of adding an N-compound, the difference in growth angle between the control and the S-15 subculture is 1.5° for F.R.I. No. 4264, 1.5° for F.R.I. No. 3577, 2° for F.R.I. No. 3576 and 2° for F.R.I. No. 3575. The difference in growth angle between the control and the S-20 subculture is 1.5° for F.R.I. No. 4264, 1.5° for F.R.I. No. 3577, 1.5° for F.R.I. No. 3576 and 1.5° for F.R.I. No. 3575.

In the case of adding a C-compound, the difference in angle between the control and the S-15 subculture is 3° for F.R.I. No. 4264, 3° for F.R.I. No. 3577, 3.5° for F.R.I. No. 3576 and 3° for F.R.I. No. 3575. The difference in angle between the control and the S-20 subculture is 2° for F.R.I. No. 4264, 2° for F.R.I. No. 3577, 2° for F.R.I. No. 3576 and 2° for F.R.I. No. 3575.

In other words, when $Na_2S \cdot 9H_2O$ is added in an amount of 1 g per liter of the culture broth, the strains have a strong purifying action when the angle $\theta > 2°$, but have only a weak purifying action in the range of $0° < \theta < 2°$ (the angle in FIG. 3). In the case of adding ammonia in an amount of 1 g per liter of culture broth, the strains have a strong purifying action when the angle $\theta > 1.5°$, but have only a weak purifying action in the range of $0° < \theta < 1.5°$ (the angle β in FIG. 3). Likewise, in the case of adding butyric acid in an amount of 1 g per liter of culture broth, the strains have a strong purifying action when the angle $\theta > 3°$, but have only a weak purifying action in the range of $0° < \theta < 3°$ (the angle β in FIG. 3).

This fact is not limited to the four strains mentioned above, and strains basically having a high μ value and a strong purifying action shows specified stimulation angles mentioned above by the addition of an S-, N- or C-compound with regard to purification.

In other words, it was found that strains having much the same μ values and much the same deodorizing ability and purifying ability undergo much the same degrees of growth stimulation by the addition of S-, N- and C-compounds to the culture medium.

Now, those strains which basically have a low μ value but show the same results in purifying ability as strains having a high μ value will be examined for the degree of growth stimulation which they receive by the addition of S-, N- and C-compounds to the culture medium, for the growth angles, and for the relation of their growth angles to the growth angles of the strains having a high μ value.

Fortunately, numerous strains having a low μ value and a purifying ability have been separated. As typical examples, F.R.I. No. 4264 and F.R.I. No. 4265 were used, and cultivated through successive generations in a medium for reducing potency. Finally, subculture having a purifying ability similar to that of S-20 subculture of strains which have a high μ value could be obtained.

By the same procedures and methods as in the case of strains having a high μ value, the following tests were conducted.

(1) Differences in the concentration of bacterial cells between the case of adding S-, N- and C-compounds and the control with the same cultivation time were determined, and the results are given in Table 27.

(2) The numbers of bacterial cells which increased with a passage of time from (1) were measured actually (the number of cells at the time of addition was taken as 1). The results are shown in Table 28.

(3) The values were determined from (2), and are shown in Table 29.

(4) The growth stimulation angles were determined from (3). The results are shown in Table 30.

TABLE 27

| Bacterial Strain | Compound Added | Deodorizing Power | Degree of Stimulation by Addition of S—, N—, C— compounds (% Increase) Basic Culture Medium: S—W Time Elapsed after the Addition (min.) | | | | | | | | | |
|---|---|---|---|---|---|---|---|---|---|---|---|---|
| | | | 30 | 50 | 90 | 120 | 180 | 240 | 300 | 360 | 420 | 480 |
| 4264 | S | Strong | 0 | 8 | 15 | 20 | 35 | 50 | 55 | 55 | 55 | 50 |
| | | Weak | 0 | 3 | 4 | 8 | 12 | 15 | 15 | 14 | 15 | 12 |
| | N | Strong | 0 | 6 | 10 | 18 | 32 | 40 | 47 | 50 | 48 | 40 |
| | | Weak | 0 | 2 | 2.4 | 7 | 10 | 14 | 15 | 12 | 10 | 10 |
| | C | Strong | 0 | 8 | 18 | 23 | 40 | 54 | 58 | 60 | 60 | 55 |
| | | Weak | 0 | 3 | 6 | 12 | 15 | 17 | 20 | 25 | 25 | 20 |
| 4265 | S | Strong | 0 | 8 | 12 | 20 | 35 | 50 | 55 | 60 | 60 | 55 |
| | | Weak | 0 | 6 | 7 | 10 | 13 | 15 | 18 | 18 | 15 | 12 |
| | N | Strong | 0 | 6 | 12 | 17 | 30 | 40 | 45 | 50 | 50 | 45 |
| | | Weak | 0 | 4 | 5 | 10 | 12 | 15 | 15 | 15 | 15 | 10 |
| | C | Strong | 0 | 8 | 18 | 25 | 40 | 53 | 58 | 63 | 60 | 60 |
| | | Weak | 0 | 6 | 10 | 15 | 20 | 20 | 25 | 25 | 25 | 23 |

TABLE 28

| Bacterial Strain | Compound Added | Deodorizing Power | Number of Bacterial Cells Time Elapsed after the Addition (min.) | | | | | | | | | | |
|---|---|---|---|---|---|---|---|---|---|---|---|---|---|
| | | | 0 | 30 | 50 | 90 | 120 | 180 | 240 | 300 | 360 | 420 | 480 |
| 4264 | Control | | 1 | 1.3 | 1.5 | 2.2 | 3 | 5.1 | 9 | 15 | 27 | 46 | 80 |
| | S | Strong | 1 | 1.3 | 1.62 | 2.53 | 3.6 | 6.89 | 13.5 | 23.25 | 41.85 | 71.3 | 124 |
| | | Weak | 1 | 1.3 | 1.545 | 2.288 | 3.24 | 5.71 | 10.35 | 17.25 | 30.78 | 52.9 | 89.6 |
| | N | Strong | 1 | 1.3 | 1.6 | 2.42 | 3.54 | 6.73 | 12.6 | 22.05 | 40.5 | 69 | 116.8 |
| | | Weak | 1 | 1.3 | 1.53 | 2.25 | 3.2 | 5.6 | 10.35 | 17.25 | 30.24 | 50.6 | 88 |
| | C | Strong | 1 | 1.3 | 1.62 | 2.6 | 3.7 | 7.14 | 13.86 | 23.7 | 43.2 | 73.6 | 124 |
| | | Weak | 1 | 1.3 | 1.545 | 2.33 | 3.36 | 5.87 | 10.8 | 18 | 33.75 | 57.5 | 96 |
| 4265 | Control | | 1 | 1.3 | 1.6 | 2.3 | 3.1 | 5.6 | 10 | 18 | 32 | 56 | 100 |
| | S | Strong | 1 | 1.3 | 1.73 | 2.58 | 3.72 | 7.56 | 15 | 27.9 | 51.2 | 89.6 | 160 |
| | | Weak | 1 | 1.3 | 1.7 | 2.46 | 3.41 | 6.33 | 11.5 | 21.24 | 37.76 | 64.4 | 112 |
| | N | Strong | 1 | 1.3 | 1.7 | 2.576 | 3.72 | 7.28 | 14 | 26.1 | 48 | 84 | 145 |
| | | Weak | 1 | 1.3 | 1.66 | 2.42 | 3.41 | 6.27 | 11.5 | 20.7 | 36.8 | 64.4 | 110 |
| | C | Strong | 1 | 1.3 | 1.73 | 2.71 | 3.88 | 7.84 | 15.3 | 28.4 | 52.2 | 89.6 | 160 |
| | | Weak | 1 | 1.3 | 1.7 | 2.53 | 3.57 | 6.72 | 12 | 22.5 | 40 | 70 | 123 |

TABLE 29

| Bacterial Strain | Compound Added | Deodorizing Power | $\mu$ Value Time Elapsed after the Addition (min.) | | | | | | | |
|---|---|---|---|---|---|---|---|---|---|---|
| | | | 60 | 85 | 135 | 180 | 240 | 300 | 360 | 420 |
| 4264 | Control | | 0.526 | 0.59 | 0.56 | 0.55 | 0.54 | 0.55 | 0.56 | 0.54 |
| | S | Strong | 0.665 | 0.685 | 0.67 | 0.66 | 0.607 | 0.565 | 0.56 | 0.54 |
| | | Weak | 0.565 | 0.63 | 0.61 | 0.58 | 0.55 | 0.544 | 0.56 | 0.534 |
| | N | Strong | 0.62 | 0.68 | 0.684 | 0.634 | 0.59 | 0.58 | 0.57 | 0.53 |
| | | Weak | 0.55 | 0.63 | 0.61 | 0.58 | 0.56 | 0.535 | 0.54 | 0.522 |
| | C | Strong | 0.69 | 0.708 | 0.676 | 0.66 | 0.60 | 0.568 | 0.54 | 0.522 |
| | | Weak | 0.58 | 0.666 | 0.617 | 0.58 | 0.56 | 0.57 | 0.58 | 0.522 |
| 4265 | Control | | 0.57 | 0.567 | 0.59 | 0.58 | 0.58 | 0.58 | 0.567 | 0.57 |
| | S | Strong | 0.685 | 0.656 | 0.72 | 0.696 | 0.65 | 0.61 | 0.58 | 0.57 |
| | | Weak | 0.637 | 0.60 | 0.63 | 0.61 | 0.605 | 0.59 | 0.554 | 0.543 |
| | N | Strong | 0.68 | 0.67 | 0.695 | 0.66 | 0.638 | 0.615 | 0.58 | 0.55 |
| | | Weak | 0.62 | 0.617 | 0.636 | 0.61 | 0.597 | 0.58 | 0.567 | 0.547 |
| | C | Strong | 0.73 | 0.69 | 0.71 | 0.68 | 0.64 | 0.61 | 0.57 | 0.56 |
| | | Weak | 0.66 | 0.635 | 0.65 | 0.606 | 0.604 | 0.60 | 0.567 | 0.56 |

TABLE 30

| Bacterial Strain | Deodorizing Power | $\mu$ Value of the Control | Angle $\alpha$ | S—Compound Added | | | N—Compound Added | | | C—Compound Added | | |
|---|---|---|---|---|---|---|---|---|---|---|---|---|
| | | | | Max. $\mu$ Value | Angle $(\alpha + \theta)$ | Angle $\theta$ | Max. $\mu$ Value | Angle $(\alpha + \theta)$ | Angle $\theta$ | Max. $\mu$ Value | Angle $(\alpha + \theta)$ | Angle $\theta$ |
| 4264 | | 0.552 | 13.5° | | | | | | | | | |
| | Strong | | | 0.685 | 16.6° | 3.1° | 0.684 | 16.5° | 3° | 0.708 | 17.1° | 3.6° |
| | Weak | | | 0.63 | 15.3° | 1.8° | 0.63 | 15.3° | 1.8° | 0.666 | 16.15° | 2.65° |
| 4265 | | 0.575 | 14° | | | | | | | | | |
| | Strong | | | 0.72 | 17.4° | 3.4° | 0.695 | 16.8° | 2.8° | 0.73 | 17.6° | 3.6° |

TABLE 30-continued

| Bacterial Strain | Deodorizing Power | μ Value of the Control | Angle α | S—Compound Added | | | N—Compound Added | | | C—Compound Added | | |
|---|---|---|---|---|---|---|---|---|---|---|---|---|
| | | | | Max. μ Value | Angle (α + θ) | Angle θ | Max. μ Value | Angle (α + θ) | Angle θ | Max. μ Value | Angle (α + θ) | Angle θ |
| | Weak | | | 0.637 | 15.5° | 1.5° | 0.636 | 15.5° | 1.5° | 0.66 | 16° | 2° |

The following conclusions can be drawn from the results shown in these tables.

(A) Among strains having the same degree of weak deodorizing ability and purifying ability, those having a high μ value and those having a low μ value have the following relation.

(a) The strains having a low μ value have higher sensitivity to S-, N- and C-compounds, and undergo stronger stimulation.

(b) The peak of stimulation appears 1 to 2 hours later, and tends to continue to exit.

(c) The strength of the growth stimulation in the strains having a low μ value is much the same as that of strains having a high μ value and a strong purifying action.

(d) The locus of the μ value by the addition of S-, N- and C-compounds is similar to that of a strain having a high μ value and a strong purifying action, but shows a somewhat gentler inclination.

(e) Therefore, the growth stimulation angle also increases and exceeds the minimum angle for the existence of purifying ability The relation between both is like the relation between the diameter of a wheel and the number of rotations of the wheel which is required to run over a given distance.

(1) If the diameter of the wheel is large, the number of rotations required for running over a given distance can be smaller. Thus, if the μ value is large, a certain purification can be performed with a smaller degrees of stimulation by S-, N- and C-compounds (stimulation angles).

(2) On the contrary, if the diameter of the wheel is small, it is impossible to run over a given distance unless the number of rotations is larger. Thus, if the μ value is small, the same purification cannot be performed unless the degree of stimulation by S-, N- and C-compounds (stimulation angle) is larger.

For good results, strains are required which have a high μ value and show an angle of at least 2° in the case of adding 1 g of Na₂S.9H₂O, at least 1.5° in the case of adding 1 g of ammonia and at least 3° in the case of adding butyric acid. This indicates that strains having a lower μ value require angles by greater degrees of stimulation.

(B) Experiments were performed to determine the relation between strains having a low μ value and a weak purifying ability and strains having a higher μ value and the same level of purifying ability. The following facts have become known.

(a) The sensitivity to S-, N- and C-compounds is almost the same for both, but the strains having a lower μ value retain stimulation by S-, N- or C-compound for a longer time, and the appearance of the peak of stimulation after addition tends to be delayed.

(b) Thus, the strength of the growth stimulation is much the same as that of S-20 subculture having a high μ value (and a weak purifying ability).

(c) Hence, the locus of the μ value by the addition of S-, N- and C-compounds is similar to that of the S-20 subculture having a high μ value, but the upper side of the trapezoidal locus becomes somewhat longer.

(C) Strains which initially have a very weak purifying action were examined as to the degree of growth stimulation they would undergo, the angles of stimulation, and their actual purifying actions.

The experiment was conducted using F.R.I. No. 2927 strain which has sensitivity to S-, N- and C-compounds and a high μ value but has a very weak purifying power by means of conventional procedures. As a result, it was found that irrespective of the μ value, the strain underwent growth stimulation a little at the early stage of adding S-, N- or C-compound, and the time during which stimulation continued was short. The results were very similar to those obtained with S-25, S-30, S-35, etc. subcultures of F.R.I. No. 4264 which were obtained by cultivating the strain having a high μ value and a strong purifying ability in a medium for reducing potency as described hereinbefore.

Hence, the stimulation angle of such a strain is about 0.5° by the addition of an S-, N- or C-compound, and the angle is lower than those of strains having a strong purifying ability.

However, as shown in a water tank purifying experiment shown hereinbelow, such a strain can fully exhibit its purifying ability if the material to be treated and the method of use are properly chosen. In other words, this shows that strains having any extent of stimulation angle at least have a purifying action.

It should be added that strains having no S-, N- or C-action have no purifying action however high μ values they may have.

Average μ value for those strains having high growth speed is 0.67 and that for those strains having low growth is 0.55 to 0.57. Average μ value of those strains having middle growth speed is 0.61.

It was found that in order to have a strong purifying ability the strains of middle growth speed (μ: 0.61 in average) should have a growth stimulation angle of 2.5° or more in the case of addign Na₂S.9H₂O, 2.3° or more in the case of adding NH₃ and 3.2° or more in the case of adding butyric acid.

It was also confirmed that in order to exhibit any purifying action however small it may be the strains having a μ value of about 0.61 should have a growth stimulation angle of 0.5° or more regardless of which of Na₂S.9H₂O, NH₃ and butyric acid is added to the medium.

It was confirmed that in order for F.R.I. No. 2928 having a low μ value (μ: 0.53) to exhibit purifying action its growth stimulation angle should be 1° or more for any of Na₂S.9H₂O, NH₃ and butyric acid. As a result of experiments it was found that those strains having a μ value lower than 0.53 (e.g., μ: 0.5), however strong their growth stimulation by S-, N- or C-compound may be, are practically unsatisfactory for achieving purification using a single strain or a few strains only in view of competition with common bacteria and speediness desired in practice.

If there are strains which have a purifying ability as high as F.R.I. Nos. 2823, 4264, etc. (e.g., μ: 0.8–0.9) growth stimulation angle may be lower than that of F.R.I. No. 2823, etc. in order to exhibit satisfactory purifying action. Therefore, those strains having a $\mu$ value of 0.8 or more and a growth stimulation angle of the same level as that of F.R.I. No. 2823, etc., can exhibit much higher purifying activity than F.R.I. No. 2823, etc.

As stated above, in the purification of water or water-containing material $\theta$ must be larger when $\mu$ is lower in order for a purifying bacterial strain to exhibit satisfactory purifying activity. However, there is a lower limit for $\mu$, however large $\theta$ may be.

Lower limits for $\mu$ and $\theta$ were obtained by the following experiment.

EXPERIMENT 5

In each 11 tanks were bred 15 goldfishes for 1 month in the same manner as in Example 5 and the purifying ability of various bacterial strains were determined.

The results obtained are shown in Table 31.

TABLE 31

| Run No. | Strain (F.R.I. No.) | $\mu$ | $\theta$ | Number of Goldfish Dead | Purification State | Purification COD/Cr | Purifying Strain × $10^4$ | Common Bacteria × $10^4$ |
|---|---|---|---|---|---|---|---|---|
| 1 | 4264 Lowered | 0.55 | 1° | 0 | Good | 12 ppm | 4.3 | 0.5 |
| 2 | 4268 | 0.53 | 1° | 0 | Good | 15 ppm | 4 | 0.5 |
| 3 | 2928 Enhanced | 0.53 | 1° | 0 | Good | 18 ppm | 4 | 0.5 |
| 4 | 4269 | 0.53 | 0.5° | 3 | Slightly Bad | 45 ppm | 4 | 1.5 |
| 5 | 2928 | 0.53 | 0.5° | 3 | Slightly Bad | 30 ppm | 3 | 10 |
| 6 | 4270 | 0.50 | 1° | 4 | Slightly Bad | 50 ppm | 3.2 | 11 |
| 7 | | 0.50 | 1° | 3 | Slightly Bad | 40 ppm | 3.5 | 2.5 |
| 8 | | 0.50 | 0.7° | 4 | Slightly Bad | 65 ppm | 2.5 | 3 |
| 9 | | 0.50 | 0.5° | 6 | Slightly Bad | 180 ppm | 1 | 20 |
| 10 | | 0.50 | 0.5° | 5 | Slightly Bad | 170 ppm | 1 | 25 |
| 11 | Control | | | 12 | Slightly Bad | 260 ppm | 0 | 32 |

From the results shown in Table 31, it can be seen that the lower limit for $\mu$ is about 0.53 and that for $\theta$ is about 1° (Run Nos. 1 to 5).

Many purifying strains have been isolated but those having such a low $\mu$ value as shown in Table 31 have not been deposited in view of low practical importance.

The values of the angles given hereinabove hold good only when the interval between $l_1$ and $l_2$ of the logarithmic values (1, 2, 3 ... 8, 9, 10) of the number of bacterial cells on the axis of ordinates in a graph is equal to the interval between $t_1$ and $t_2$ of the time (hours) on the axis of abscissas. In a graph in which the interval of graduation of time is n times the interval of graduation of the logarithmic values, the angle $\theta$ can be determined by the following equations.

$$\tan \alpha = \frac{\mu'}{2.303m} \quad (1)$$

$\mu'$ ... $\mu$ value of $OB$ $$\tan (\alpha + \theta) = \frac{\mu''}{2.303m} \quad (2)$$

$\mu''$ ... maximum $\mu$ value of $EF$ $$\tan (\alpha + \theta) = \frac{\tan \alpha + \tan \theta}{1 - \tan \alpha \cdot \tan \theta} \quad (3)$$

$$\therefore \frac{\mu''}{2.303m} = \frac{\frac{\mu'}{2.303m} + \tan \theta}{1 - \frac{\mu'}{2.303m} \cdot \tan \theta}$$

$$\therefore \tan \theta = \frac{2.303m(\mu'' - \mu')}{5.3m^2 + \mu''\mu'}$$

Thus, if m is determined, the angle $\theta$ can be obtained. Accordingly, the difference in angle $\theta$ between a strain having a strong purifying action and a strain having only a weak purifying action by the addition of an S-, N- or C-compound can be calculated.

Numerous and elaborate experiments were performed using strong purifying strains having a high $\mu$ value, strong purifying strains having a low $\mu$ value, and strains having only a weak purifying action.

By adding S-, N- and C-compounds to the culture medium, the reactions which these strains showed were examined from various angles, and some laws quite unknown heretofore could be discovered.

Table 32 and FIGS. 6-(1), -(2) and -(3) summarize the relation of purification to microorganisms which can be expressed by numerical figures.

From the results of the above-described numerous experiments there are observed relationship as summarized in Table 32 among (i) growth speed of a microorganism, (ii) growth stimulation angle by the addition of S-, N- or C-compound and (iii) strong purifying ability.

TABLE 32

| $\mu$(Average) | $\alpha$ | Compounds Added | $\theta$ |
|---|---|---|---|
| 0.67 | 16.5° | S | 2° |
| | | N | 1.5° |
| | | C | 3° |
| 0.61 | 14.8° | S | 2.5° |
| | | N | 2.3° |

TABLE 32-continued

| μ(Average) | α | Compounds Added | θ |
|---|---|---|---|
| 0.55 | 13.5° | C | 3.2° |
| | | S | 3° |
| | | N | 3° |
| | | C | 3.5° |

S: Na₂S
N: NH₃
C: Butyric Acid

FIGS. 6-(1), -(2) and -(3) are graphical representation of the content of Table 32. In these figures solid line indicates data actually obtained and dotted line indicates extrapolation.

As will be clear from these figures, strains having a strong purifying ability are those expressed in the upper region with respect to the line in the figures (shadowed region) and the farther the position (coordinate) of a purifying bacterial strain is the stronger the purifying ability of the strain is.

Further, relationships among (a) growth speed of a micdroorganism, (b) growth stimulation angle by the addition of S-, N- or C-compound and (c) purifying ability of such a level that at minimum aquerium water can be purified are observed and tabilated in Table 33.

TABLE 33

| μ | α | Compounds Added | θ |
|---|---|---|---|
| 0.67 | 16.5° | S | 0.5° |
| | | N | 0.5° |
| | | C | 0.5° |
| 0.61 | 14.8° | S | 0.5° |
| | | N | 0.5° |
| | | C | 0.5° |
| 0.55 | 13.5° | S | 0.7° |
| | | N | 0.7° |
| | | C | 0.7° |
| 0.53 | 13° | S | 1° |
| | | N | 1° |
| | | C | 1° |

FIGS. 7-(1), -(2) and -(3) are graphical representations of the content of Table 33. In these figures solid curve indicates data actually obtained and dotted line indicates extrapolation.

As will be clear from FIGS. 7-(1), -(2) and -(3), those strains which are plotted in the shadowed region in the graphs have a strong purifying ability and the larger the distance between the coordinate of a strain and the curve is the more potent the strain is.

Substantially the same results as above were obtained when a mixture of, for example, F.R.I. Nos. 2544 (C-action only), 2545 (N-action only) and 2546 (S-action only) was used.

It can be seen from the foregoing that in order for a purifying bacterial strain to be effective, it should have at least one of S-, N- and C-actions and a value of 0.53 or more.

FIGS. 9-(1) and -(3) are graphs which are obtained by combining FIGS. 7-(1) and 8-(1), 7-(2) and 8-(2), and 7-(3) and 8-(3), respectively.

In FIGS. 9-(1), -(2) and -(3) those strains which are dotted in the region upper with respect to the straight line (i.e., shadowed region) have a strong purifying ability so that they can be used in purifying any putrefying water or water-containing material derived from living organisms. On the other hand, those strains which are plotted in the region encircled by the straight claim and curve have only a weak purifying ability so that their application is limited to the purification of aquarium water, etc. (such strains are not suited for the purification of putrefying water of high protein content).

Next conditions for keeping the ability of purifying bacterial strains which can be used in this invention will be explained hereinbefore.

It has been experimentally confirmed that compounds shown in Table 33 affect adversely on the purifying activity of bacterial strains.

TABLE 34

| Classification | Compound Affecting Adversely on Purifying Activity When Contained in Medium for Subculturing | Purifying activity of Bacterial Strain after Subculturing |
|---|---|---|
| A | (1) Proteins such as meal extract | Bad |
| | (2) Peptone | Bad |
| | (3) Leucine | Bad |
| | (4) Isoleucine | Bad |
| | (5) Proline | Bad |
| | (6) Lysine | Bad |
| | (7) Thyrosine | Bad |
| | (8) Histidine | Bad |
| | (9) Tryptophan | Bad |
| | (10) Threonine | Bad |
| | (11) Serine | Bad |
| | (12) Glucose | Bad |

For example, when subculturing was conducted with the addition of serine, the purifying ability of a bacterial strain is reduced rapidly according as subculturing is repeated.

On the other hand, compounds shown in Table 35 are found to be effective for keeping the purifying ability of bacterial strains when subcultured through many generations.

TABLE 35

| Classification | Compounds Effective for Keeping Purifying Ability When Contained in Medium for subculturing | | Purifying Activity of Bacterial Strain after Subculturing |
|---|---|---|---|
| | Essential | Additional | |
| B | (a) Inorganic Salts + SNC | None | Moderate |
| | (b) Inorganic Salts + S—contg. Amino Acids | None | Moderate |
| | (c) Inorganic Salts + SNC + S—contg. Amino Acids | None | Moderate |
| C | (d) Inorganic Salts + SNC | One or two of starch, minerals and vitamins | Good |
| | (e) Inorganic Salts + S—contg. Amino Acids | | Good |
| | (f) Inorganic Salts + SNC + S—contg. Amino Acids | | Good |
| D | (h) Inorganic Salts + SNC | starch | Excellent |
| | (i) Inorganic Salts + S—contg. Amino Acids | + minerals | Excellent |
| | (j) Inorganic Salts + SNC + S—contg. Amino Acids | + vitamins | Excellent |

As will be clear from Table 35 in media containing a set of compounds D-(h), -(i) or (j) bacterial strains can retain their purifying ability sufficiently. In addition, when Compounds D-(h), -(i) or -(j) when contained in a subculturing medium containing meat extract (A-(1) in Table 34) or peptone (A-(2) in Table 34) reduction of purifying ability was scarce and moreover a tendency of increased yield of purifying bacterial cells was observed. The above holds true for all the purifying bacterial strains which can be used in this invention.

Conditions for storing purifying bacterial strains which can be used in this invention have been considered.

Suitable storing temperature ranges from about 6 to about 8° C.

It is advantageous to store the bacterial strains in $CO_2$, $N_2$, $H_2$, He or inert gases. Air or $O_2$ gas is not desirable for retaining purifying ability of bacterial strains.

Conditions for storage and period of time in which bacterial strains retained their purifying ability were shown in Table 36.

Further, it was found that when bacterial cells were coated with compounds described in Table 36 the purifying ability of bacterial strains were preserved longer than those without such coating and that effectiveness in preserving purifying ability was higher in the order of D, C and B in Table 35. This holds true for all the bacterial strains which can be used in this invention.

ter sp. SNC FRI No. 2544, Nitrobacter sp. SNC FRI No. 2545, Thiobacillus sp. SNC FRI No. 2546, Pseudomonas sp. SNC FRI No. 2822, Thiobacillus sp. SNC FRI No. 2823, Pseudomonas sp. SNC FRI No. 2927, Pseudomonas Sp. SNC FRI No. 2928, Thiobacillus sp. SNC FRI No. 2929, Thiobacterium sp. SNC FRI No. 3575, Thiobacterium sp. SNC FRI NO. 3576, Macromonas Sp. SNC FRI No. 3577, Macromonas Sp. SNC FRI No. 3578, Pseudomonas sp. SNC FRI No. 4264, Pseudomonas Sp. SNC FRI No. 4265, Thiobacillus Sp. SNC FRI No. 4268, Thiobacillus Sp. SNC FRI No. 4269, Acinetobacter sp. SNC FRI No. 4270, Bacillus sp. SNC FRI No. 4684, Bacillus sp. SNC FRI No. 4685, Streptococcus sp. SNC FRI No. 4686, Streptococcus sp. SNC FRI No. 4687, Corynebacterium sp. SNC FRI No. 4688, Corynebacterium sp. SNC FRI No. 4689, Vibrio sp. SNC FRI No. 4690, Vibrio sp. SNC FRI No. 4691, Photobacterium sp. SNC FRI No. 4692, Photobacterium sp. SNC FRI No. 4693, Flavobacterium sp. SNC FRI No. 4694, Flavobacterium sp. SNC FRI No. 4695, Aeromonas sp. SNC FRI No. 4696, Aeromonas sp. SNC FRI No. 4697, Alcaligenes sp. SNC FRI No. 4698, Alcaligenes sp. SNC FRI No. 4699, Nitrobacter

TABLE 36

| Storing Condition | | | Period of Time in Which Satisfactory Purifying Ability is Retained | | |
|---|---|---|---|---|---|
| Temp. | Gas | Coating | Wet | Semi-Dry | Dry |
| 37° C. | Air | + | 1–2 days | 5 days | 10 days |
| | Air | − | About 8 days | 3 days | 5 days |
| 37° C. | $CO_2$, $N_2$, $H_2$ He or Inert Gas | + | 1–2 days | 8 days | 15 days |
| | | − | About 10 hrs. | 4 days | 7 days |
| 6° C. | Air | + | 15 days | 50 days | 100 days |
| | Air | − | 7 days | 20 days | 80 days |
| Room Temp. | $CO_2$, $N_2$, $H_2$ or Inert Gas | + | 10 days | 20 days | 60 days |
| | | − | 5 days | 15 days | 20 days |
| 6° C. | $CO_2$, $N_2$, $H_2$ or Inert Gas | + | 30 days | 100 days | 200 days |
| | | − | 12 days | 40 days | 100 days |

Note:
Coating Material
S—, N— or C—Compound + Starch + Minerals + Inorganic Salts, or S—contg. Amino Acids + Starch + Minerals + Inorganic Salts While the invention has been described in detail and with reference to specific embodiments thereof, it will be apparent to one skilled in the art that various changes and modifications can be made therein without departing from the spirit and scope thereof.

What is claimed is:

1. A method for purifying water or a water-containing material which comprises contacting said water or water-containing material with a purifying effective amount of a bacterial composition comprising one or more bacterial strains
   (1) which can grow in an S-W medium consisting of 1 g of $KH_2PO_4$, 0.7 g $MgSo_4.7H_2O$, 1 g of NaCl, 4 g of $(NH_4)_2HPO_4$, 0.03 g of $F_eSO_4.$ $7H_2O$ and 5 g of glucose
   (2) which exhibit(s) a $\mu$ value larger than that exhibited by coliform bacteria under environmental conditions, and
   (3) which exhibits(s) promoted growth by the addition of at least one of (i) a foul smelling S compound,
      (ii) a foul smelling N compound, or
      (iii) a foul smelling C compound,
said one or more strains as a whole exhibiting each of S-, N- and C-actions, said one or more bacterial strains being selected from the group consisting of Acinetobacter sp. SNC FRI No. 2544, Nitrobacter sp. SNC FRI No. 2545, Thiobacillus sp. SNC FRI No. 2546, Pseudomonas sp. SNC FRI No. 2822, Thiobacillus sp. SNC sp. SNC FRI No. 4700 and Nitrobacter Sp. SNC FRI No. 4701.

2. A method for purifying water or a water-containing material which comprises contacting said water or water-containing material with a purifying effective amount of a bacterial composition comprising one or more bacterial strains
   (1) which can grow in an S-W medium consisting of 1 g of $KH_2PO_4$, 0.7 g $MgSO_4.7H_2O$, 1 g of NaCl, 4 g of $(NH_4)_2HPO_4$, 0.03 g of $F_eSO_4.$ $7H_2O$ and 5 g of glucose
   (2) which exhibit(s) a $\mu$ value larger than that exhibited by coliform bacteria under environmental conditions, and
   (3) which exhibits(s) promoted growth by the addition of at least one of
      (i) a foul smelling S compound,
      (ii) a foul smelling N compound, or
      (iii) a foul smelling C compound,
said one or more strains as a whole exhibiting each of S-, N- and C-actions, said one or more bacterial strains being selected from the group consisting of Acinetobacter sp. SNC FRI No. 2544, Nitrobacter sp. SNC FRI No. 2545, Thiobacillus sp. SNC FRI No. 2546, Pseudomonas sp. SNC FRI No. 2822, Thiobacillus sp. SNC FRI No. 2823, Pseudomonas sp. SNC FRI No. 2927, Pseudomonas Sp. SNC FRI No. 2928, Thiobacillus sp. SNC FRI No. 2929, Thiobacterium sp. SNC FRI No. 3575, Thiobacterium sp. SNC FRI NO. 3576, Macromonas Sp. SNC FRI No. 3577, Macromonas Sp. SNC FRI No. 3578, Pseudomonas sp. SNC FRI No. 4264, Pseudomonas Sp. SNC FRI No. 4265, Bacillis sp. SNC FRI No. 4684, Bacillus sp. SNC FRI No. 4685, Streptococcus sp. SNC FRI No. 4686, Streptococcus sp. SNC FRI No. 4687, Corynebacterium sp. SNC FRI No. 4688, Corynebacterium sp. SNC FRI No. 4689, Vibrio sp. SNC FRI No. 4690, Vibrio sp. SNC FRI No. 4691, Photobacterium sp. SNC FRI No. 4692, Photobacterium sp. SNC FRI No. 4693, Flacobacterium sp. SNC FRI No. 4694, Flavobacterium sp. SNC FRI No. 4695, Aeromonas sp. SNC FRI No. 4696, Aeromonas sp. SNC FRI No. 4697, Alcaligenes sp. SNC FRI No. 4698, Alcaligenes sp. SNC FRI No. 4699, Nitrobacter sp. SNC FRI No. 4700 and Nitrobacter Sp. SNC FRI No. 4701.

3. A method for purifying water or a water-containing material which comprises contacting said water or water-containing material with a purifying effective amount of a bacterial composition comprising one or more bacterial strains
  (1) which can grow in an S-W medium consisting of 1 g of $KH_2PO_4$, 0.7 g $MgSo_4.7H_2O$, 1 g of NaCl, 4 g of $(NH_4)_2HPO_4$, 0.03 g of $F_eSO_4.7H_2O$ and 5 g of glucose
  (2) which exhibit(s) a $\mu$ value larger than that exhibited by coliform bacteria under environmental conditions, and
  (3) which exhibits(s) promoted growth by the addition of at least one of
    (i) a foul smelling S compound,
    (ii) a foul smelling N compound, or
    (iii) a foul smelling C compound, said one or more strains as a whole exhibiting each of S-, N- and C-actions, said one or more bacterial strains being selected from the group consisting of Pseudomonas sp. SNC FRI No. 2822, Thiobacillus sp. SNC FRI No. 2823, Pseudomonas sp. SNC FRI No. 2927, Pseudomonas Sp. SNC FRI No. 2928, Thiobacillus sp. SNC FRI No. 2929, Thiobacterium sp. SNC FRI No. 3575, Thiobacterium sp. SNC FRI No. 3576, Macromonas Sp. SNC FRI No. 3577, Macromonas Sp. SNC FRI No. 3578, Pseudomonas sp. SNC FRI No. 4264, Pseudomonas Sp. SNC FRI No. 4265, Thiobacillus Sp. SNC FRI No. 4268, Thiobacillus Sp. SNC FRI No. 4269, Acinetobacter sp. SNC FRI No. 4270, Bacillus sp. SNC FRI No. 4684, Bacillus sp. SNC FRI No. 4685, Streptococcus sp. SNC FRI No. 4686, Streptococcus sp. SNC FRI No. 4687, Corynebacterium sp. SNC FRI No. 4688, Corynebacterium sp. SNC FRI No. 4689, Vibrio sp. SNC FRI No. 4690, Vibrio sp. SNC FRI No. 4691, Photobacterium sp. SNC FRI No. 4692, Photobacterium sp. SNC FRI No. 4693, Flavobacterium sp. SNC FRI No. 4694, Flavobacterium sp. SNC FRI No. 4695, Aeromonas sp. SNC FRI No. 4696, Aeromonas sp. SNC FRI No. 4697, Alcaligenes sp. SNC FRI No. 4698, sp. SNC FRI No. 4699, Nitrobacter sp. SNC FRI No. 4700 and Nitrobacter Sp. SNC FRI No. 4701.

4. The method of claims 1, 2, or 3, wherein said bacterial strain(s) is subcultured in a subculturing medium containing (a) at least one of S, N and C compounds and/or (b) at least one S-containing amino acid.

5. The method of claim 4, wherein said subculturing medium further comprises at least one of starch, minerals and vitamins.

6. The method of claims 1, 2, or 3, wherein said one or more strains is, or are a strain or strains stored at a temperature of 6°–8° C.

7. The method of claim 4, wherein said bacterial strain(s) is, or are strain(s) stored in $CO_2$, $N_2$, $H_2$, He or an inert gas.

* * * * *